(12) United States Patent
Hayes

(10) Patent No.: US 11,975,917 B2
(45) Date of Patent: May 7, 2024

(54) TANK FOR TRANSPORTING LIQUIDS

(71) Applicant: Roger Hayes, Adelanto, CA (US)

(72) Inventor: Roger Hayes, Adelanto, CA (US)

(*) Notice: Subject to any disclaimer, the term of this patent is extended or adjusted under 35 U.S.C. 154(b) by 0 days.

(21) Appl. No.: 17/807,846

(22) Filed: Jun. 20, 2022

(65) Prior Publication Data
US 2022/0315325 A1  Oct. 6, 2022

Related U.S. Application Data

(62) Division of application No. 16/988,527, filed on Aug. 7, 2020, now Pat. No. 11,396,420.

(60) Provisional application No. 62/984,154, filed on Mar. 2, 2020, provisional application No. 62/885,128, filed on Aug. 9, 2019.

(51) Int. Cl.
| | |
|---|---|
| *B65D 90/52* | (2006.01) |
| *B60P 3/22* | (2006.01) |
| *B65D 90/00* | (2006.01) |
| *B60K 15/03* | (2006.01) |
| *B60K 15/063* | (2006.01) |

(52) U.S. Cl.
CPC ........ *B65D 90/0066* (2013.01); *B60P 3/2235* (2013.01); *B65D 90/52* (2013.01); *B60K 2015/0344* (2013.01); *B60K 15/063* (2013.01); *Y10T 29/49* (2015.01); *Y10T 29/49826* (2015.01); *Y10T 29/49879* (2015.01)

(58) Field of Classification Search
CPC ............ B60K 15/063; B60K 215/0344; B60K 2015/03111; B60K 2015/0777; B60K 2015/0775; B60K 15/077; B60K 2015/03032; B65D 90/52; B60P 3/2235; B60P 3/221
See application file for complete search history.

(56) References Cited

U.S. PATENT DOCUMENTS

| | | |
|---|---|---|
| 2,054,706 A | 9/1936 | Morley |
| 3,263,865 A | 8/1966 | Kachnik |
| 3,349,953 A | 10/1967 | Conaway et al. |
| 3,374,916 A | 3/1968 | Herff |
| 3,400,854 A | 9/1968 | Conaway et al. |
| 3,556,351 A | 1/1971 | Williams |
| 3,645,416 A | 2/1972 | Main, Jr. |
| RE27,346 E | 4/1972 | Naylor |
| 3,653,531 A | 4/1972 | Zurmuehlen |
| 3,784,050 A | 1/1974 | Pollack |
| 3,804,292 A | 4/1974 | Chiti |
| 4,136,973 A | 1/1979 | van der Lely |
| 4,331,342 A | 5/1982 | van der Lely |

(Continued)

*Primary Examiner* — Christopher J Besler
(74) *Attorney, Agent, or Firm* — KNOBBE MARTENS OLSON & BEAR LLP

(57) ABSTRACT

A tank for transporting a liquid is disclosed. In some implementations, the tank includes a carrier having a plurality of compartments, each compartment of the plurality of compartments having an opening for containing one or more baffles. In some implementations, the tank includes a plurality of posts that are securable relative to the tank and configured to support the one or more baffles. In some implementations, the posts are removed from the tank to facilitate installation of the baffles. In some implementations, the posts are rotatable to facilitate installation of the baffles. In some implementations, the tank is a two-piece tank which facilitates access to the one or more baffles.

18 Claims, 52 Drawing Sheets

(56) References Cited

U.S. PATENT DOCUMENTS

| | | |
|---|---|---|
| 4,350,258 A | 9/1982 | Rogers |
| 4,427,045 A | 1/1984 | Headrick |
| 4,483,454 A | 11/1984 | Rogers et al. |
| 4,589,526 A | 5/1986 | Chang et al. |
| 4,611,724 A | 9/1986 | Watkins et al. |
| 4,775,070 A | 10/1988 | Williams |
| 4,796,773 A | 1/1989 | Gerhard |
| 4,863,055 A | 9/1989 | Bietz |
| 5,303,843 A | 4/1994 | Zink et al. |
| 5,312,012 A | 5/1994 | Zink |
| 5,346,092 A | 9/1994 | Gerhard |
| 5,779,092 A | 7/1998 | Hehn et al. |
| 5,890,618 A | 4/1999 | Spickelmire |
| 5,960,981 A | 10/1999 | Dodson et al. |
| 6,032,347 A | 3/2000 | Behr et al. |
| 6,062,417 A | 5/2000 | Evans |
| 6,220,287 B1 | 4/2001 | Wolf |
| 6,308,856 B1 | 10/2001 | Spickelmire |
| 6,367,648 B1 | 4/2002 | Boone et al. |
| 6,375,030 B1 | 4/2002 | Spickelmire |
| 6,431,388 B1 | 8/2002 | Spickelmire et al. |
| D469,846 S | 2/2003 | Spickelmire |
| 6,547,090 B2 | 4/2003 | Spickelmire et al. |
| 6,564,961 B1 | 5/2003 | Klein |
| 6,604,644 B1 | 8/2003 | Fenton |
| 6,786,350 B2 | 9/2004 | Bauer |
| 6,848,472 B2 | 2/2005 | Bambacigno |
| 6,901,941 B2 | 6/2005 | Gershtein et al. |
| 6,945,423 B2 | 9/2005 | Wilson |
| 7,459,077 B2 | 12/2008 | Staschik |
| 7,475,910 B1 | 1/2009 | Calonge et al. |
| 7,604,256 B2 | 10/2009 | Reber |
| 7,648,749 B1 | 1/2010 | Taylor |
| 7,717,296 B1 | 5/2010 | Guthrie |
| 7,735,507 B2 | 6/2010 | Hagenbuch |
| 8,235,241 B2 | 8/2012 | Ramsay |
| 8,251,171 B2 | 8/2012 | Cragel et al. |
| 8,307,844 B2 | 11/2012 | Hagenbuch |
| 8,657,051 B2 | 2/2014 | Cragel et al. |
| 8,708,190 B2 | 4/2014 | Chun |
| 8,746,359 B2 | 6/2014 | Rüdén |
| 8,820,559 B2 | 9/2014 | Beitler et al. |
| 8,851,321 B2 | 10/2014 | Ramoo et al. |
| 8,857,651 B2 | 10/2014 | Stelzl |
| 8,881,855 B2 | 11/2014 | Cragel et al. |
| 9,004,308 B2 | 4/2015 | Spencer et al. |
| 9,061,623 B2 | 6/2015 | Maclean et al. |
| 9,321,347 B2 | 4/2016 | Cragel et al. |
| 9,321,588 B2 | 4/2016 | Ramoo et al. |
| 9,334,061 B2 | 5/2016 | Albert et al. |
| 9,358,878 B2 | 6/2016 | Vreeken et al. |
| 9,533,826 B2 | 1/2017 | Eenkhoorn |
| 9,599,284 B2 | 3/2017 | Shin |
| 9,611,090 B1 | 4/2017 | D'Amico et al. |
| 9,694,672 B2 | 7/2017 | Cragel et al. |
| 9,707,881 B2 | 7/2017 | Reynolds et al. |
| 9,708,120 B2 | 7/2017 | Ramoo et al. |
| 9,745,076 B2 | 8/2017 | Bingham et al. |
| 9,937,786 B2 | 4/2018 | Dudar et al. |
| 9,956,869 B2 | 5/2018 | Esser |
| 10,016,640 B2 | 7/2018 | Liu |
| 10,029,830 B2 | 7/2018 | Hagenbuch |
| 10,029,848 B2 | 7/2018 | Yaremenko et al. |
| 10,071,825 B2 | 9/2018 | Sivasubramanian et al. |
| 10,071,855 B2 | 9/2018 | Kim et al. |
| 10,131,497 B2 | 11/2018 | Lee et al. |
| 10,232,703 B2 | 3/2019 | Vaishnav et al. |
| 10,245,944 B2 | 4/2019 | Takeda et al. |
| 10,352,500 B2 | 7/2019 | Ramoo et al. |
| 2001/0009257 A1 | 7/2001 | Bauer |
| 2004/0159663 A1 | 8/2004 | Fenton |
| 2005/0103793 A1 | 5/2005 | Glass |
| 2006/0210373 A1 | 9/2006 | Khattab |
| 2007/0039956 A1 | 2/2007 | Fenton |
| 2009/0001085 A1 | 1/2009 | Bartz et al. |
| 2009/0314790 A1 | 12/2009 | Eenkhoorn |
| 2009/0321439 A1 | 12/2009 | Cepak et al. |
| 2010/0133283 A1* | 6/2010 | Nakajima .......... B60K 15/077 220/694 |
| 2011/0017748 A1 | 1/2011 | Palma et al. |
| 2015/0008235 A1 | 1/2015 | Khoshsepehr |
| 2015/0014340 A1 | 1/2015 | Smith |
| 2015/0069070 A1 | 3/2015 | Iwaya et al. |
| 2015/0352945 A1* | 12/2015 | Matusek ................ F02M 37/44 220/563 |
| 2017/0050741 A1 | 2/2017 | Bingham et al. |
| 2017/0232835 A1* | 8/2017 | Diestelhorst ........ B29C 48/0017 220/562 |
| 2017/0282777 A1 | 10/2017 | Reynolds et al. |
| 2018/0029470 A1 | 2/2018 | Voice et al. |
| 2018/0178645 A1 | 6/2018 | Dudar et al. |
| 2018/0312057 A1 | 11/2018 | Esser |
| 2019/0077253 A1 | 3/2019 | Gross et al. |

\* cited by examiner

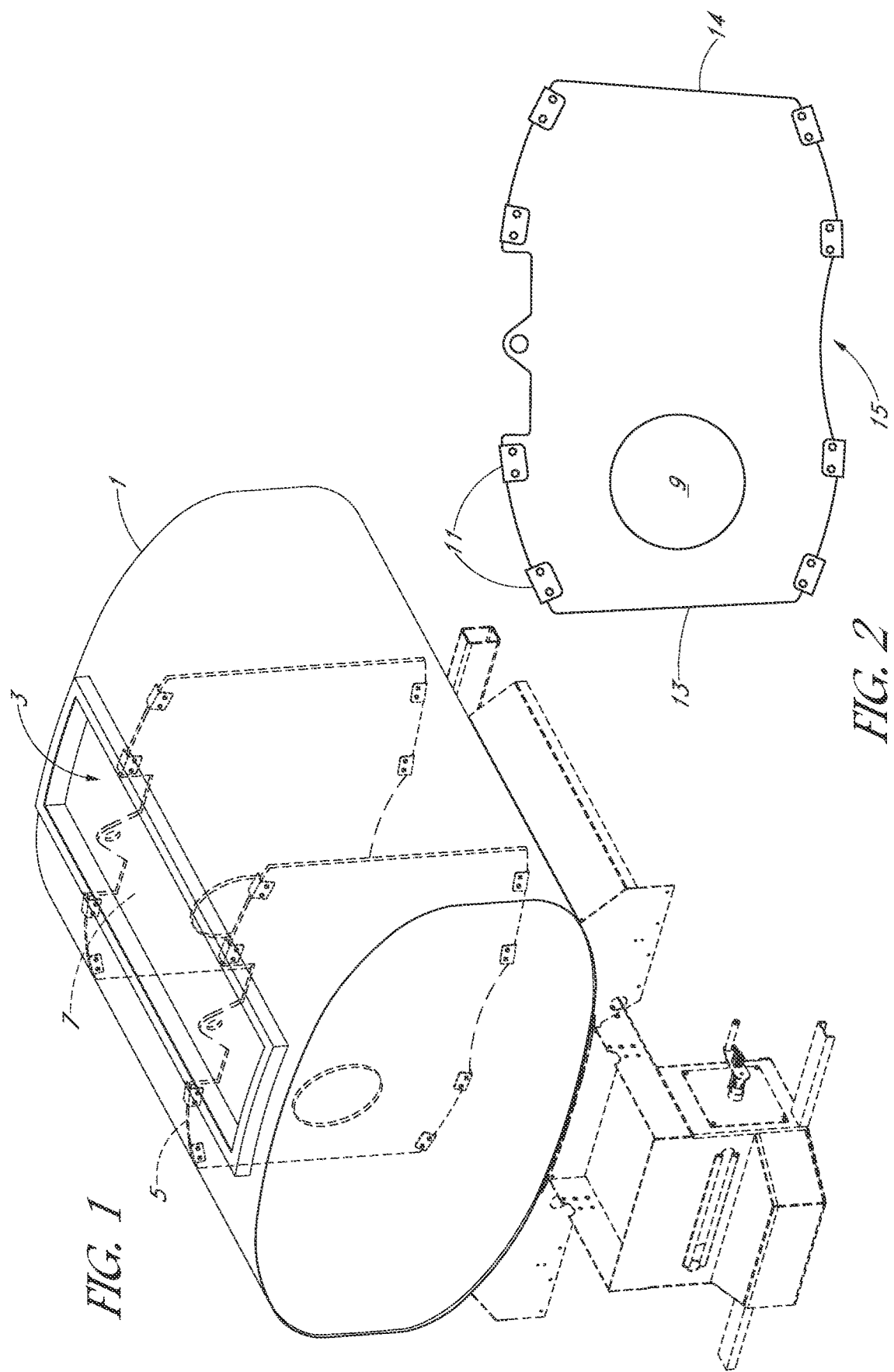

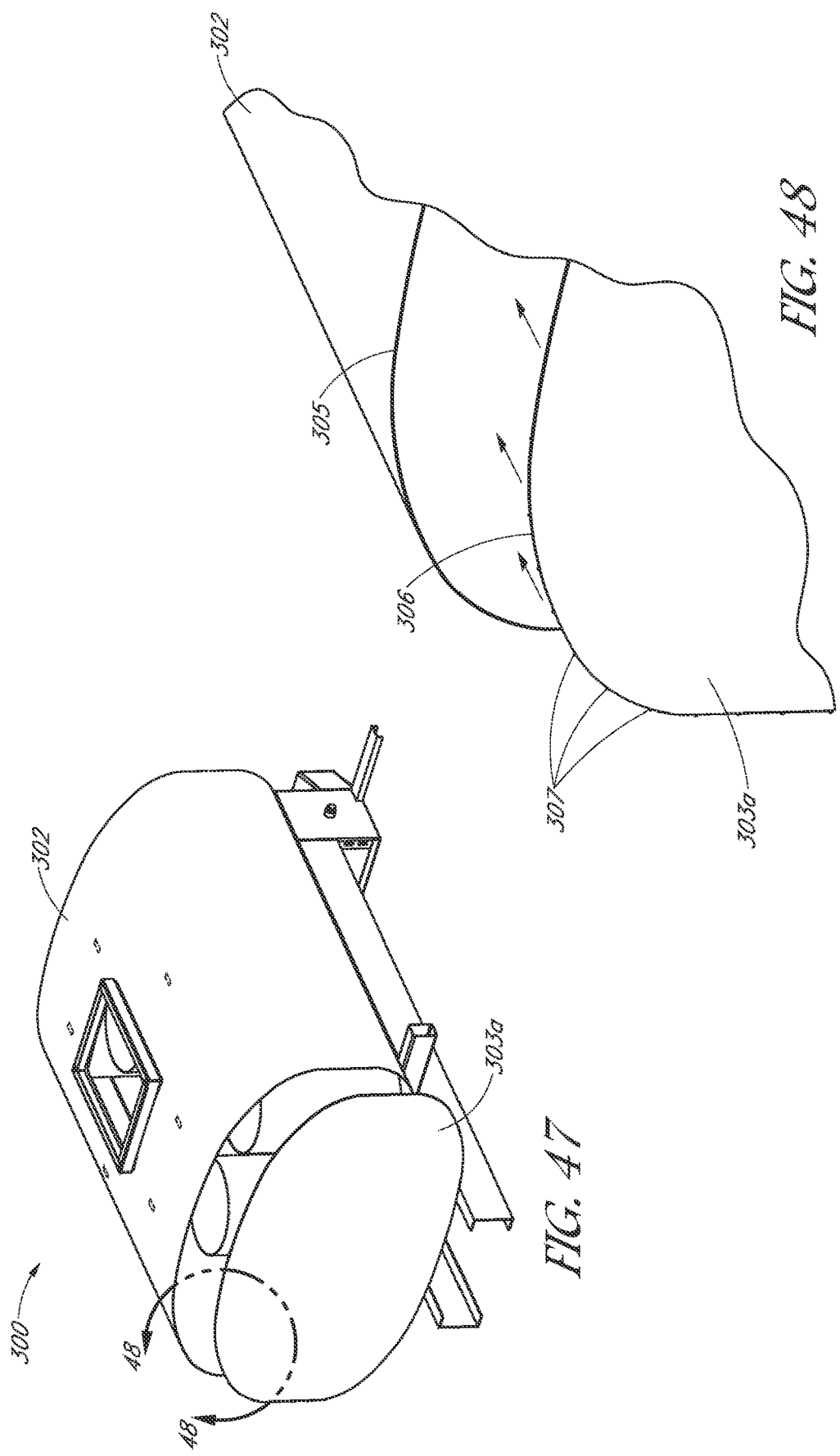

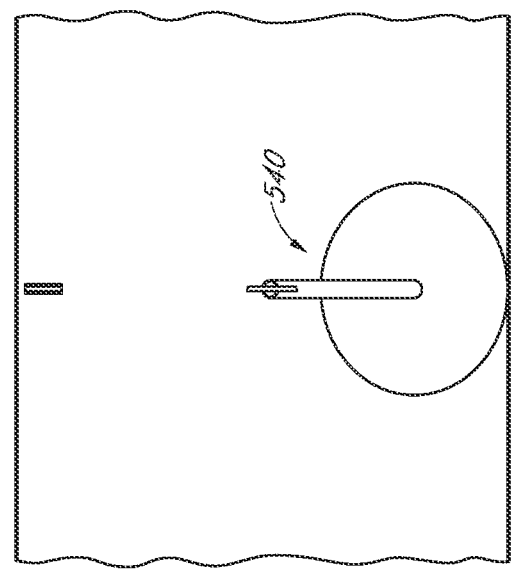
FIG. 57
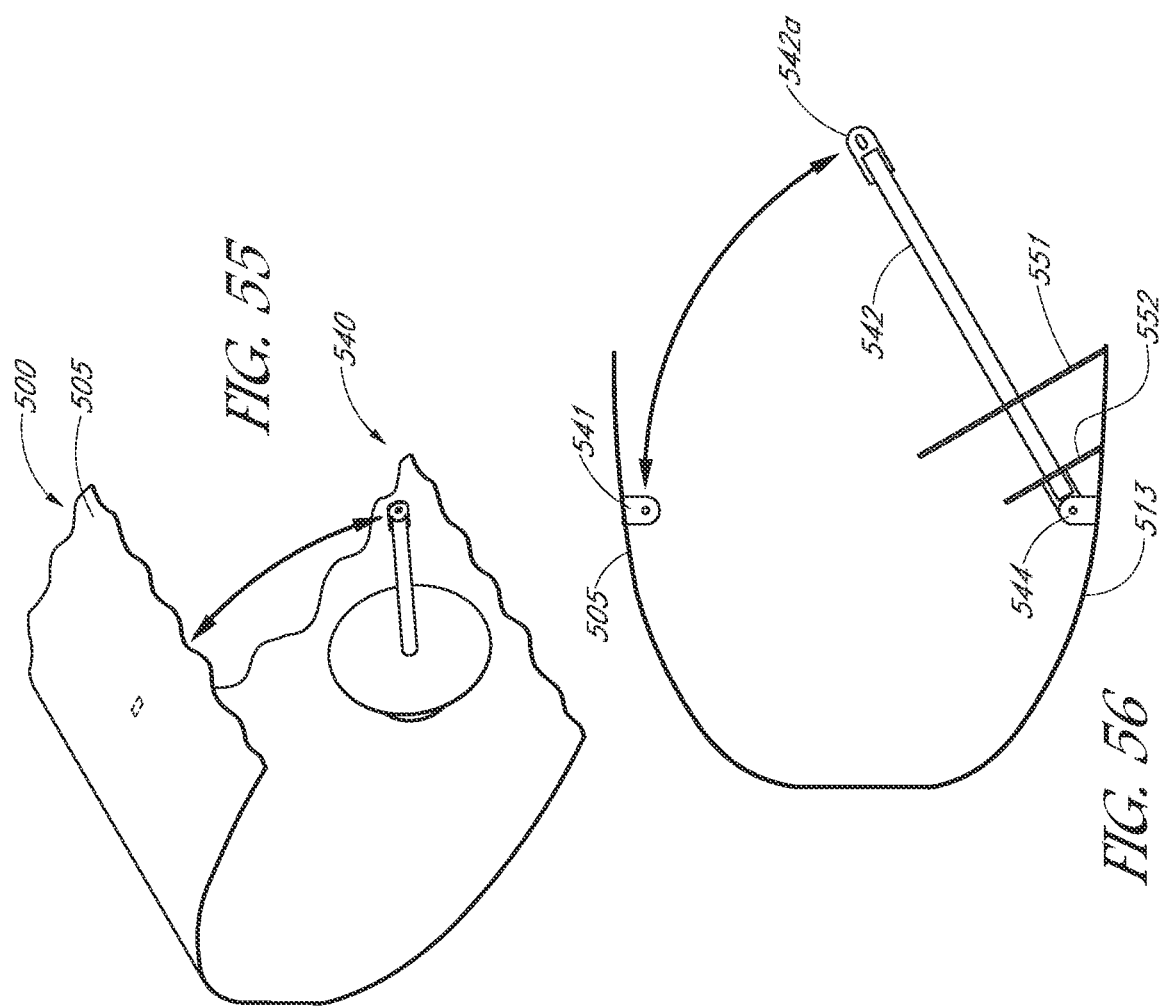
FIG. 55
FIG. 56

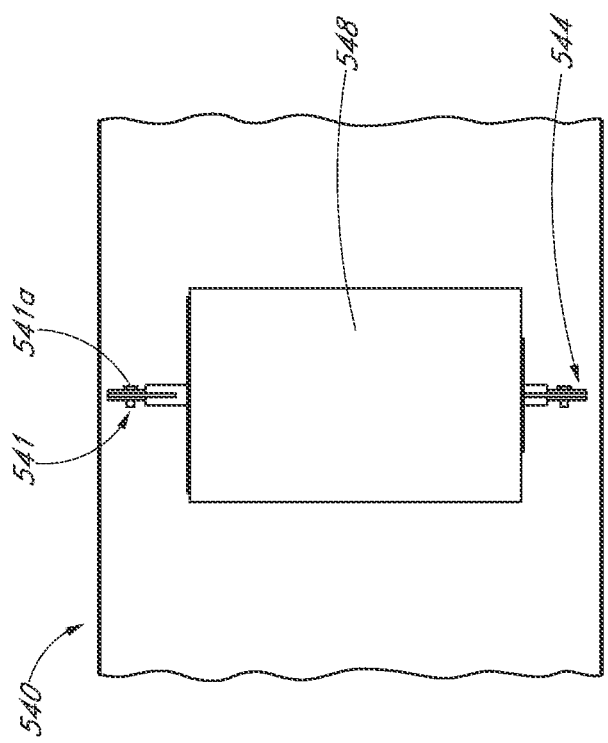
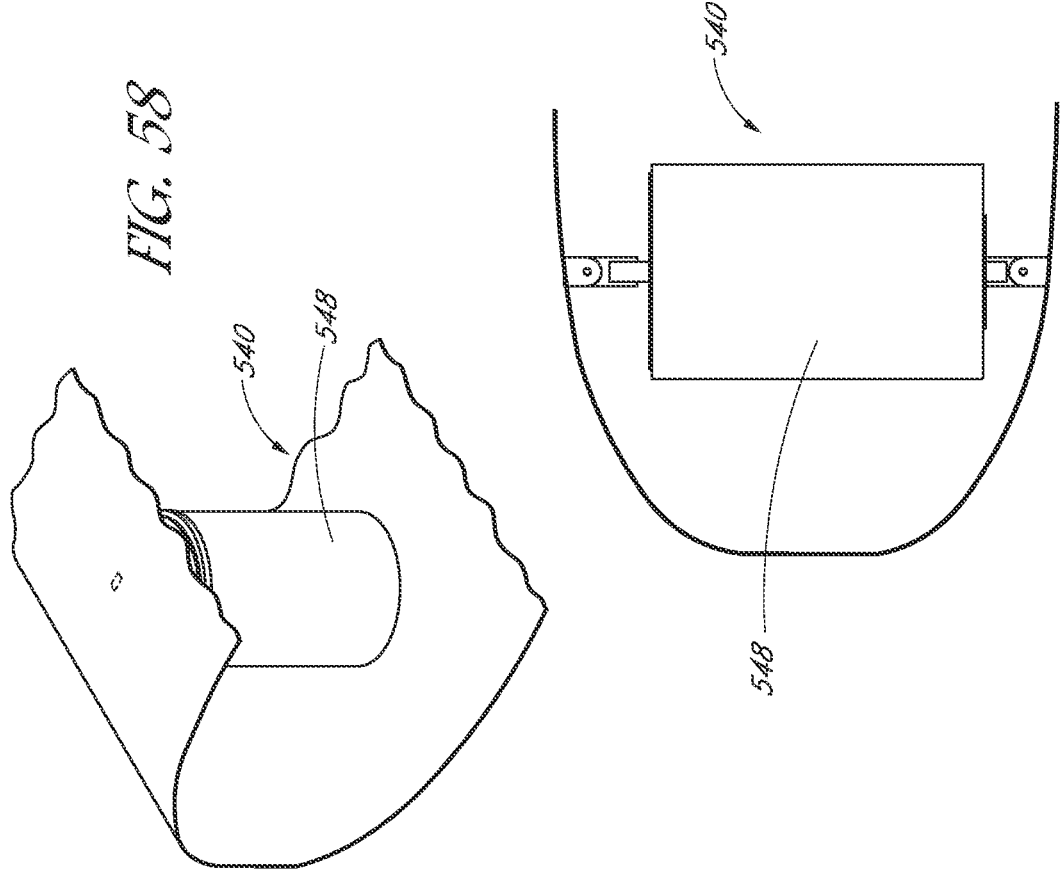

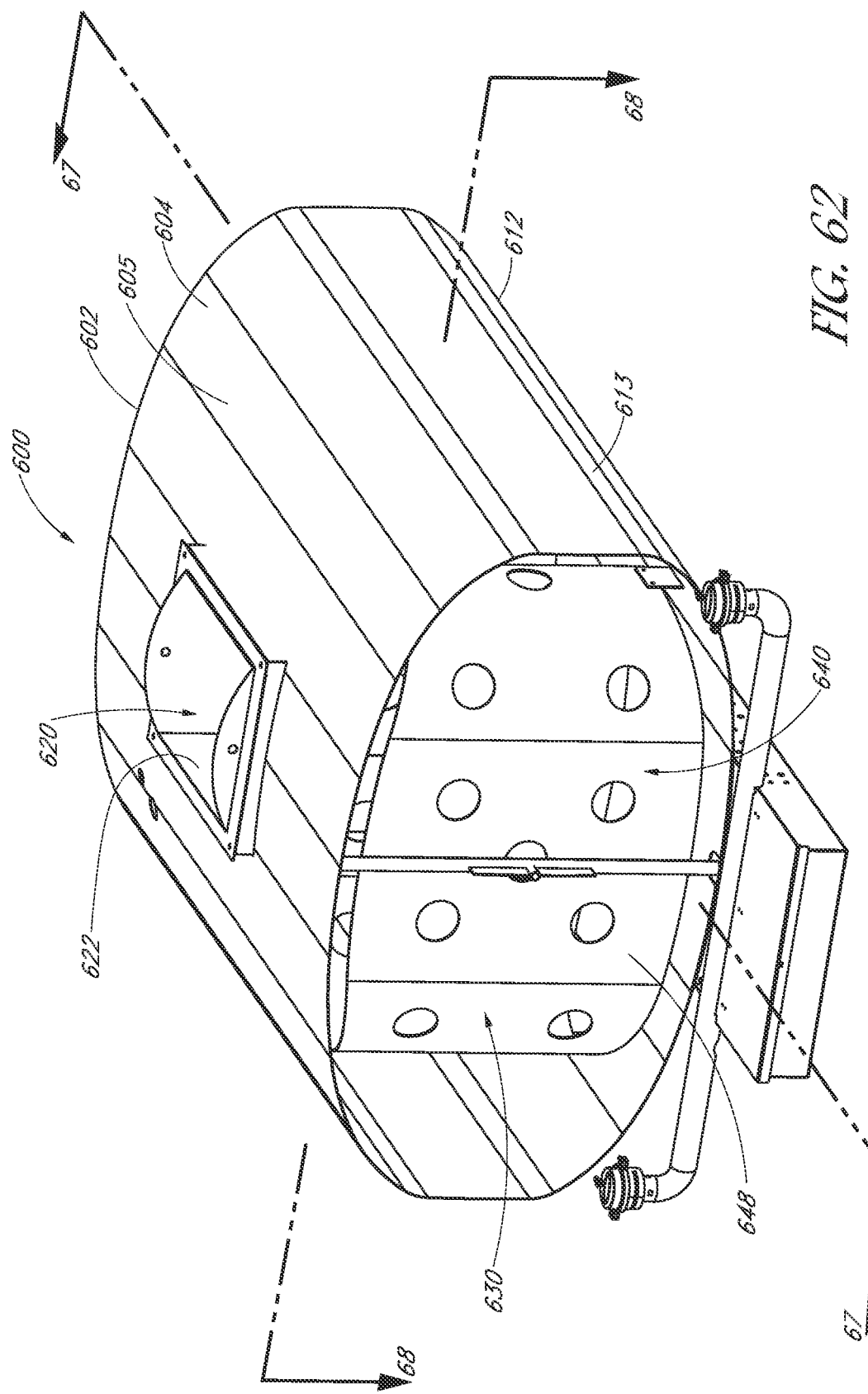

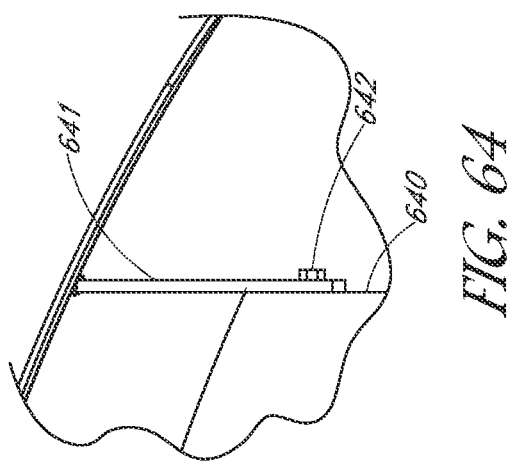
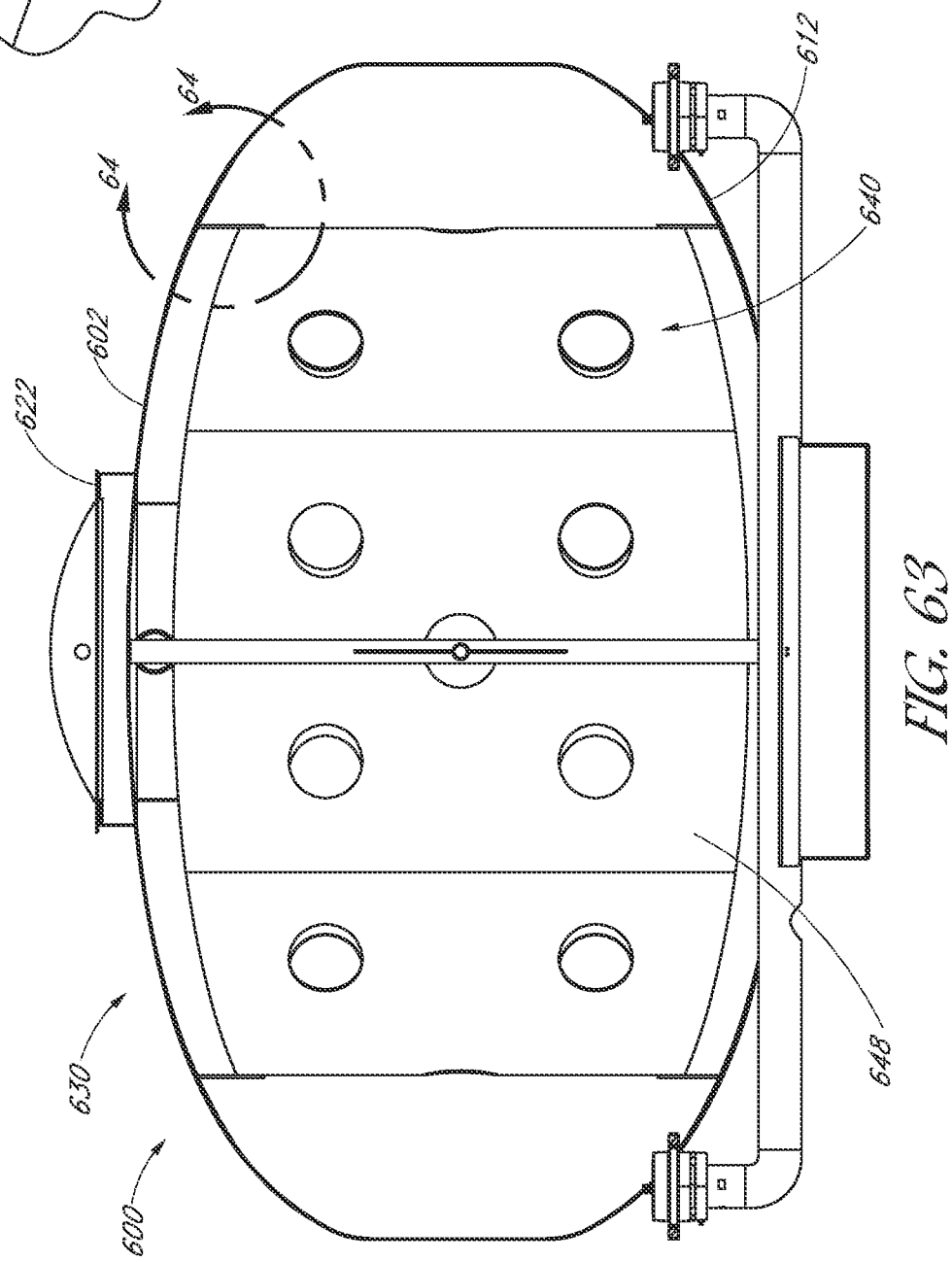

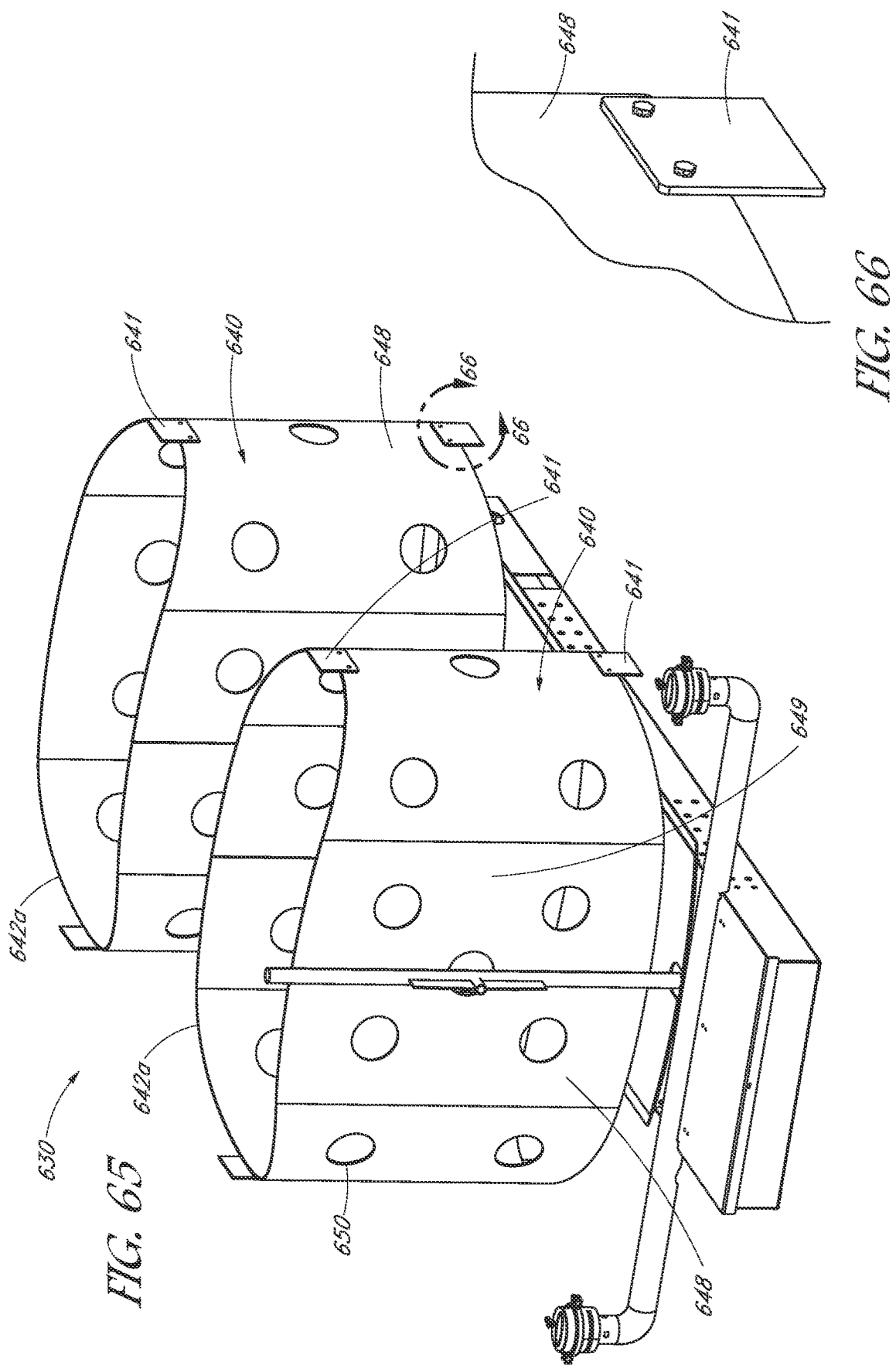

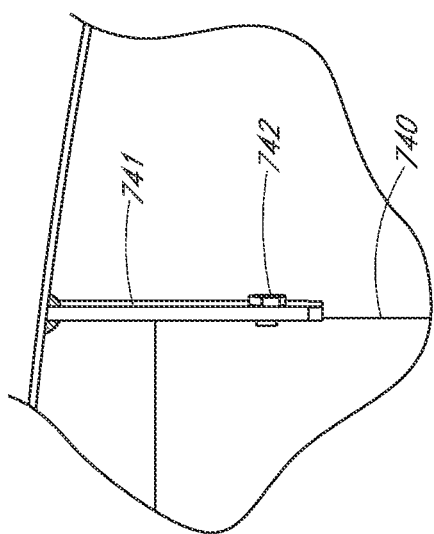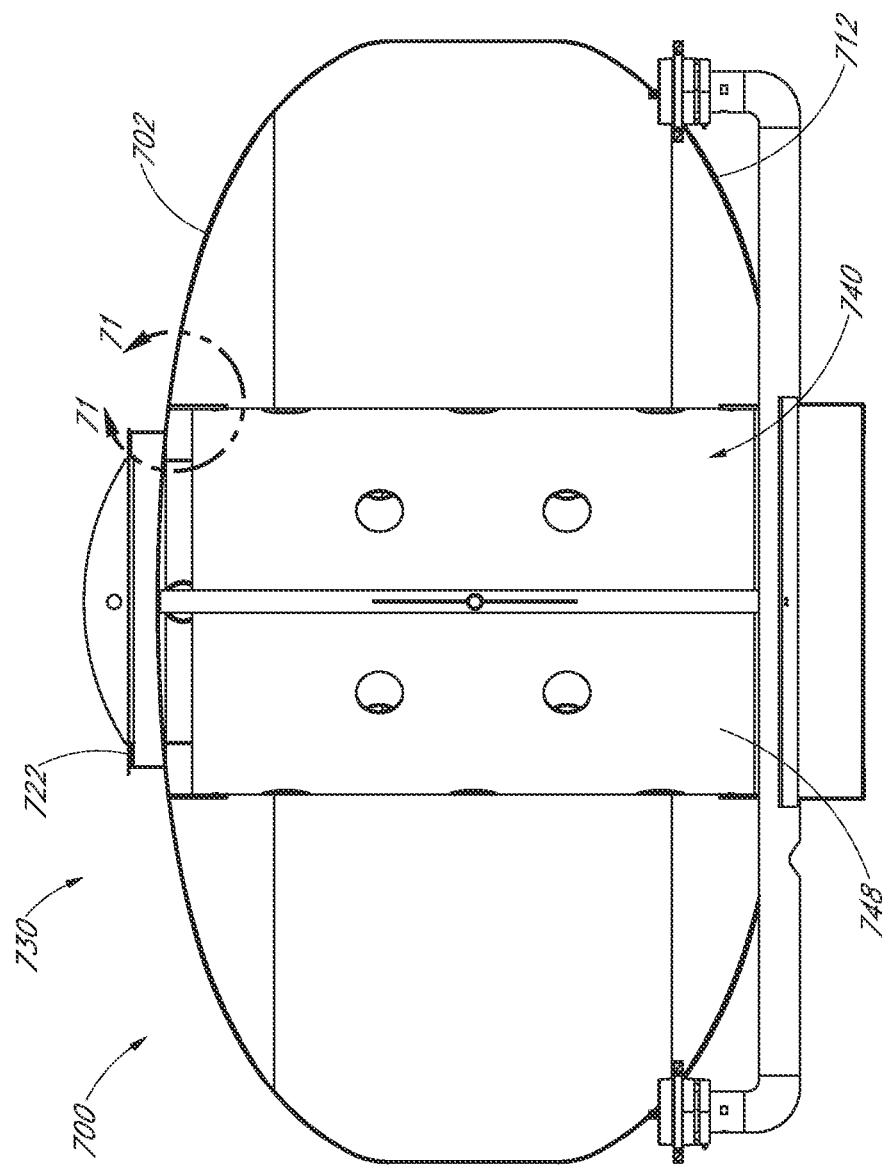

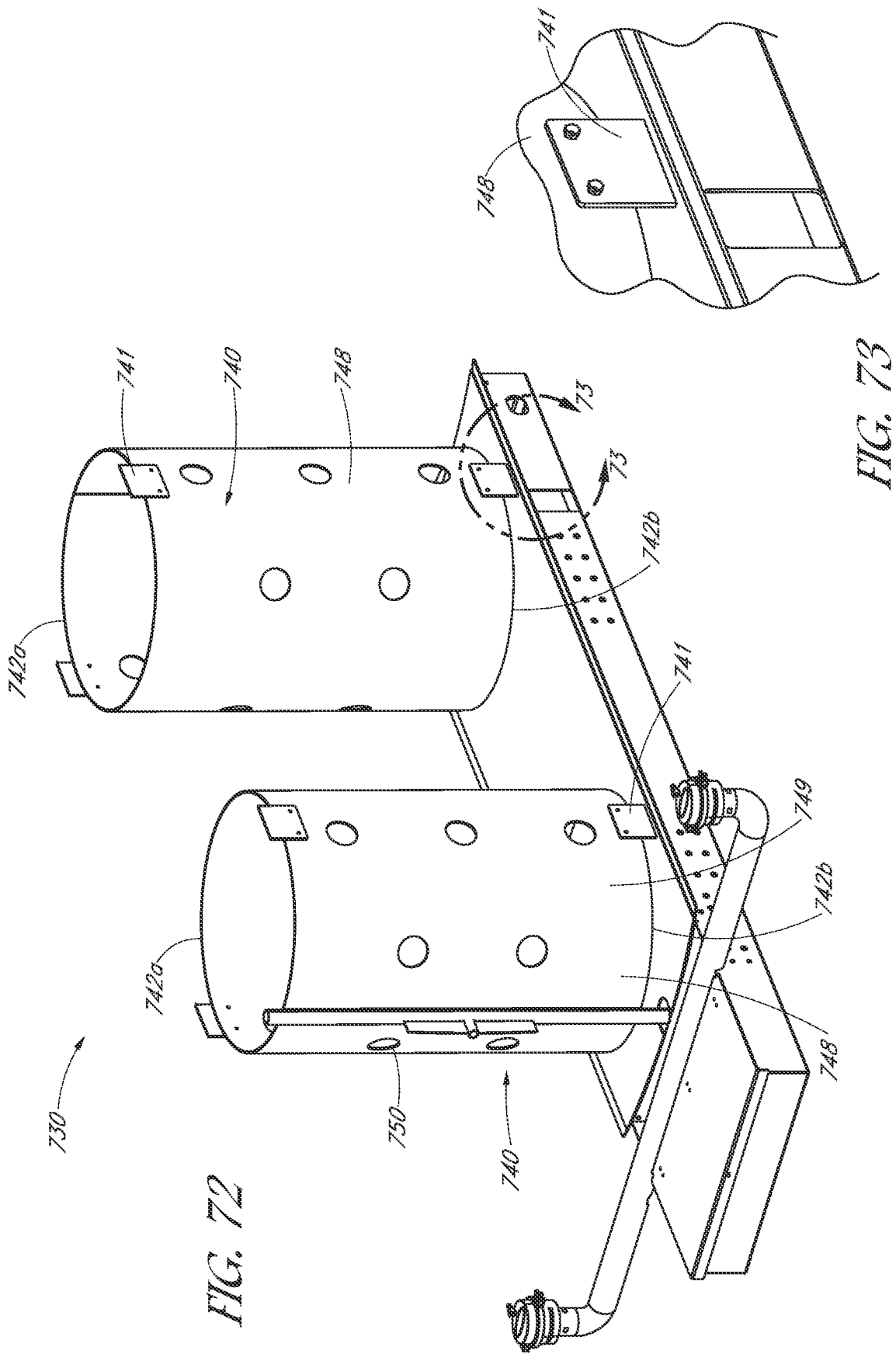

TANK FOR TRANSPORTING LIQUIDS

CROSS-REFERENCE TO RELATED APPLICATION

This application is a divisional application of U.S. patent application Ser. No. 16/988,527, filed Aug. 7, 2020, and entitled "TANK FOR TRANSPORTING LIQUIDS," which claims benefit under 35 U.S.C. 119(e) to U.S. Provisional Patent App. No. 62/885,128, filed Aug. 9, 2019 and U.S. Provisional Patent App. No. 62/984,154, filed Mar. 2, 2020, the entire disclosures of which are hereby incorporated by reference herein in their entireties. Any and all priority claims identified in the Application Data Sheet, or any corrections thereto, are hereby incorporated by reference under 37 CFR 1.57.

FIELD

This disclosure generally relates to tanks for transporting liquids.

BACKGROUND

Tanks are used to transport liquids. Tanks can include internal baffles designed to control the movement of the liquid inside the tank during transport, such as on a plane, train, or motor vehicle. Tank baffles stabilize liquid surge in partially filled tanks and enhance safety in a range of tank sizes and applications. Liquid transport tanks are often manufactured as a one-piece tank having a continuous outer wall.

SUMMARY

The devices of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description," one will understand how the features of this invention provide several advantages over current designs.

An aspect of the present disclosure is a tank for transporting a liquid, the tank comprising a plurality of walls forming a receptacle configured to receive the liquid, a plurality of posts disposed in the receptacle and securable relative to the plurality of walls, and a plurality of baffles, each baffle having at least one wall forming an internal cavity and one or more holes in the at least one wall, the one or more holes being configured to permit flow of the liquid between the internal cavity of the baffle and a volume external to the baffle, the baffle being sized and shaped to receive one of the plurality of posts, the post configured to inhibit at least lateral motion of the baffle relative to the tank.

A further aspect of the tank includes a mounting plate coupled with an upper end of the post, a lower end of the post being insertable through an aperture in the plurality of walls and into an upper end of the baffle.

A further aspect of the tank includes a sleeve coupled with a lower surface of the plurality of walls, the lower end of the post insertable into an upper end of the sleeve.

A further aspect of the tank includes a base support, the base support coupled with the sleeve and configured to support the baffle above the lower surface.

A further aspect of the tank includes a mounting sleeve, the mounting sleeve coupled with an upper surface of the plurality of walls, the lower end of the post insertable through the mounting sleeve.

A further aspect of the tank includes a mount coupled to an internal surface of the plurality of walls, the post being releasably securable to the mount.

A further aspect of the tank is where the internal surface is an upper surface of the plurality of walls.

A further aspect of the tank includes a hinge coupling the post to the internal surface of the plurality of walls, wherein the post is rotatable about the hinge.

A further aspect of the tank is where the internal surface is a lower surface of the plurality of walls, and wherein the hinge is coupled to the lower surface.

A further aspect of the tank is where the plurality of posts is configured to move between a secured configuration and a tilted configuration within the tank to install or remove the plurality of baffles from the plurality of posts.

A further aspect of the tank is where the plurality of baffles includes at least one or more of a 55 gallon plastic drum and a 35 gallon plastic drum.

An aspect of the present disclosure is a tank for transporting a liquid, the tank comprises a plurality of walls forming a receptacle configured to receive the liquid, a plurality of baffles having at least one wall forming an internal cavity and one or more holes in the at least one wall, the one or more holes being configured to permit flow of the liquid between the internal cavity of the baffle and a volume external to the baffle, and a plurality of posts coupled within the tank and movable between a secured configuration and a tilted configuration to install or remove the plurality of baffles from the plurality of posts. The plurality of posts are sized and shaped to support the plurality of baffles and inhibit at least lateral motion of the plurality of baffles relative to the tank when the plurality of posts are supporting the plurality of baffles and in the secured configuration.

A further aspect of the tank includes an upper mount, the upper mount including a lower member releasably coupled with an upper end of the post, and an upper member coupled with an upper surface of the plurality of walls.

A further aspect of the tank includes a lower hinge coupled with a lower surface of the plurality of walls, the lower hinge coupled with a lower end of the post.

A further aspect of the tank is where the plurality of baffles include at least one or more of a 55 gallon plastic drum and a 35 gallon plastic drum.

An aspect of the present disclosure is a method of installing a baffle system in a tank. The method includes inserting a baffle comprising an outer wall with a plurality of apertures therethrough within an interior of the tank, inserting a post through the outer wall of the baffle to inhibit at least lateral motion of the baffle relative to the tank, and securing an end of the post to an internal surface of the tank.

A further aspect of the methods is where securing the end of the post to the internal surface of the tank includes rotating the post between a tilted configuration and a secured configuration.

A further aspect of the methods is where inserting the baffle includes insertion of the baffle through a top opening in the tank.

A further aspect of the methods is where inserting the baffle includes separating the tank into two pieces.

A further aspect of the methods is where inserting the baffle includes insertion through an end of the tank prior to attaching a bulkhead to the end of the tank.

A further aspect is a tank for transporting a liquid, the tank includes a plurality of walls forming a receptacle configured to receive the liquid, a carrier disposed in the receptacle and fixed relative to the plurality of walls, the carrier having a plurality of compartments, each compartment of the plurality of compartments having an opening, and a plurality of baffles, each baffle having at least one wall forming an internal cavity and one or more holes in the at least one wall. The one or more holes being configured to permit flow of the liquid between the internal cavity of the baffle and a volume external to the baffle, each baffle of the plurality of baffles being sized and shaped to be inserted and secured in the opening of each compartment of the plurality of compartments to inhibit at least longitudinal and lateral motion of the baffle relative to the tank.

A further aspect of the tank is where each compartment of the plurality of compartments has a ring shape.

A further aspect of the tank is where the plurality of compartments is arranged next to one another so as to be coplanar.

A further aspect of the tank is where the plurality of baffles is arranged next to one another so as to extend in at least a lateral direction across the tank.

A further aspect of the tank is where the plurality of baffles includes at least one or more of a 55 gallon plastic drum and a 35 gallon plastic drum.

A further aspect of the tank is where the plurality of walls comprises a bottom portion and a top portion configured to be joined to the bottom portion to form the receptacle.

A further aspect of the tank includes a plurality of stabilizers, each stabilizer of the plurality of stabilizers being coupled to the bottom portion at a location generally aligned with each opening of the plurality of compartments, each stabilizer being configured to engage with a bottom wall of the at least one wall of the baffle of the plurality of baffles when the baffle is secured in the opening to further inhibit at least longitudinal and lateral motion of the baffle relative to the tank.

A further aspect of the tank is where the bottom wall of the baffle comprises an aperture configured to receive at least a portion of the stabilizer.

A further aspect of the tank is where the carrier is directly coupled to the bottom portion.

A further aspect of the tank is where the bottom portion comprises stainless steel and the top portion comprises fiberglass.

A further aspect of the tank is where the bottom portion comprises stainless steel and the top portion comprises steel.

A further aspect of the tank is where the bottom portion comprises a front wall portion, a rear wall portion, and a bottom wall, and wherein the top portion comprises a front wall portion, a rear wall portion, and a top wall, the front wall portion of the top portion joining to the front wall portion of the bottom portion, the rear wall portion of the top portion joining to the rear wall portion of the bottom portion, and the top wall joining to the bottom wall to form the receptacle.

A further aspect of the tank is where the at least one wall of the baffle comprises a bottom wall and a side wall extending from a surface of the bottom wall, the side wall having a tubular shape, and wherein the one or more holes are disposed in the side wall.

An aspect of the present disclosure is a tank for transporting a liquid. The tank includes a plurality of walls forming a receptacle configured to receive the liquid, a carrier disposed in the receptacle and having a plurality of compartments, and a plurality of baffles, each baffle of the plurality of baffles being sized and shaped to be inserted and secured in a compartment of the plurality of compartments to inhibit at least longitudinal and lateral motion of the baffle relative to the tank.

A further aspect of the tank is where the plurality of walls comprises a bottom portion and a top portion configured to be joined to the bottom portion to form the receptacle.

Further aspects, features and advantages of the present invention will become apparent from the detailed description that follows.

BRIEF DESCRIPTION OF THE DRAWINGS

Various examples are depicted in the accompanying drawings for illustrative purposes and should in no way be interpreted as limiting the scope of the examples. Various features of different disclosed examples can be combined to form additional examples, which are part of this disclosure.

FIG. 1 shows a perspective view of a conventional one-piece tank having two planar bulkheads disposed therein;

FIG. 2 shows one of the two planar bulkheads removed from the tank of FIG. 1;

FIG. 47 is a view similar to FIG. 46A except the bulkhead has been aligned with the opening;

FIG. 48 is an enlarged partial view from FIG. 47 showing weld tabs spaced about the outer perimeter of bulkhead;

FIG. 55 is a partial perspective view of a tank including a baffle system according to another preferred embodiment of the present invention;

FIG. 56 is a side view of the tank from FIG. 55 showing an insertable baffle unit of the baffle system including a post that can be moved between a secured configuration and a tilted configuration within the tank to install or remove a baffle from the post;

FIG. 57 is a front view of the tank from FIG. 55 showing the insertable baffle unit in the tilted configuration;

FIG. 58 is a partial perspective view of the tank showing the insertable baffle unit in the secured configuration and supporting a baffle;

FIG. 59 is a side view of the tank from FIG. 58;

FIG. 60 is a front view of the tank from FIG. 58 showing the insertable baffle unit in the secured configuration;

FIG. 62 is a rear perspective view of a tank with an outer bulkhead removed to show a baffle system that includes insertable baffle units that have an oval shape according to another preferred embodiment of the present invention;

FIG. 63 is a rear view of the tank in FIG. 62 with the outer bulkhead removed to show exemplary attachment locations for attaching the insertable baffle units to the tank;

FIG. 64 is a close-up view of one of the upper attachment locations from FIG. 63 showing a bracket welded to the tank with the insertable baffle unit attached to the bracket with a fastener;

FIG. 65 is similar to FIG. 62 except a portion of the tank has been removed to show a lower attachment location for attaching the insertable baffle units to the tank;

FIG. 66 is a close-up view of one of the lower attachment locations from FIG. 65 showing a bracket that is welded to the tank with the insertable baffle units attached to the bracket with a fastener;

FIG. 70 is a rear view of the tank in FIG. 69 with the outer bulkhead removed to show exemplary attachment locations for attaching the insertable baffle units to the tank;

FIG. 71 is a close-up view of one of the upper attachment locations from FIG. 70 showing a bracket welded to the tank with the insertable baffle units attached to the bracket with a fastener;

FIG. 72 is similar to FIG. 69 except a portion of the tank has been removed to show a lower attachment location for attaching the insertable baffle units to the tank;

FIG. 73 is a close-up view of one of the lower attachment locations from FIG. 72 showing a bracket that is welded to the tank with the insertable baffle units attached to the bracket with a fastener;

DETAILED DESCRIPTION

Figure 3:
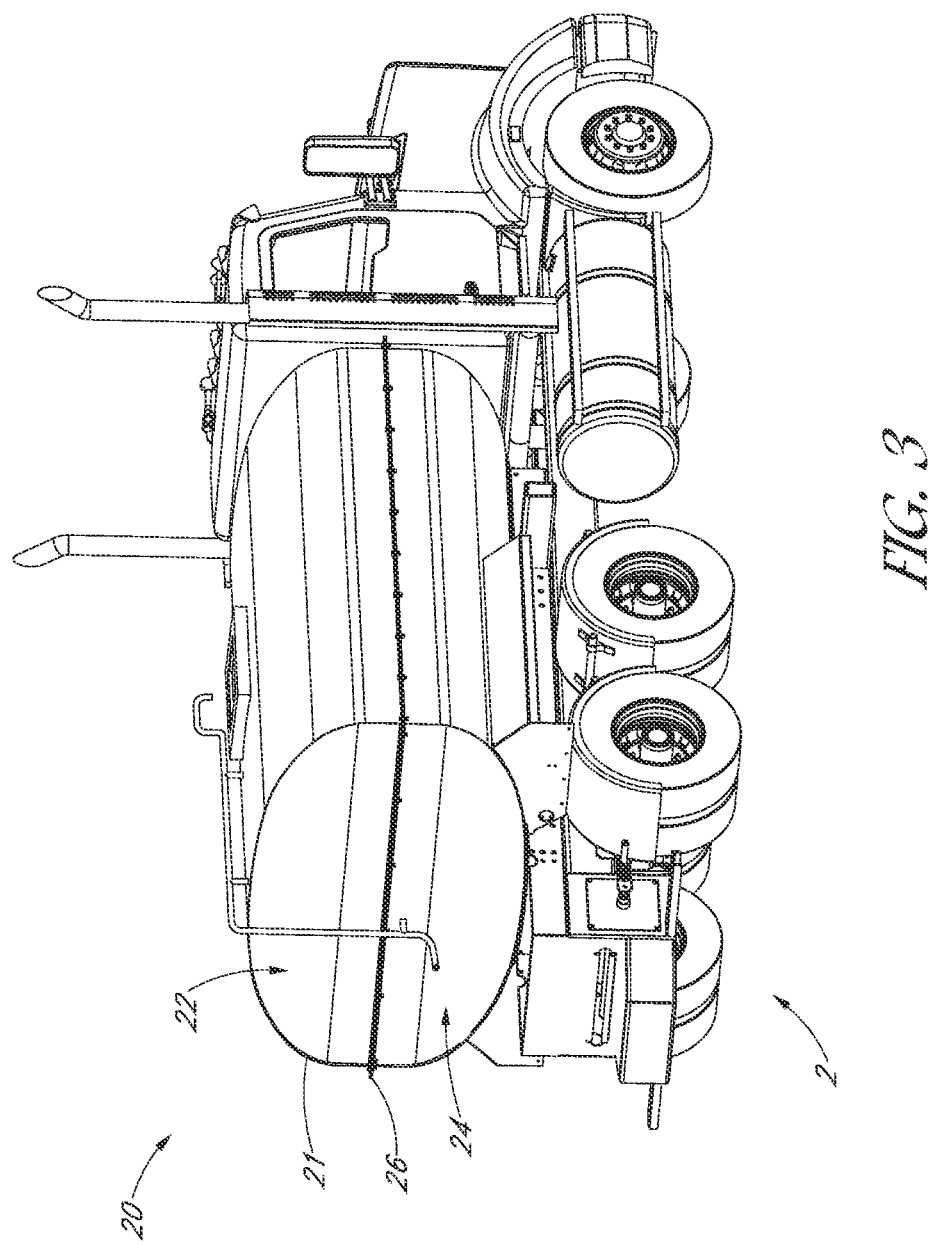
FIG. 3 shows a perspective view of a two-piece tank according to a preferred embodiment of the present invention on a truck chassis.
Figure 4:
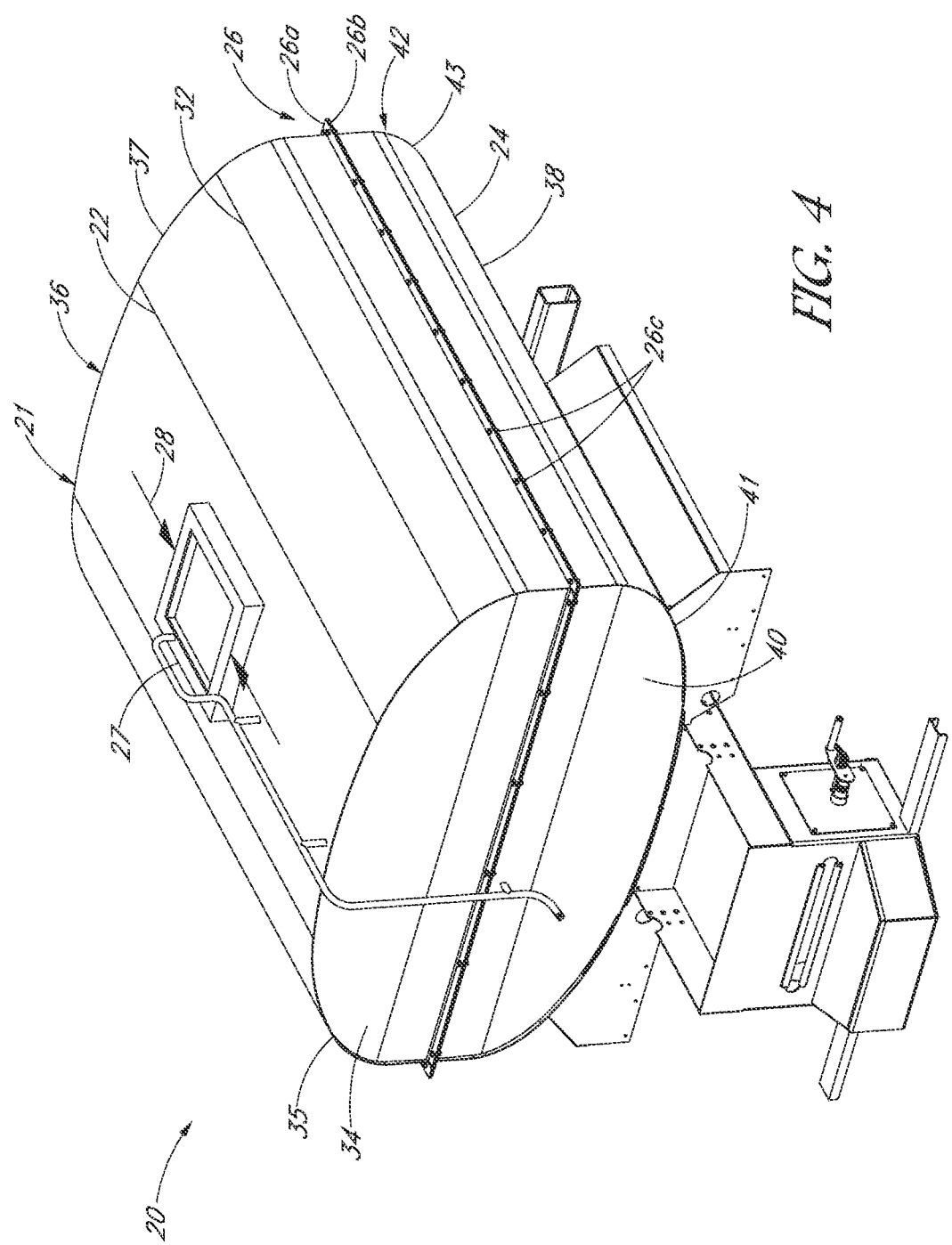
FIG. 4 shows a rear perspective view of the tank from FIG. 3 removed from the truck chassis.
Figure 5:
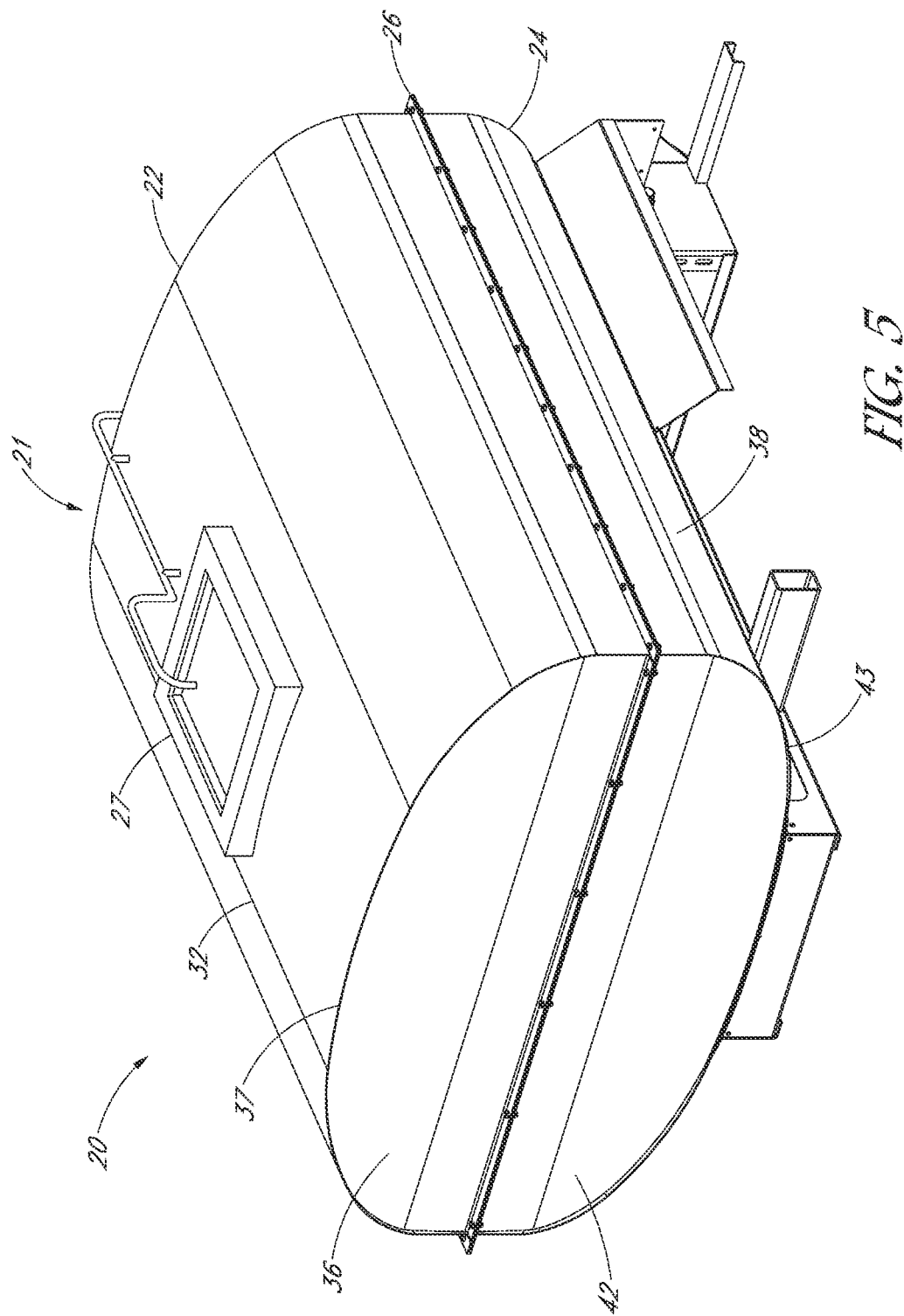
FIG. 5 shows a front perspective view of the tank of FIG. 4.

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Conventional Tanks

FIG. 1 shows a perspective view of a conventional one-piece tank 1 having two planar bulkheads 5, 7 disposed therein. FIG. 2 shows one of the two planar bulkheads 5, 7 removed from the tank 1 of FIG. 1. The bulkheads 5, 7 are generally formed as flat plates or wall-like structures that fit inside the tank 1. The bulkheads can be assembled within the tank 1 through an enlarged opening 3. The bulkhead 5, 7 can also include a plurality of mounting brackets 11. The mounting brackets 11 can couple the bulkhead 5, 7 with outer walls of the tank 1. The bulkhead 5, 7 can include one or more apertures 9. The bulkhead 5, 7 can include first and second sides 13, 14. The bulkhead 5, 7 can include a bottom 15.

The bulkheads 5, 7 can divide the tank 1 into zones. Liquid can flow between the zones through spaces between the bulkhead's sides 13, 14, bottom 15 and/or the one or more apertures 9. The one or more apertures 9 can allow a technician to access the zones within the tank 1. The bulkheads 5, 7 at least partially slow the movement of the liquid in the tank 1 during transportation. The bulkheads 5, 7 can thereby lower the risk of destabilizing the tank 1 during transport due to liquid surge.

The conventional tank 1 has several disadvantages. The opening 3 must be large enough to accommodate installation, maintenance, and/or replacement of the bulkheads 5, 7. Further, it may not be preferred to require technicians to perform certain manufacturing steps in a space such as in the tank 1. Larger openings require larger lids or plates for enclosing the tank 1 for liquid storage or transport. Larger lids or plates introduce unnecessary complexity to closing and maintaining a seal of the tank 1. This can be especially difficult where the opening 3 and corresponding lid is non-circular (e.g., rectangular) as shown in FIG. 1.

The bulkheads 5, 7 can corrode over time, which can require replacement of the entire tank 1. The steel plate structure of the bulkheads 5, 7 can be very heavy. Accordingly, the bulkheads 5, 7 are difficult to assemble within the tank 1 and/or require the use of specialized equipment that may not be readily available at certain locations. The weight and shape of the bulkheads 5, 7 can also pose challenges during installation of the bulkheads 5, 7. Accordingly an improved design for a tank for storing and transporting liquids is desirable.

Improved Tank

FIG. 3 shows a perspective view of a two-piece tank 20 according to a preferred embodiment of the present invention on a truck chassis or support 2. The tank 20 can have various uses. For example, the tank 20 can be used in the petroleum industry for the storage or transportation of fuel or oil in liquid form. Other exemplary uses include storage or transportation of liquids in the farming, forestry, construction, mining, chemical, water, or other industries. The tank 20 can comply with relevant NFPA (National Fire Protection Agency) standards regarding baffles.

In certain embodiments, the support 2 can be used for storing and/or transporting the tank 20. In certain embodiments, the support 2 can be a motor vehicle or other transportation means. In certain embodiments, the tank 20 can be attached with the support 2, either permanently or temporarily. In certain embodiments, the tank 20 can rest on the support 2.

In certain embodiments, the tank 20 includes an outer wall 21. In certain embodiments, the outer wall 21 can encase an interior space forming a receptacle. In certain embodiments, the receptacle can be used for storage of a liquid. In certain embodiments, the outer wall 21 can contain the liquid. In certain embodiments, the receptacle can optionally be filled with the liquid and emptied of the liquid as needed.

In certain embodiments, the outer wall 21 can include a plurality of panels. In certain embodiments, the panels can be curved and/or flat regions that together form the outer wall 21 that encloses the receptacle. In certain embodiments, the outer wall 21 can have a form factor. In certain embodiments, the form factor can generally be or include rectangular, circular, hexagonal, elliptical, polygonal, irregular, or any other suitable prism shapes.

In certain embodiments, the outer wall 21 can include a top portion 22. In certain embodiments, the outer wall 21 can include a bottom portion 24. In certain embodiments, the top portion 22 and the bottom portion 24 can cooperate to enclose the receptacle. In certain embodiments, the top portion 22 and the bottom portion 24 can each include a singular piece and/or a single material. The top portion 22 and the bottom portion 24 can include steel, stainless steel, galvanized steel, plastic, aluminum, fiberglass, Strenex, chrome-ally, galvanneal, enduraplas, or any other suitable material. In certain embodiments, the top portion 22 and the bottom portion 24 can be formed out of a plurality of connected panels. In some implementations, the material of the top portion 22 can be the same as the material of the bottom portion 24. In other implementations, the top portion 22 can be a different material than the bottom portion 24. In one implementation the bottom portion 24 is a steel or stainless steel and the top portion 22 is a fiberglass material. In another implementation the bottom portion 24 is a stainless steel and the top portion 22 is a steel. Any other combination of the above materials is contemplated herein.

In certain embodiments, the top portion 22 and the bottom portion 24 can connect at an interface 26. In certain embodiments, the interface 26 can extend along a horizontal plane dividing the top portion 22 from the bottom portion 24. In other implementations, the interface 26 can be located within multiple different planes. In other implementations, the interface 26 can include multiple protrusions and interlocking valleys. In other implementations, the interface 26 can be located within a non-horizontal plane.

In certain embodiments, the interface 26 can be an assembly of flanges 26a, 26b. The flanges 26a, 26b can be overlapping, abutting, or otherwise arranged. In certain embodiments, the interface 26 can include one or more welds, mechanical fasteners, other attachment mechanisms to connect and/or otherwise seal together the top portion 22 and the bottom portion 24. In certain embodiments, the mechanical fasteners include, for example, nuts and bolts for attaching together the top portion 22 and the bottom portion 24. The interface 26 can facilitate assembly of the tank 20 or repair of the tank 20. The assembly process of the interface 26 can avoid the need for entry into confined spaces (e.g., within the tank 20) in compliance with various state and federal confined spaces regulations.

The inclusion of the top portion 22 and the bottom portion 24 in the tank 20 can have various advantages. In certain embodiments, the top portion 22 can be separately manufactured from the bottom portion 24. Accordingly, the materials of the top and bottom portions 22, 24 can differ. The top portion 22 can be removable from the bottom portion 24 to enhance cleaning of the receptacle. The top portion 22 can be removable from the bottom portion 24 to facilitate repairing the tank 20. One of the top or bottom portions 22, 24 can be easily replaced. The top portion 22 can be removable from the bottom portion 24 to allow for a baffle and carrier system (as described below) to be installed, maintained, or removed.

With respect to FIGS. 4 through 11, in certain embodiments, the top portion 22 can include a plurality of panels. In certain embodiments, the panels can be connected to each other along one or more edges or seams. The top portion 22 can include an upper panel 32. In certain embodiments, the upper panel 32 can be a curved sheet. In certain embodiments, the top portion 22 can include an upper rear panel 34. The upper rear panel 34 can be a flat or curved panel. In certain embodiments, the upper rear wall panel 34 can connect with the upper panel 32 along an edge 35. In certain embodiments, the edge 35 can be a welded connection or a joint interface. In certain embodiments, the top portion 22 can include an upper front panel 36. In certain embodiments, the upper front panel 36 can be a flat or curved panel. In certain embodiments, the upper front panel 36 can connect with the upper panel 32 along an edge 37. In certain embodiments, the edge 37 can be a welded connection or a joint connection.

With respect to FIGS. 4 through 11, in certain embodiments, the bottom portion 24 can include a plurality of panels. In certain embodiments, the panels can be connected to each other along one or more edges or seams. In certain embodiments, the bottom portion 24 can include a lower panel 38. The lower panel 38 can be a curved sheet. In certain embodiments, the lower panel 38 can contact the support 2. In certain embodiments, the bottom portion 24 can include a lower rear panel 40. In certain embodiments, the lower rear panel 40 can be a flat or curved panel. In certain embodiments, the lower rear wall panel 40 can connect with the lower panel 38 along an edge 41. In certain embodiments, the edge 41 can be a welded connection or a joint interface. In certain embodiments, the bottom portion 24 can include a lower front panel 42. In certain embodiments, the lower front panel 42 can be a flat or curved panel. In certain embodiments, the lower front panel 42 can connect with the lower panel 38 along an edge 43. In certain embodiments, the edge 43 can be a welded connection or a joint connection.

In certain embodiments, the interface 26 can include an upper flange 26a. In certain embodiments, the upper flange 26a can be connected with the top portion 22. In certain embodiments, the upper flange 26a can extend outwardly (or inwardly) from the top portion 22. In certain embodiments, the upper flange 26a can extend around the interface 26. In certain embodiments, the upper flange 26a can be generally a rectangular shape, depending on the overall form factor of the tank 20.

Figure 12:
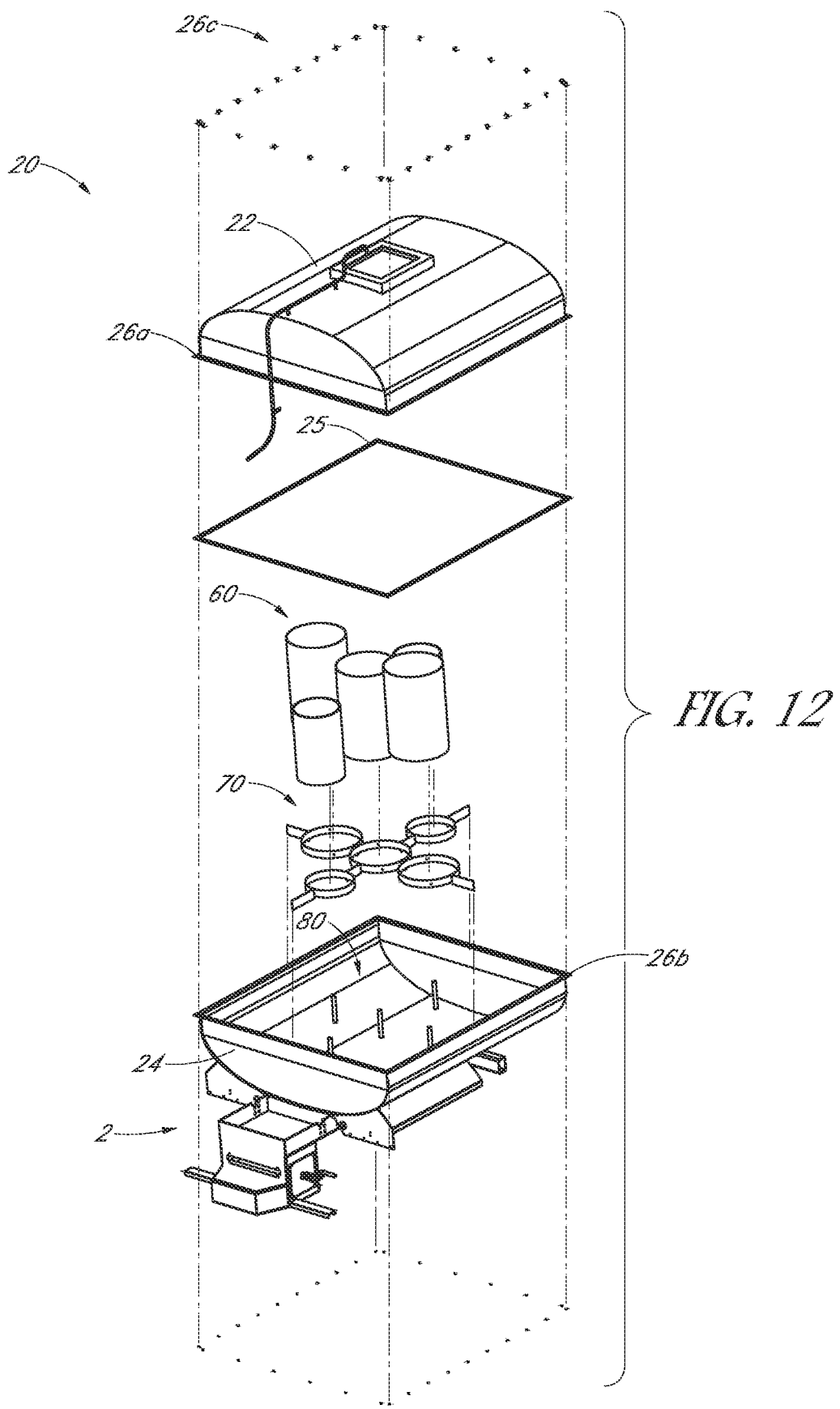
FIG. 12 shows an exploded view of the tank of FIG. 4 showing an embodiment of a baffle system that includes a carrier and a plurality of baffles.
Figure 13:
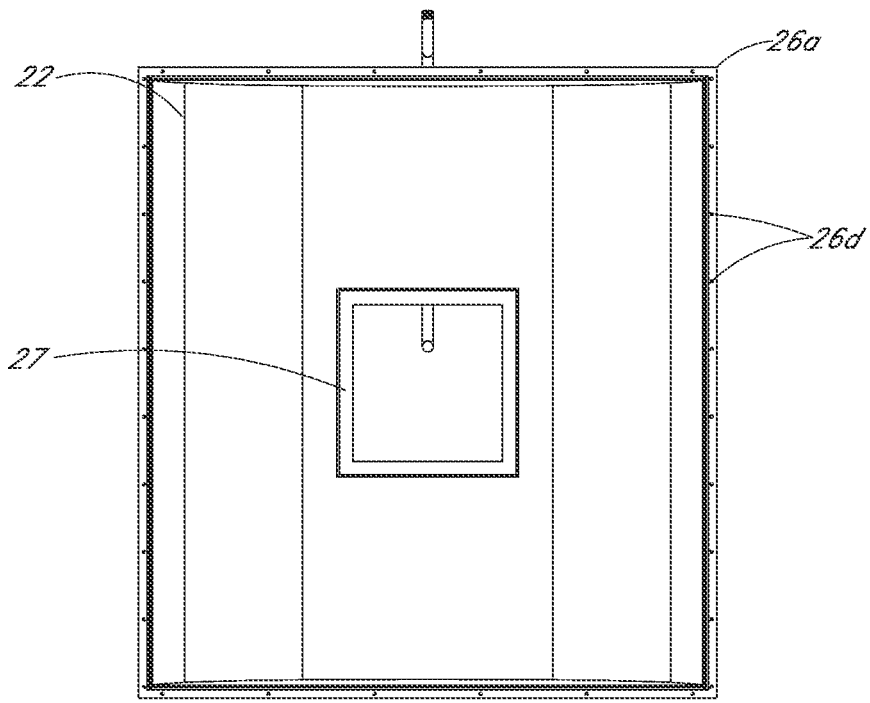
FIG. 13 shows a section view taken along the line of 13-13 in FIG. 10.

In certain embodiments, the interface 26 can include a lower flange 26b. In certain embodiments, the lower flange 26b can be connected with the bottom portion 24. In certain embodiments, the lower flange 26b can extend outwardly (or inwardly) from the bottom portion 24. In certain embodiments, the lower flange 26b can extend around the interface 26. In certain embodiments, the lower flange 26b can have a generally rectangular shape. In certain embodiments, the upper and lower flanges 26a, 26b can be aligned in an assembled state of the tank 20. A plurality of fasteners 26c (see also FIG. 12) can extend through corresponding apertures in the upper and lower flanges 26a, 26b to attach the top and bottom portions 22, 24. In certain embodiments, the plurality of fasteners 26c include, for example, nuts and bolts for attaching together the top portion 22 and the bottom portion 24.

In certain embodiments, the tank 20 can include an opening 27. The opening 27 can extend through the outer wall 21 into the receptacle. In certain embodiments, the opening 27 can be in the shape of a square having width 28. The opening 27 can be in the top portion 22, although this is not required. In certain embodiments, the opening 27 can be located on the upper panel 32. The opening 27 can provide a pathway for filling a liquid within the tank 20. In certain embodiments, the opening 27 can be used in conjunction with a lid or plug for enclosing the tank 20 to contain liquid therein. In certain embodiments, the tank 20 can also include a drain in the bottom portion 24 (not shown).

With reference to FIGS. 12 through 16, in certain embodiments, the tank 20 can include a gasket 25. In certain embodiments, the gasket 25 can be formed of a rubber, silicone, polymer, foam or other suitable gasket material. In certain embodiments, the gasket 25 can be sandwiched between the upper flange 26a and the lower flange 26b in the interface 26. In certain embodiments, the gasket 25 be sized to fit between corresponding faces of the upper flange 26a and the lower flange 26b. The fasteners 26c be assembled through corresponding apertures 26d, 26e in the respective upper and lower flanges 26a, 26b.

In certain embodiments, the tank 20 can include a plurality of baffles 60. In certain embodiments, the plurality of baffles 60 can be held in place by one or more carriers 70 within the receptacle. In certain embodiments, the carrier 70 can include a plurality of compartments for receiving corresponding baffles of the plurality of baffles 60.

In certain embodiments, the carrier 70 can include any of the materials listed above for the top and bottom portions 22, 24. In certain embodiments, the carrier 70 can be located in the bottom portion 24. The material of the carrier 70 can be the same as or different than the material of the bottom portion 24.

Figure 10:
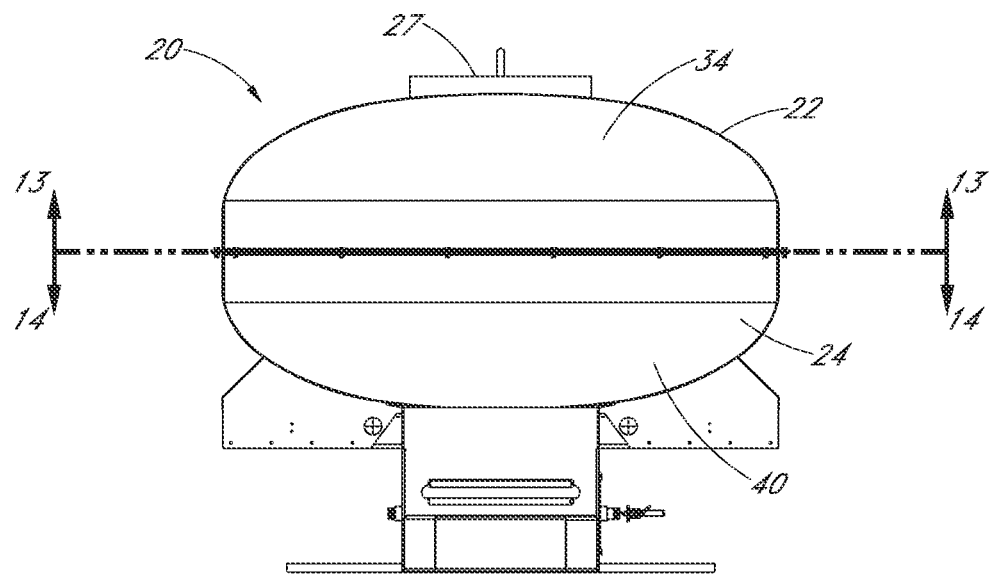
FIG. 10 shows a rear view of the tank of FIG. 4.
Figure 11:
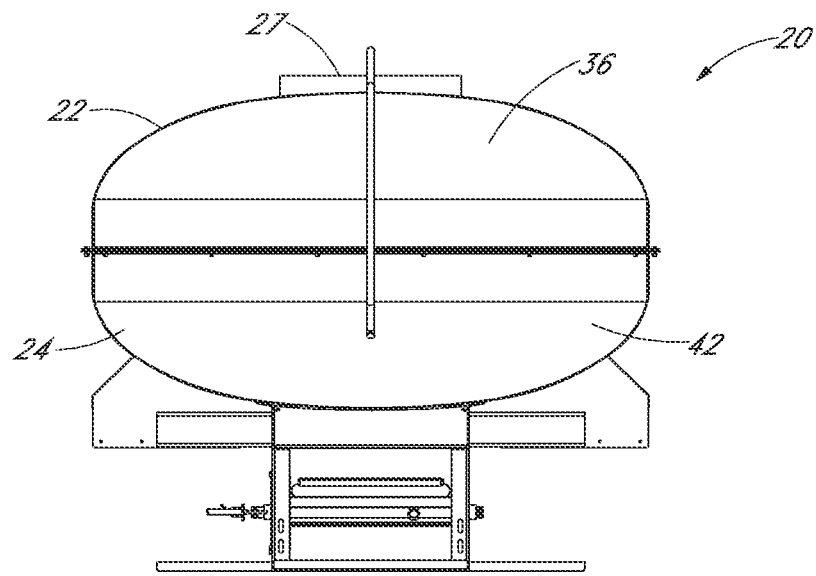
FIG. 11 shows a front view of the tank of FIG. 4.
Figure 14:
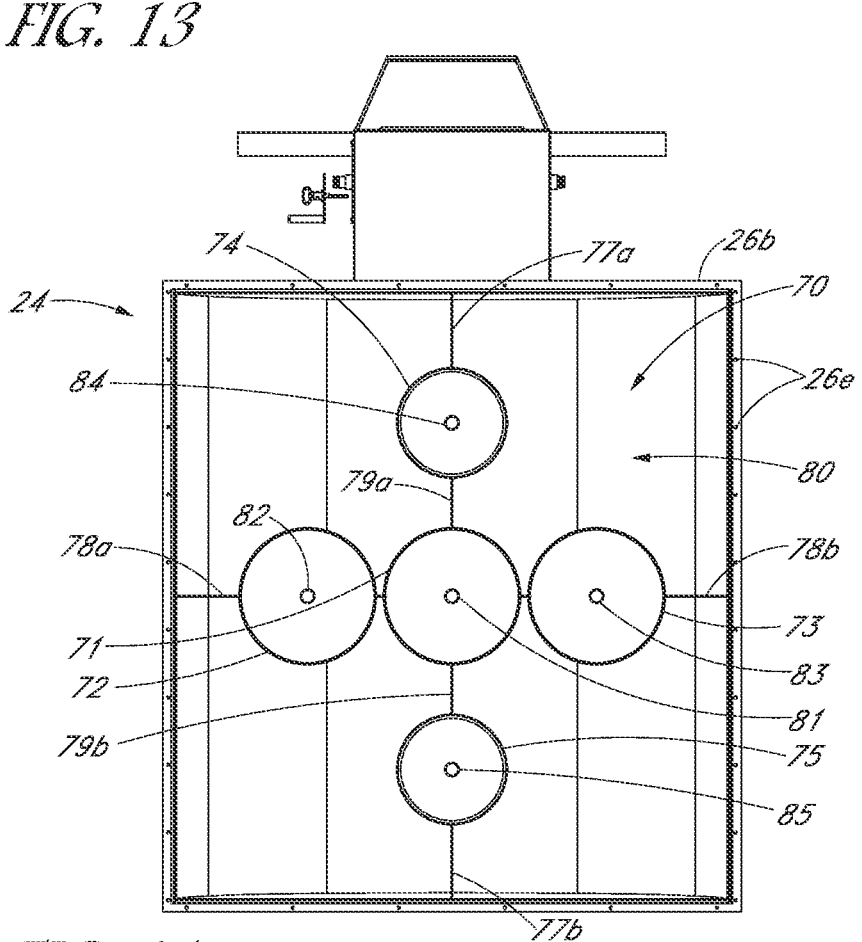
FIG. 14 shows a section view taken along the line 14-14 in FIG. 10 with the plurality of baffles removed from the carrier.

FIG. 14 shows a section view taken along the line 14-14 in FIG. 10 with the plurality of baffles 60 removed from the carrier 70. In certain embodiments, the carrier 70 can be directly or indirectly supported by the outer wall 21 in the bottom portion 24. In certain embodiments, the attachment of the carrier 70 with the bottom portion 24 can be through a mechanical engagement such as welding, mechanical fasteners, or the like. In certain embodiments, a rear end of the carrier 70 can be connected with the lower rear panel 40. In certain embodiments, the rear end of the carrier 70 can include an extension 77a. In certain embodiments, a front end of the carrier 70 can be connected with the lower front panel 42. In certain embodiments, the front end of the carrier 70 can include an extension 77b. In certain embodiments, the extensions 77a and/or 77b can position the carrier 70 within the bottom portion 24.

In certain embodiments, a right end of the carrier 70 can be connected with the lower panel 38. In certain embodiments, the right end of the carrier 70 can include an extension 78a. In certain embodiments, a left end of the carrier 70 can be connected with the lower panel 38. In certain embodiments, the left end of the carrier 70 can include an extension 78b.

In certain embodiments, the one or more extensions 77a, 77b, 78a and/or 78b can position the carrier 70 within the bottom portion 24. In certain embodiments, the position of the carrier 70 within the bottom portion 24 can be centered and/or under the opening 27. This arrangement can provide the advantage of making the maintenance or replacement of the baffles 60 easier by increasing ease-of-access. In certain embodiments that include a two-piece tank 20, the top portion 22 can be simply removed from the bottom portion 24 to repair or replace the plurality of baffles 60.

In certain embodiments, the one or more extensions 77a, 77b, 78a and/or 78b can be pieces of planar material. In certain embodiments, the extensions 77a, 77b, 78a and/or 78b can also include brackets. In certain embodiments, the brackets can be welded or mechanically fastened to the outer wall 21. In certain embodiments, the one or more extensions 77a, 77b, 78a and/or 78b can position the carrier 70 within 48 inches of all outer walls.

Any number of compartments can be included in the carrier 70. In certain embodiments, the carrier 70 can include 2 to 15 compartments. The carrier 70 can include a first compartment 71. In certain embodiments, the compartment 71 can be formed of a band of material. The material can include steel, stainless steel, plastic, or other suitable material. In certain embodiments, the compartment 71 can be shaped for receiving a corresponding baffle of the plurality of baffles 60. In certain embodiments, the compartment 71 can be circular. In other implementations, the compartment 71 can be rectangular, elliptical, hexagonal, polygonal, irregular or other shape. The compartment 71 can have a diameter or length and width. In certain embodiments, the diameter and/or length/width can be sized to receive the corresponding baffle.

In certain embodiments, the carrier 70 can include a second compartment 72. The second compartment 72 can have the same structure as the first compartment 71. The carrier 70 can include a third compartment 73. The third compartment 73 can the same structure as the compartment 71. Alternatively, the second and/or third compartments 72, 73 can be shaped differently than the compartment 71. The carrier 70 can include fourth and/or fifth compartments 74, 75. The fourth and/or fifth compartments 74, 75 can have the same structure as the compartment 71.

The carrier 70 can be formed by the connected compartments 71 to 75. In certain embodiments, the first compartment 71 can be a central portion of the carrier 70. The compartments 72 to 75 can connect to the first compartment 71. In certain embodiments, the carrier 70 can be formed generally within a single plane. In other implementations, the carrier 70 can be formed within offset planes. In other implementations, the carrier 70 can be adjusted according to the size and shape of the tank 20. The compartments 71 to 75 can be distributed in lateral and/or longitudinal directions within the tank 20.

In certain embodiments, the carrier 70 can include one or more interconnecting sections 79a, 79b. The interconnecting sections 79a, 79b can connect between adjacent compartments 71 to 75. In certain embodiments, the interconnecting sections 79a, 79b can include flat segments, brackets, or other shapes. Alternatively, or in addition, the compartments 71 to 75 can be welded together.

In certain embodiments, the carrier 70 can be permanently fixed in the bottom portion 24. The baffles 60 can be removable and/or replaceable within the carrier 70. Accordingly, the carrier 70 can be advantageously formed out of a more robust material (depending on the liquid that is intending to be stored within the tank 20) than the baffles 60.

Figure 6:
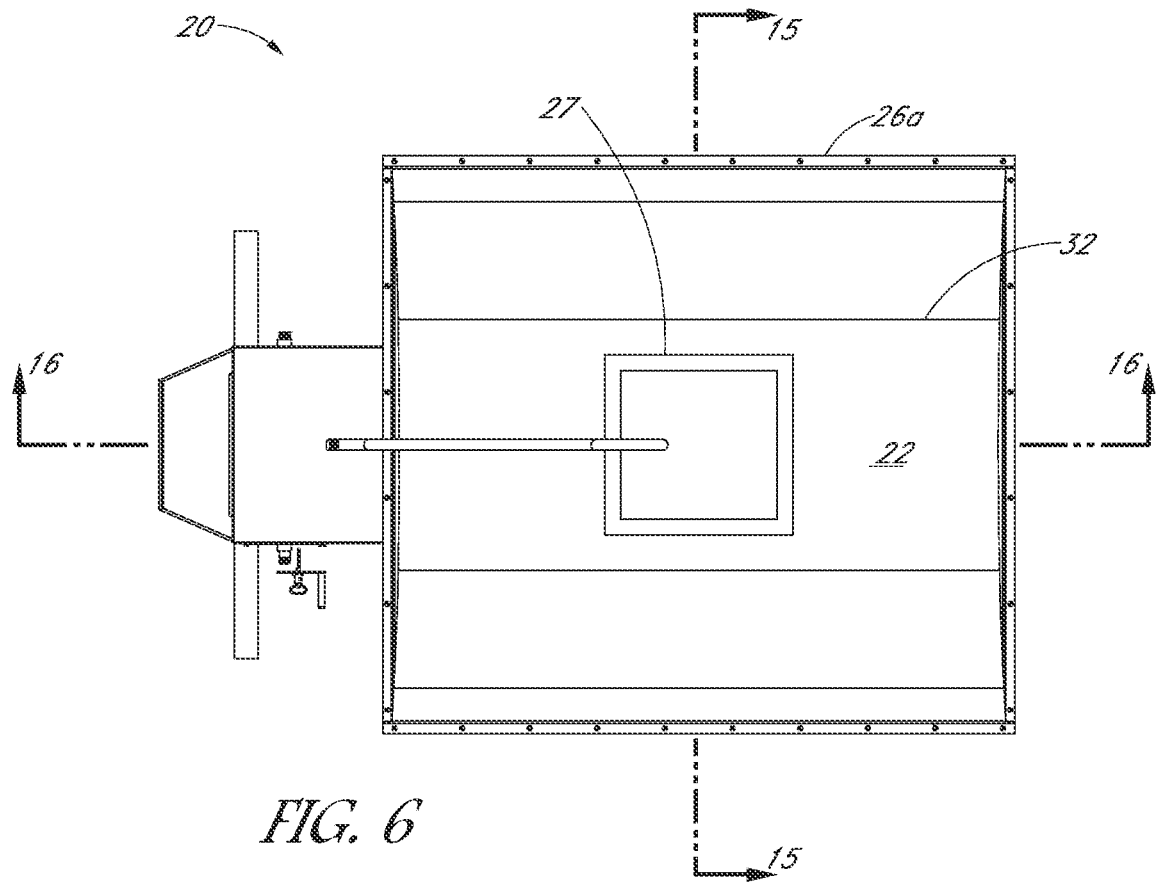
FIG. 6 shows a top view of the tank of FIG. 4.
Figure 7:
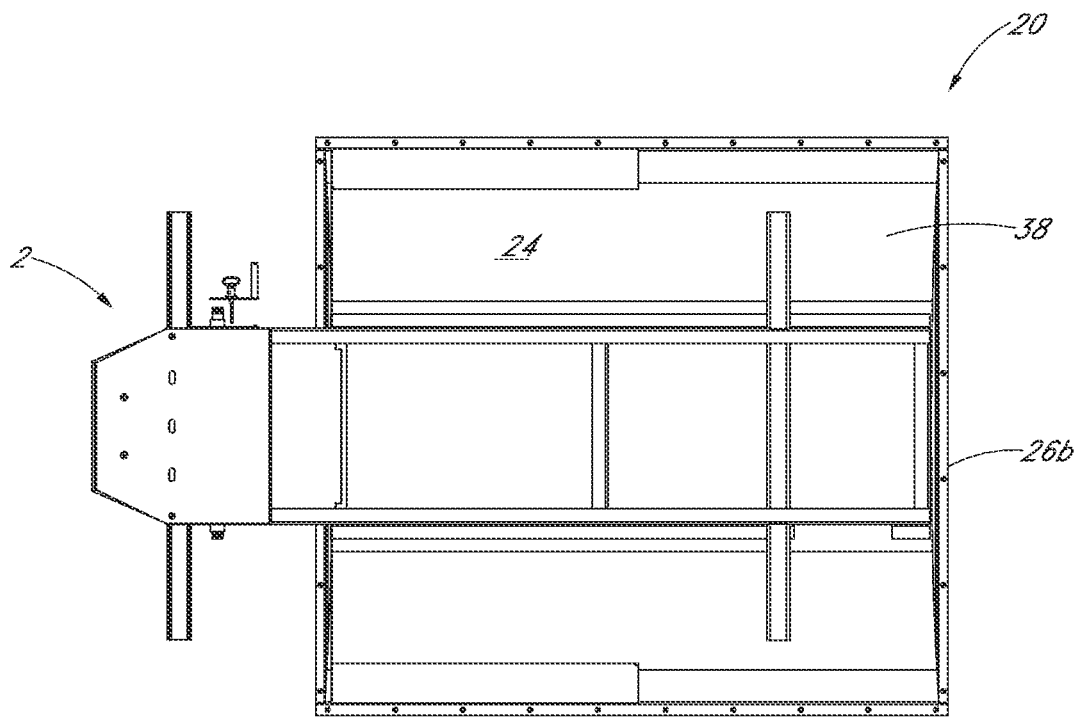
FIG. 7 shows a bottom view of the tank of FIG. 4.
Figure 8:
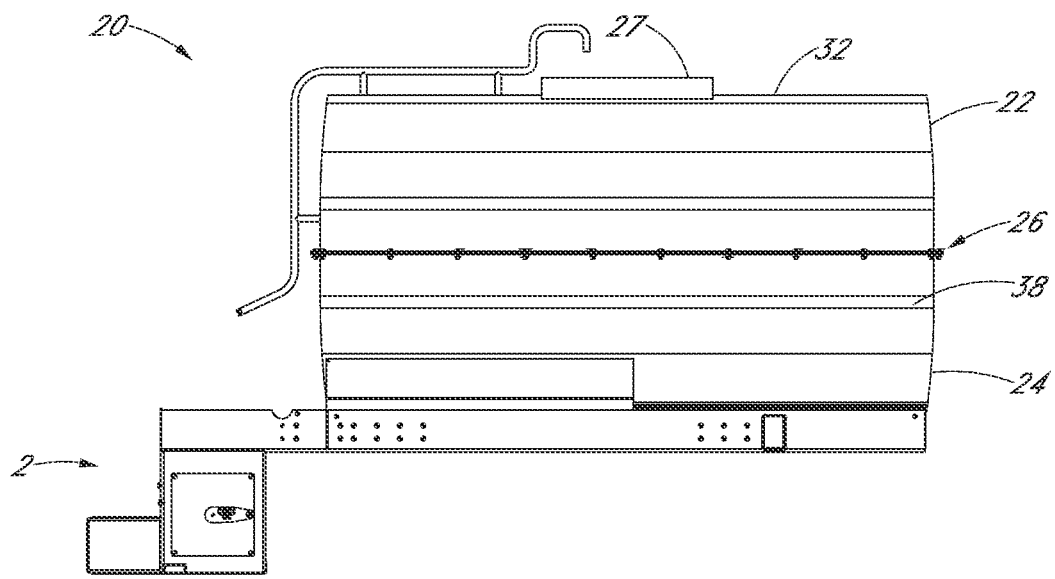
FIG. 8 shows a right-side view of the tank of FIG. 4.
Figure 9:
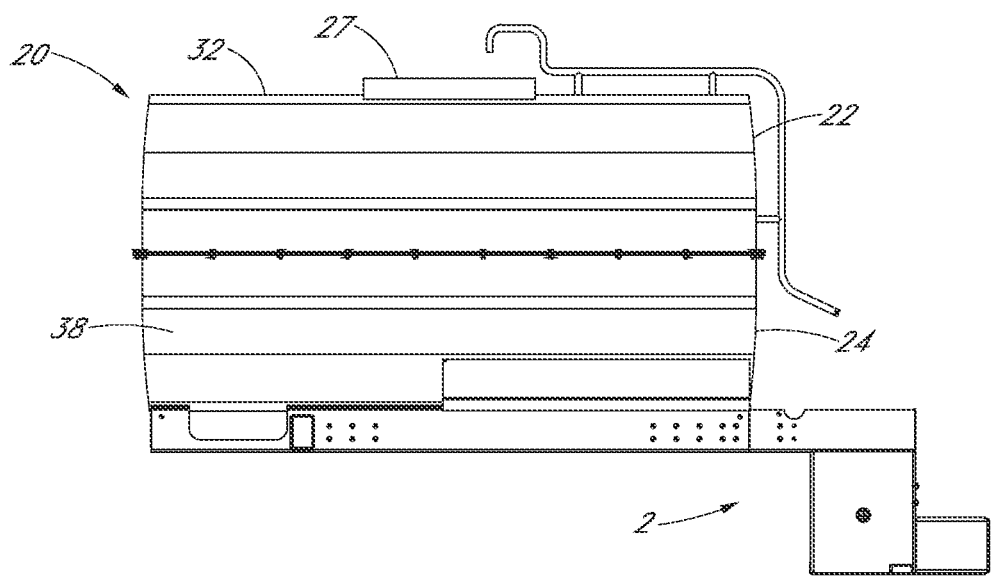
FIG. 9 shows a left-side view of the tank of FIG. 4.
Figure 15:
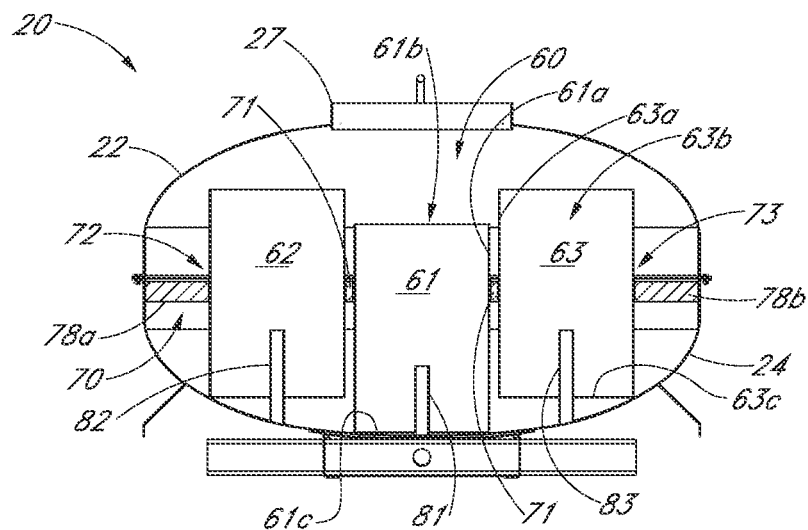
FIG. 15 shows a section view taken along the line 15-15 in FIG. 6 showing the carrier and the plurality of baffles.
Figure 16:
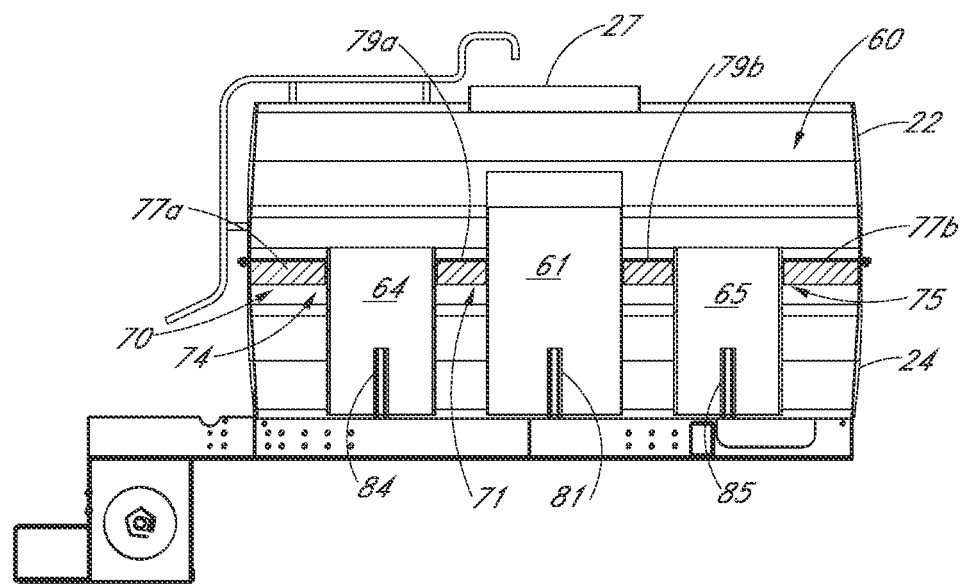
FIG. 16 shows a section view taken along the line 16-16 in FIG. 6 showing the carrier and the plurality of baffles.
Figure 17:
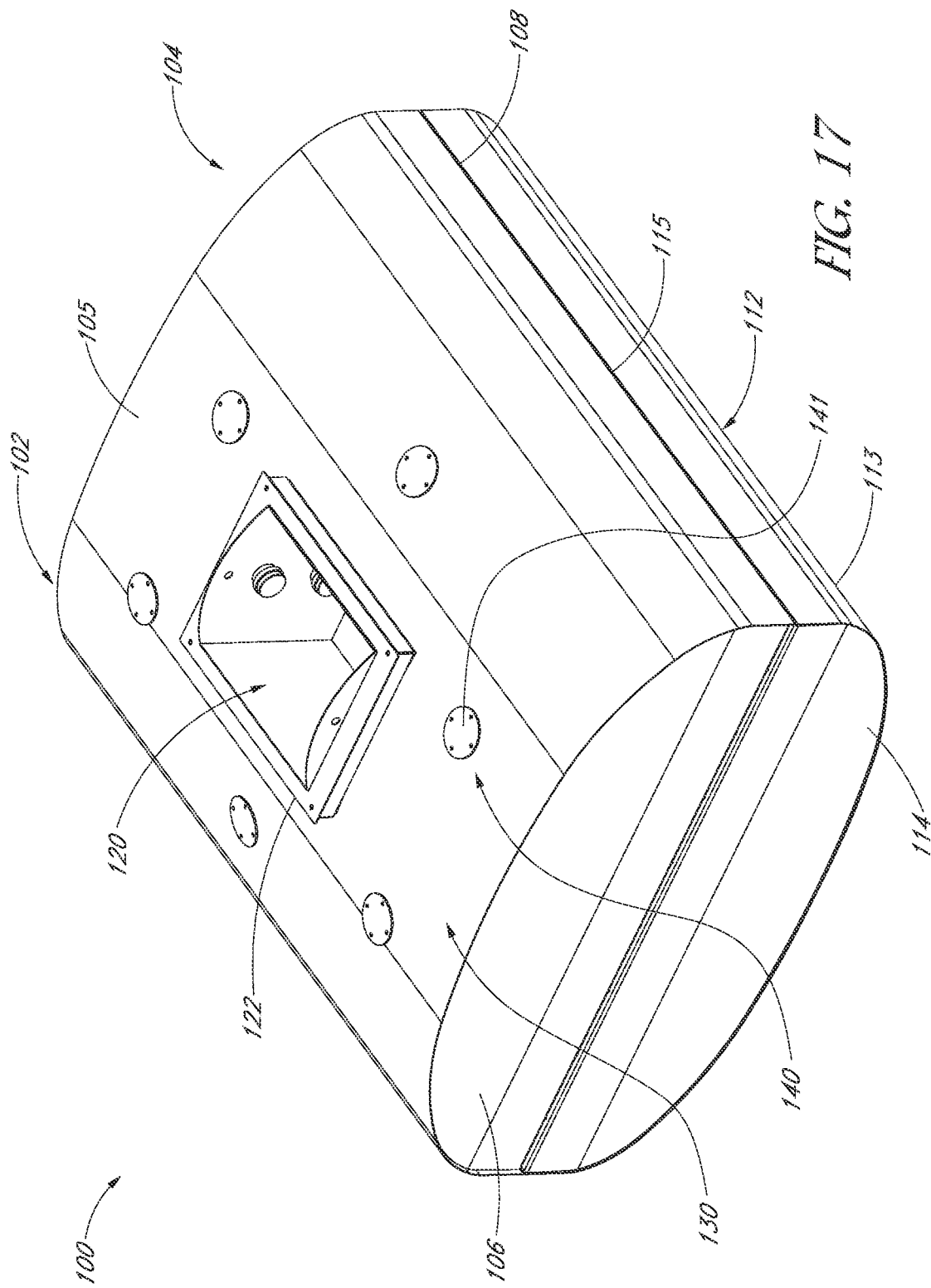
FIG. 17 is a perspective view of a two-piece tank including a baffle system according to another preferred embodiment of the present invention.
Figure 18:
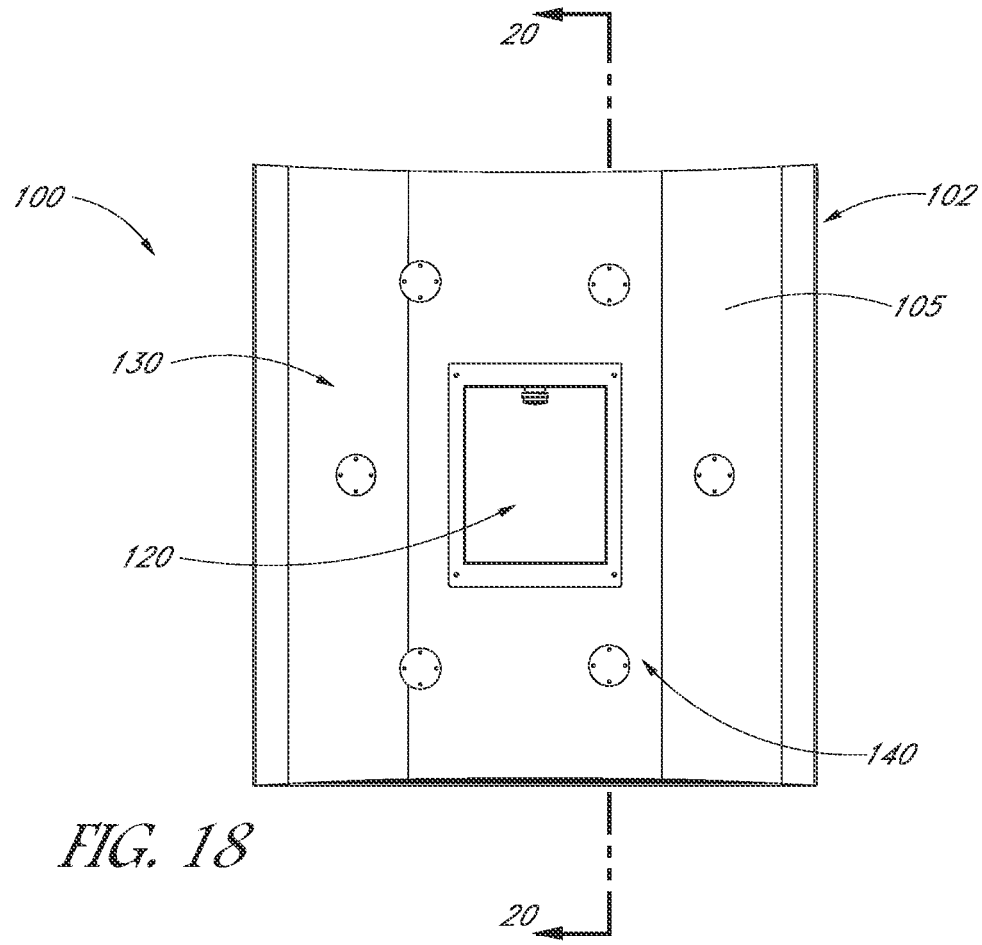
FIG. 18 is a top view of the tank of FIG. 17.
Figure 19:
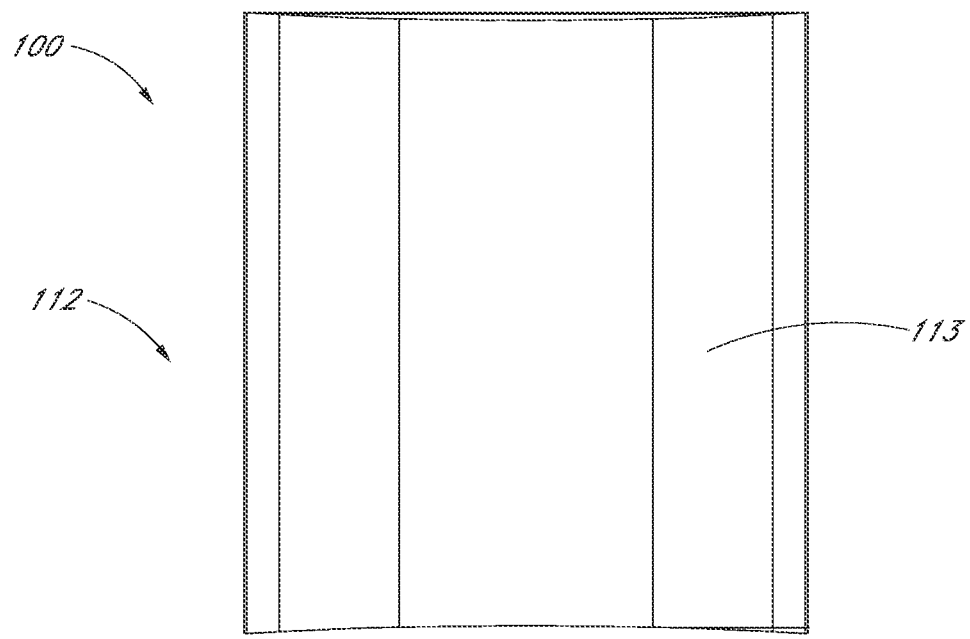
FIG. 19 is a bottom view of the tank of FIG. 17.

FIG. 15 shows a section view taken along the line 15-15 in FIG. 6 showing the carrier 70 and the plurality of baffles 60. FIG. 16 shows a section view taken along the line 16-16 in FIG. 6 showing the carrier 70 and the plurality of baffles 60. Any number of baffles can be included in the plurality of baffles 60. In certain embodiments, the plurality of baffles 60 can include 2 to 15 baffles. The plurality of baffles 60 can be assembled within the carrier 70. The plurality of baffles 60 can include a first baffle 61. The baffle 61 can comprise a metal, plastic or other material. In certain implementations, the baffle 61 can be a plastic barrel. The plastic barrel can be in a standard size, such as a 35 or 55 gallon tote or drum. In some implementations, the plastic barrel has a height of 51.5 inches. In some implementations, the plastic barrel has a diameter of 29 inches. The barrels can be circular, rectangular, square, or have another cross-sectional shape. In certain embodiments, the barrels can be bolted together. In certain embodiments, the barrels can comprise field-grade plastic.

In certain embodiments, the baffle 61 can include an outer wall 61a. In certain embodiments, the outer wall 61a can include therein a plurality of holes or openings therein. The holes or openings can allow the liquid in the receptacle to flow through the baffle 61. The holes or openings can restrict the flow of the liquid within the receptacle. The holes or openings can allow liquid to fill and drain from the tank 20. The baffle 61 can include an opening 61b into an internal space within the first baffle 61. The first baffle 61 can include a bottom panel 61c. The bottom panel 61c can include one or more holes or opening therein. In some implementations, a fastener, such as a screw, secures the baffle 61 to the compartment 71.

The plurality of baffles 60 can further include second, third, fourth, and/or fifth baffles 62, 63, 64, 65. Any or all of baffles 62 to 65 can have the same structures and/or materials as the baffle 61. Any or all of baffles 62 to 65 can include the same dimensions or different dimensions as the baffle 61.

In certain embodiments, the compartment 71 can be sized to receive the baffle 61. In certain embodiments, the compartment 71 can generally keep the baffle 61 in place within the tank 20. Similarly, the compartments 72 to 75 can be sized to receive the respective baffles 62-65. The compartments 72 to 75 can generally keep the baffles 62 to 65 in place within the tank 20.

In certain embodiments, the tank 20 can further include a plurality of stabilizers 80. The stabilizers 80 can be posts extending from the outer wall 21. In certain embodiments, the stabilizers 80 can be coupled with the bottom portion 24. In certain embodiments, the stabilizers 80 can be connected with the lower panel 38. The connection between the stabilizers 80 and the outer wall 21 can be welded, or otherwise mechanically fastened.

In certain embodiments, the tank 20 can include any number of stabilizers 80. The stabilizers 80 can include first, second, third, fourth, and/or fifth stabilizers 81 to 85. In certain embodiments, the compartments 71 to 75 of the carrier 70 can be aligned with or centered on at least a portion of the respective stabilizers 81 to 85. Optionally, multiple stabilizers can be aligned with each of the different compartments.

In certain embodiments, the plurality of stabilizers 80 can be received within openings of the plurality baffles 60. In certain embodiments, the stabilizers 80 can stabilize the positions of the respective baffles 61 to 65 within the carrier 70. In certain embodiments, the stabilizer 81 can be received through an opening in the bottom panel 61c of the baffle 61. Similarly, any of stabilizers 82 to 85 can be received within respected openings in bottom panels 62c to 65c. Optionally, multiple stabilizers 80 can be aligned with each of the baffles 60. In certain embodiments, the stabilizers 80 can include a retention mechanism on a distal end thereof, such as a barb, hook, screw, bend or the like.

In certain embodiments, the tank 20 can include any number of carriers 70. In certain embodiments, the tank 20 can include a sufficient number of carriers 70, having a sufficient number of compartments such that at least one baffle is spaced within 48 inches from each side of the outer wall 21. In certain embodiments, the compartments of the carrier 70 can be distributed longitudinally and laterally within the tank 20. This distribution can be particularly important for off-road vehicles.

The use of barrels (e.g., plastic barrels) as the baffles 60 can be advantages because of cost. Barrels can save approximately 90% of the cost of steel baffles. Moreover, barrels are readily available in many locations. The installation of the carrier 70 can reduce assembly time (relative to the tank 1) by 50% or more. The carrier 70 can enable the baffles 60 (e.g., in the form of barrels) to be easily replaceable, a feature not currently available in the industry.

OTHER EMBODIMENTS

FIGS. 17 to 28D illustrate a two-piece tank 100 for transporting a liquid therein. The tank 100 can be similar to the tank 20, described above. In certain embodiments, the tank 100 can be mountable on a vehicle for transportation the tank 100 with the liquid contained therein. In certain embodiments, the tank 100 can include an outer wall 102. The outer wall 102 can form an enclosed receptacle for containing the liquid. In certain embodiments, the outer wall 102 can comprise a plurality of curved and/or flat wall portions to form the receptacle. In certain embodiments, the outer wall 102 can be formed of one or more thin sheets of metal, plastic or other material.

In certain embodiments, the outer wall 102 can include an upper portion 104. The upper portion 104 can include an upper surface 105. In certain embodiments, the upper portion 104 can include two end surfaces 106. In certain embodiments, the upper surface 105 can be a curved surface. In certain embodiments, the end surfaces 106 can be bulkheads attached with the upper surface 105. In certain embodiments, the upper portion 104 can include a lower lip 108. The lower lip 108 can extend around an outer periphery of the upper portion 104. In certain embodiments, the lower lip 108 can be rectangular, although other shapes are contemplated herein. In certain embodiments, the lower lip 108 can include a flange having one or more openings for receiving a mechanical fastener therein.

In certain embodiments, the outer wall 102 can include a lower portion 112. The lower portion 112 can include a lower surface 113. In certain embodiments, the lower surface 113 can include a curved surface. In certain embodiments, the lower surface 113 can be coupled on one or both ends with two end surfaces 114. The lower portion 112 can include an upper lip 115. In certain embodiments, the upper lip 115 can be rectangular or otherwise shaped. In certain embodiments, the upper lip 115 can include a flange having one or more apertures therein for receiving mechanical fasteners. In certain embodiments, the lower lip 108 can be configured to correspond in size with and/or interface with the upper lip 115. With the lower lip 108 coupled with the upper lip 115, the upper portion 104 together with the lower portion 112 can form the enclosed receptacle.

In certain embodiments, the outer wall 102 can include an opening 120. In certain embodiments, the opening 120 can be located within the upper surface 105. The shape of the opening 120 can provide access into an interior of the tank 100. In certain embodiments, the opening 120 can include an insert 122. The insert 122 can be removable coupled within the opening 120. The insert 122 can enclose or partially enclose the opening 120. In certain embodiments, the insert 122 can be coupled with the upper surface 105. Optionally, the insert 122 includes one or more hose mounting locations.

The tank 100 can include a baffle system 130. The baffle system 130 can generally function to reduce sloshing of liquid within the tank 100 during transportation thereof, as described above with respect to the tank 20. In certain embodiments, the baffle system 130 can include an insertable baffle unit 140. In certain embodiments, the insertable baffle unit 140 can be one of a plurality of the insertable baffle units that are structurally the same or similar to the insertable baffle unit 140. In certain embodiments, the plurality of insertable baffle units 140 can be arranged around the opening 120. In certain embodiments, the plurality of insertable baffle units 140 can be approximately evenly spaced around a circular perimeter of the opening 120. In one implementation, the plurality of insertable baffle units 140 include six units.

In certain embodiments, the insertable baffle unit 140 can include a mounting plate 141. The mounting plate 141 can be a generally planar disc. The mounting plate 141 can comprise a metal or plastic material. In certain embodiments, the mounting plate 141 can have a circular shape. In certain embodiments, the mounting plate 141 can include therein one or more apertures for receiving mechanical fasteners. In certain embodiments, the mechanical fasteners can couple the mounting plate 141 with the upper surface 105. In other implementations, the mounting plate 141 can include a curvature. The curvature can match the curvature of the upper surface 105 to allow the mounting plate 141 to be flush with the upper surface 105 when attached thereto.

Figure 20:
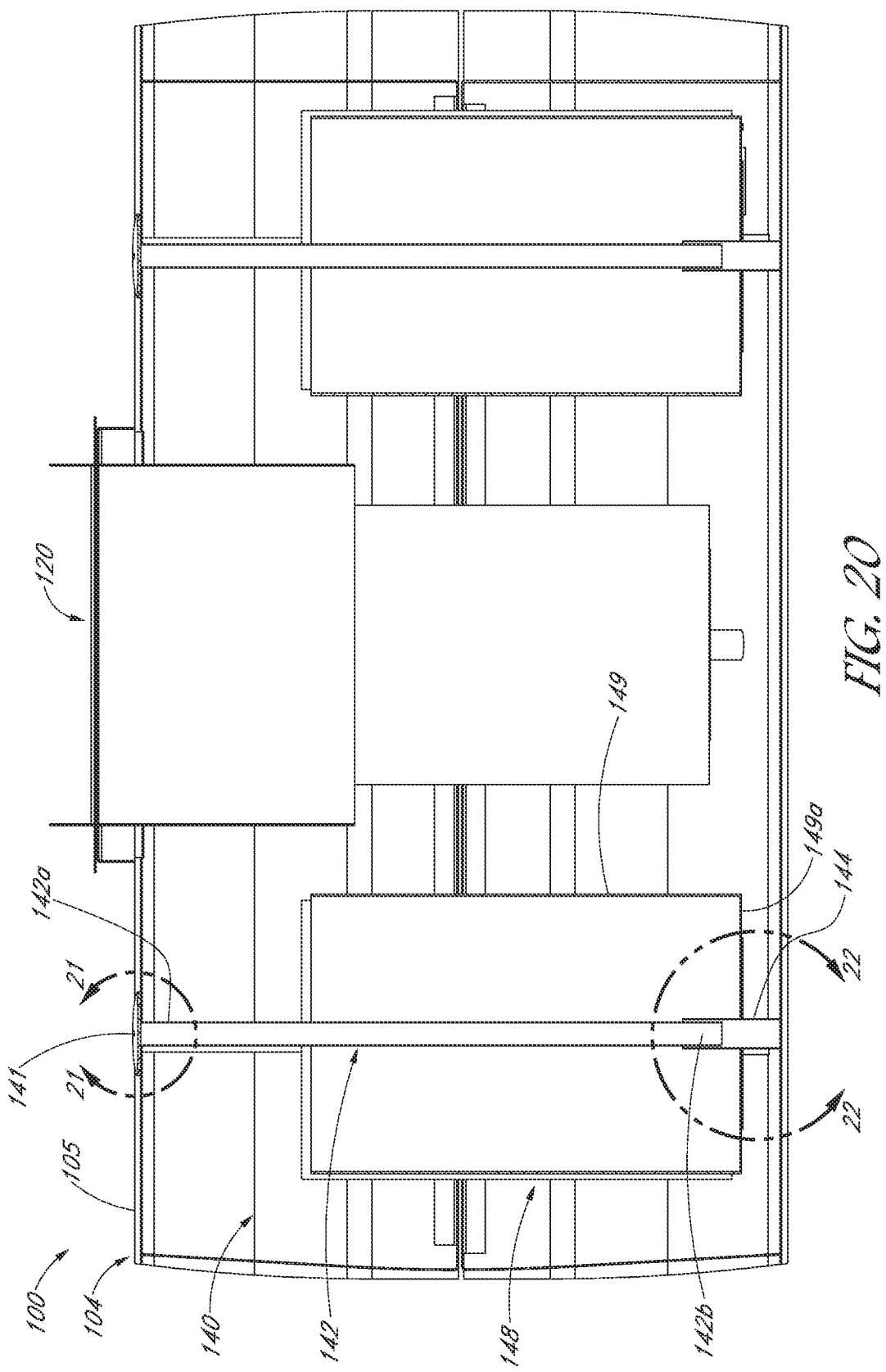
FIG. 20 is a section view taken along the line of 20-20 in FIG. 18 showing an insertable baffle unit of the baffle system.

FIG. 20 shows further detail of the insertable baffle unit 140. In certain embodiments, the insertable baffle unit 140 can include a post 142. In certain embodiments, the post 142 can include an upper end 142a and a lower end 142b. In certain embodiments, a body of the post can extend between the upper end 142a and the lower end 142b. In certain embodiments, a cross-sectional shape of the post 142 can be circular, although this is not required. In other implementations the post 142 can have other cross-sectional shapes such as square, rectangular, oval or other. The post 142 can have a length that is shorter than a height of the tank 100.

Figure 21:
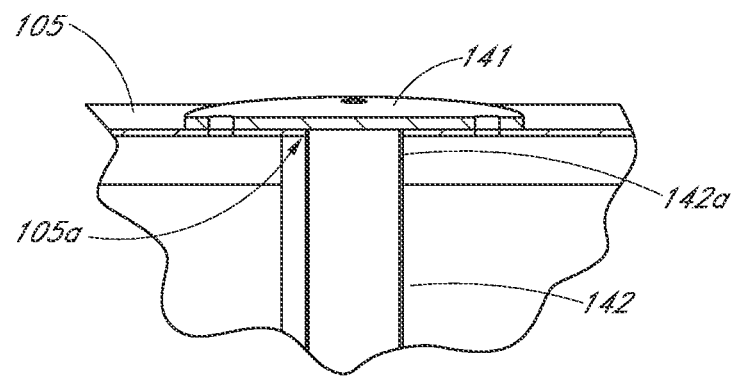
FIG. 21 is an enlarged partial view from FIG. 20 showing a mounting plate of the insertable baffle unit abutted against an outer surface of the two-piece tank.
Figure 22:
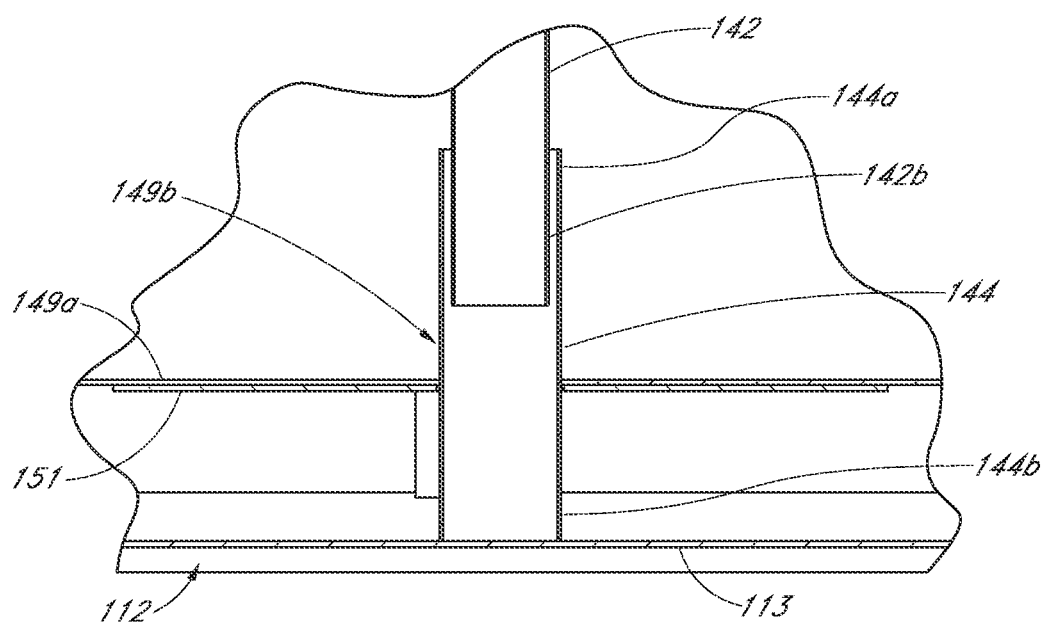
FIG. 22 is an enlarged partial view from FIG. 20 showing a sleeve of the insertable baffle unit extending upward from an inner wall of the tank to receive an end of a post.
Figure 24:
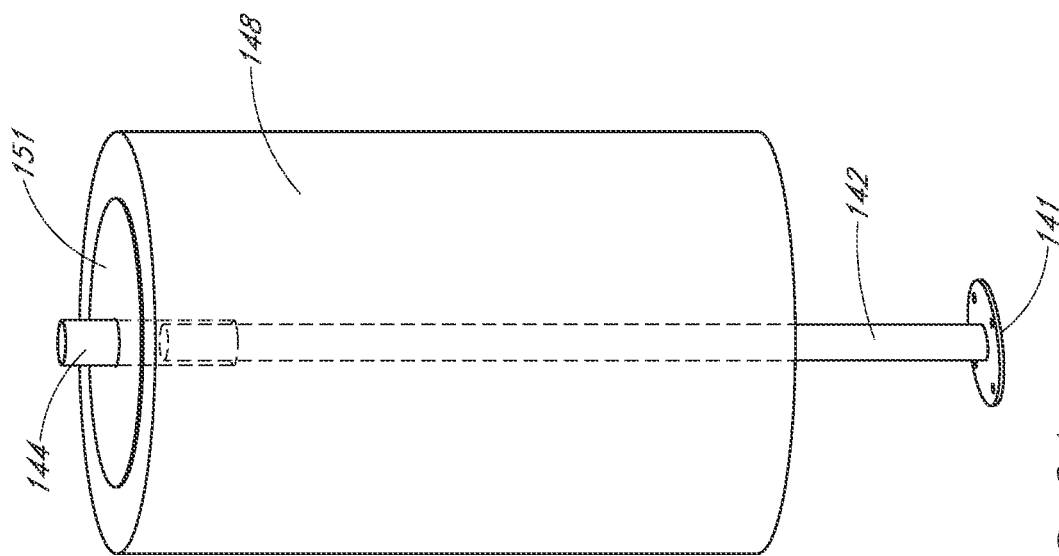
FIG. 24 is similar to FIG. 23 except the insertable baffle unit has been turned upside down to show a base support.
Figure 23:
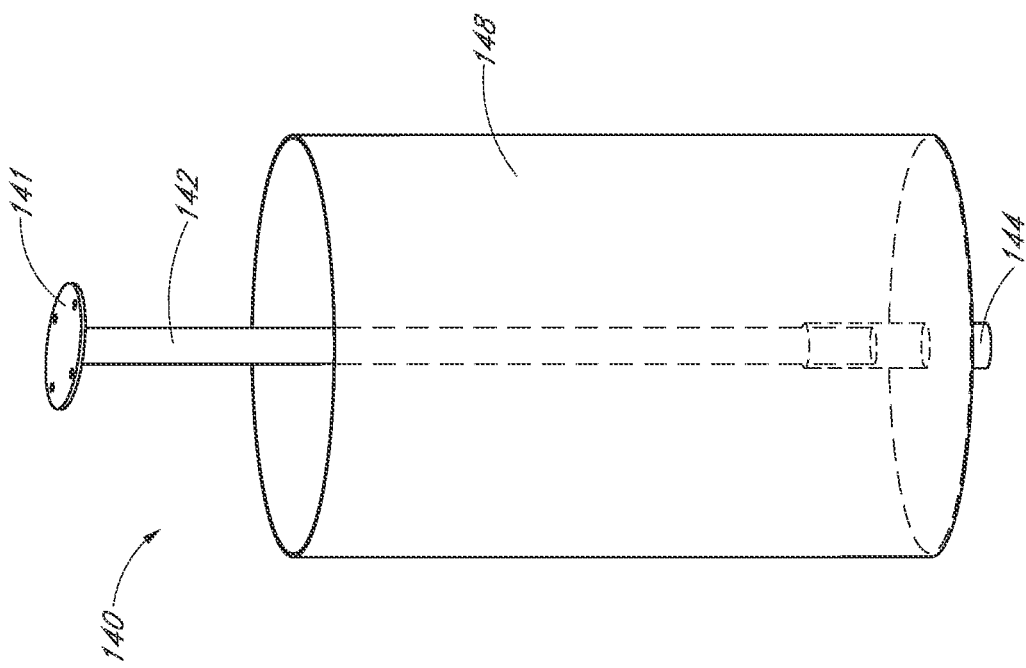
FIG. 23 is a perspective view of the insertable baffle unit including a baffle.
Figure 25:
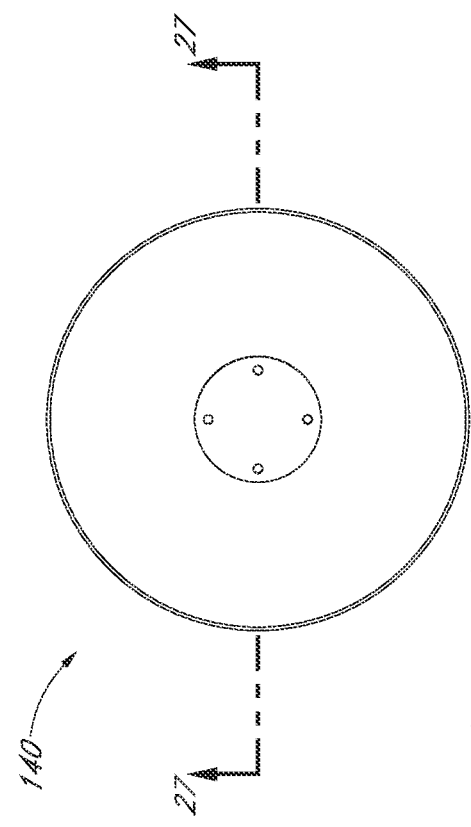
FIG. 25 is a top view of the insertable baffle unit of FIG. 23.
Figure 26:
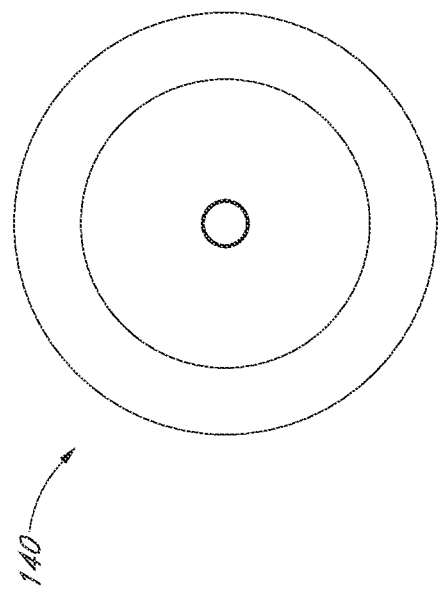
FIG. 26 is a bottom view of the insertable baffle unit of FIG. 23.
Figure 27:
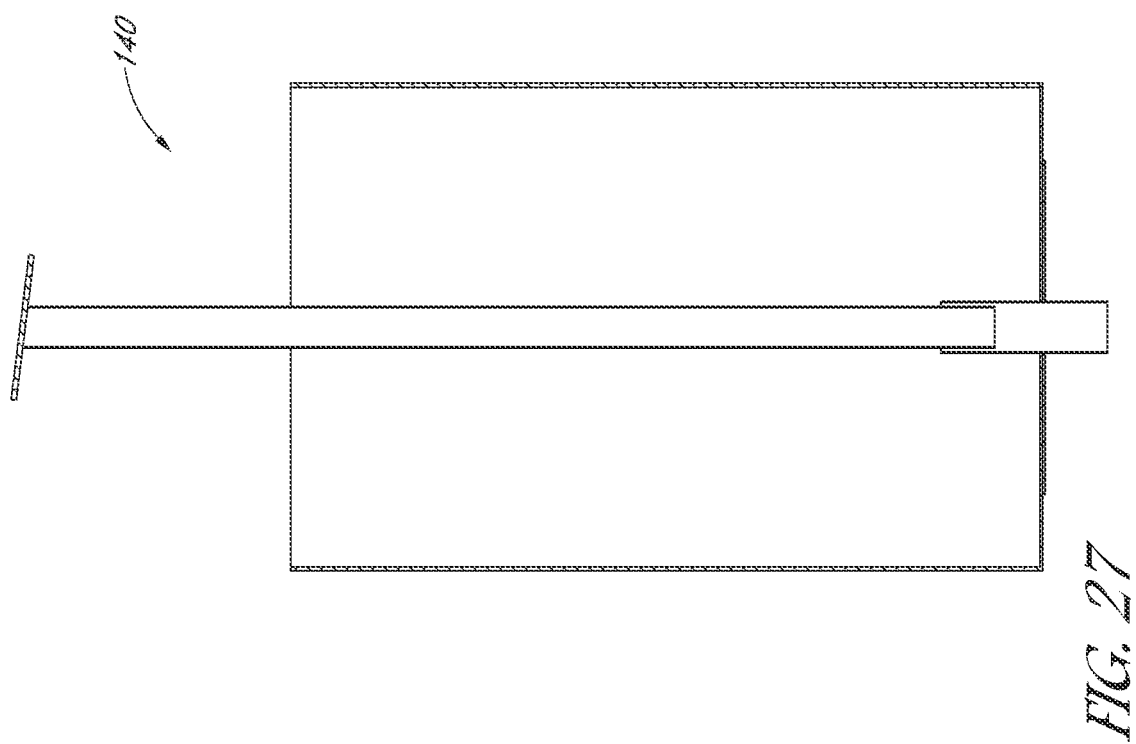
FIG. 27 is a section view taken along the line of 27-27 in FIG. 25.
Figure 28A:
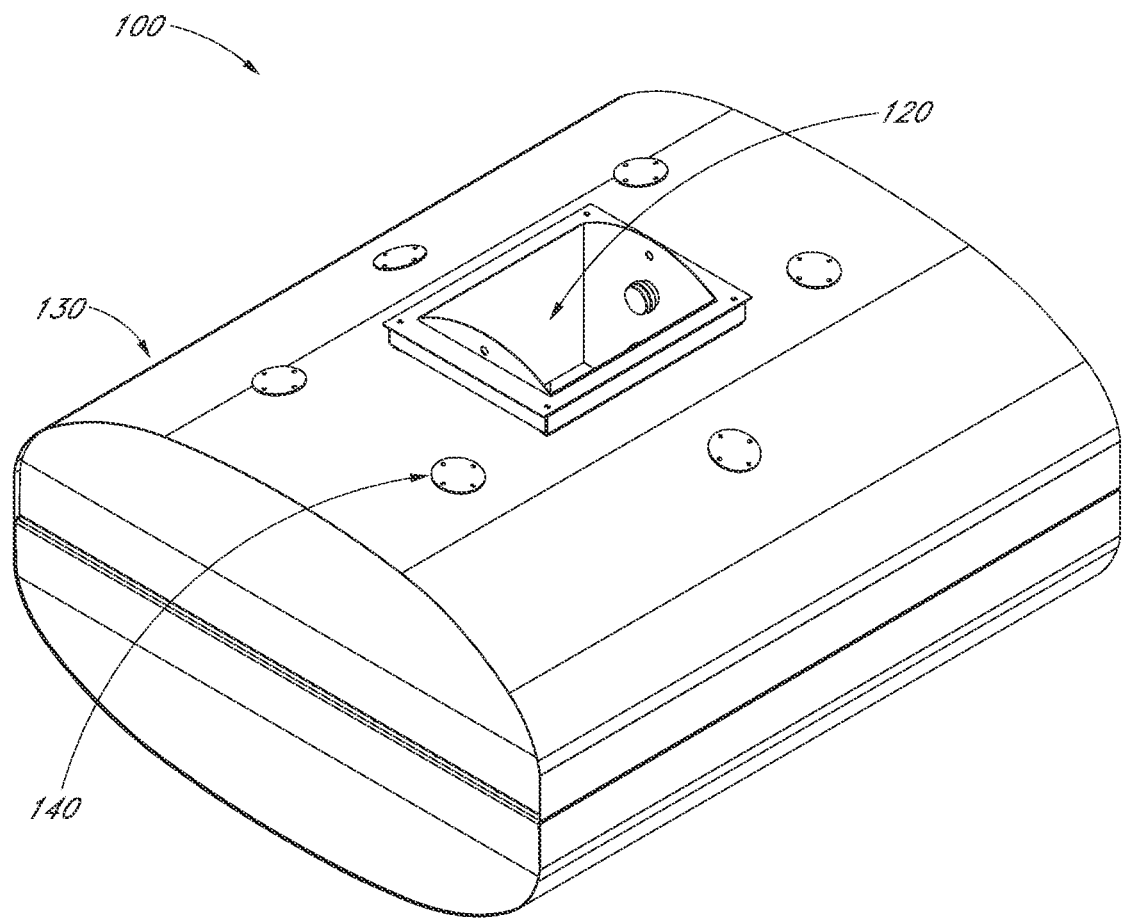
FIGS. 28A-28D are drawings of an exemplary sequence for removing a plurality of insertable baffle units from the two-piece tank illustrated in FIG. 17.
Figure 28B:
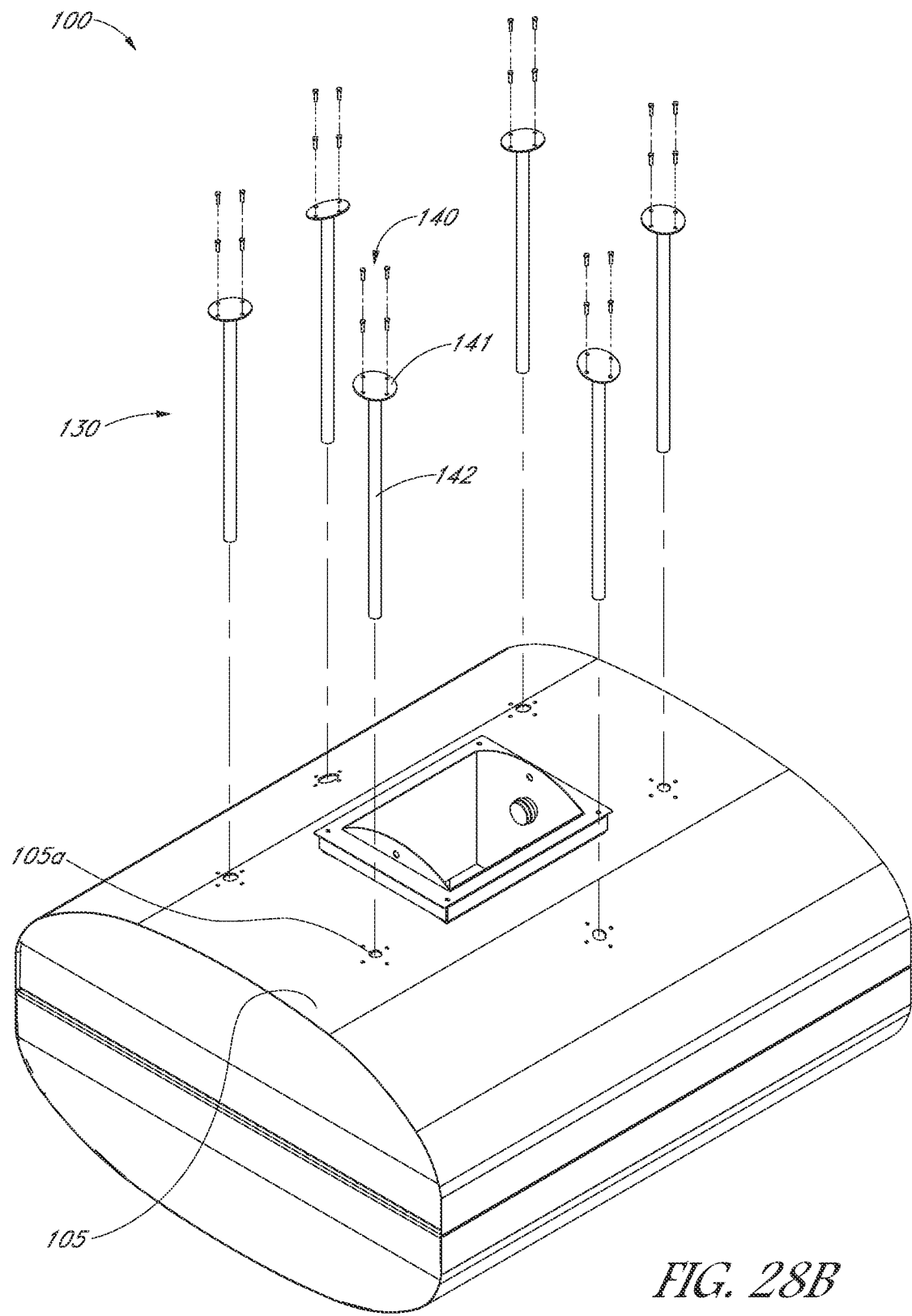
Figure 28C:
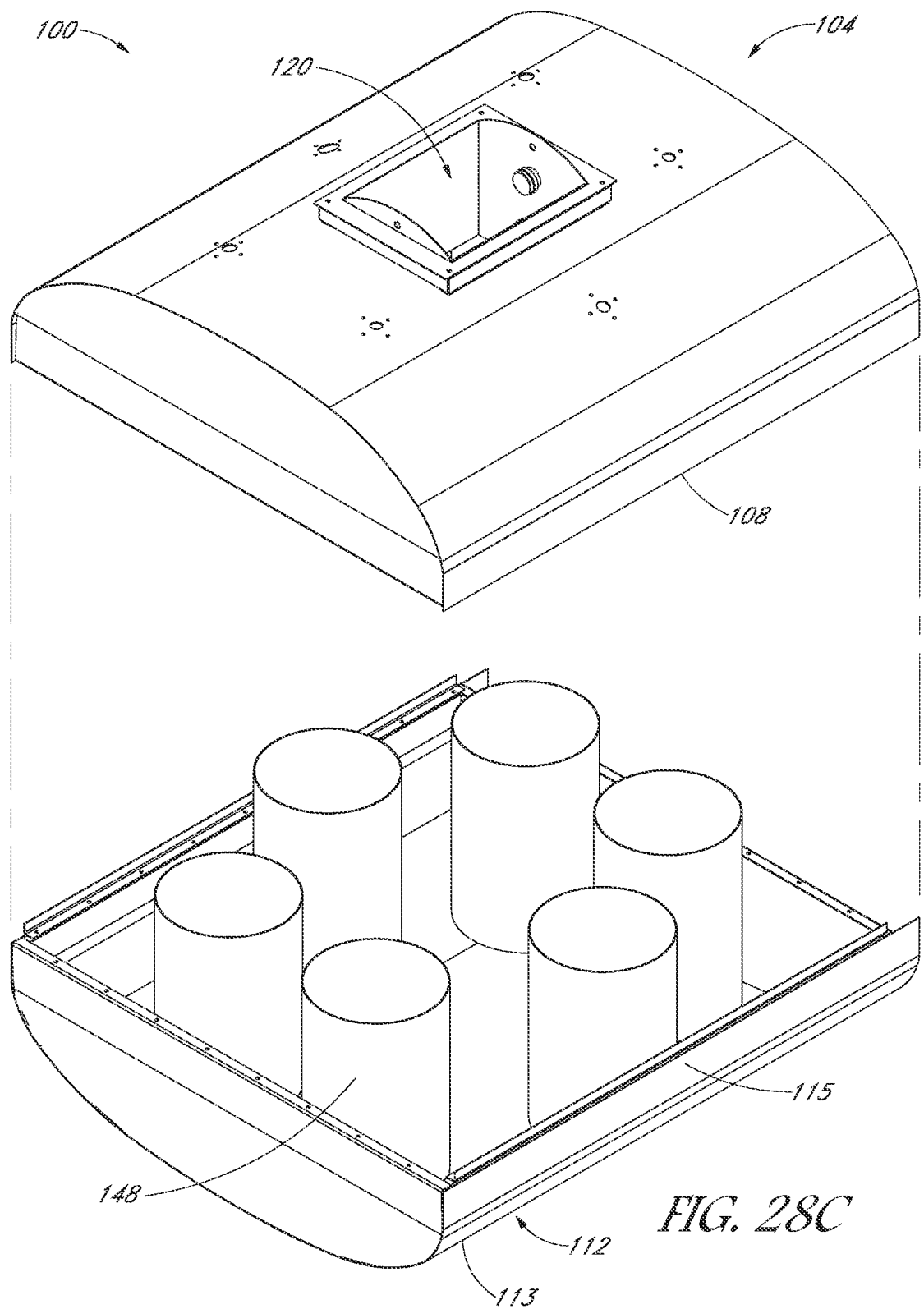
Figure 28D:
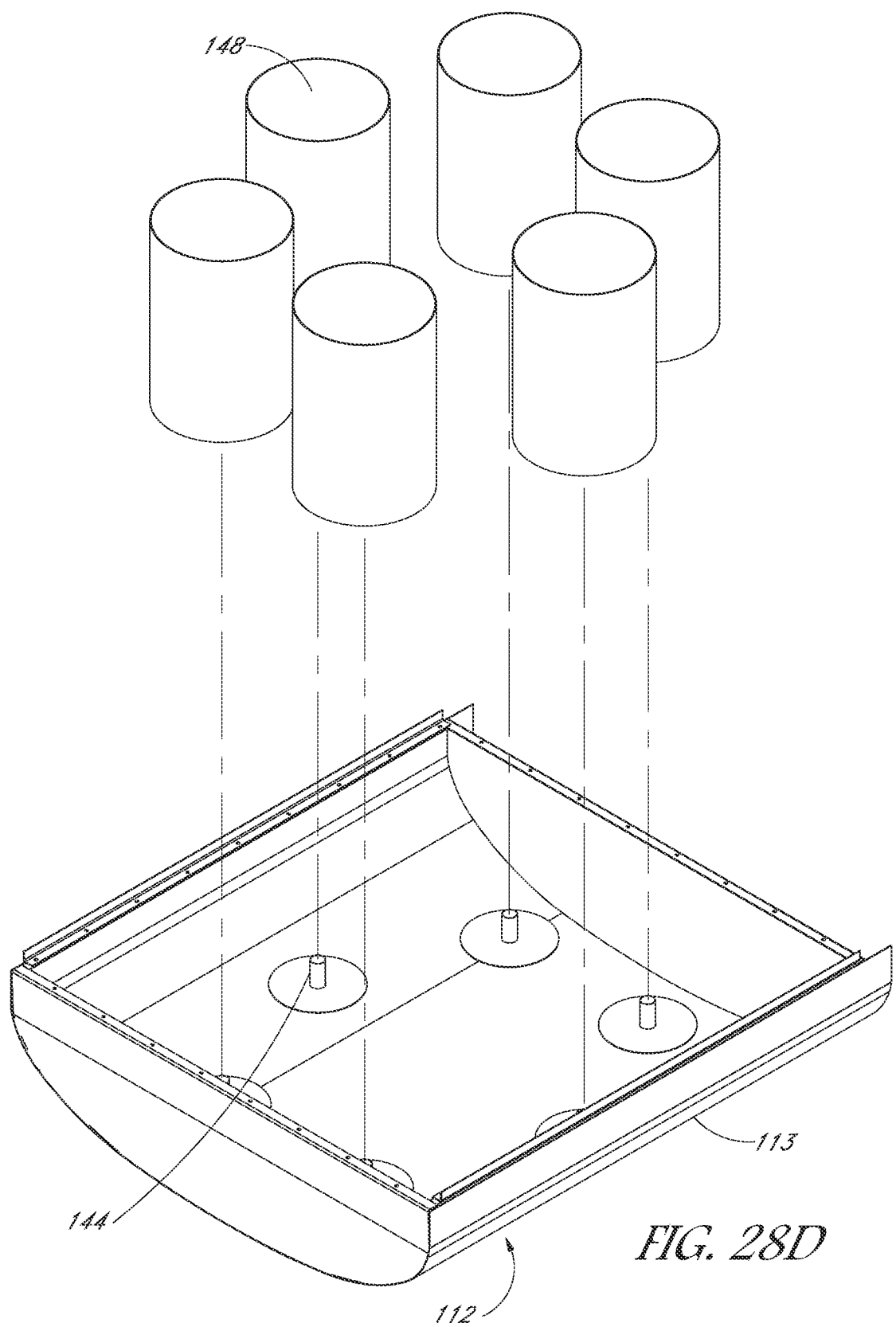
Figure 29:
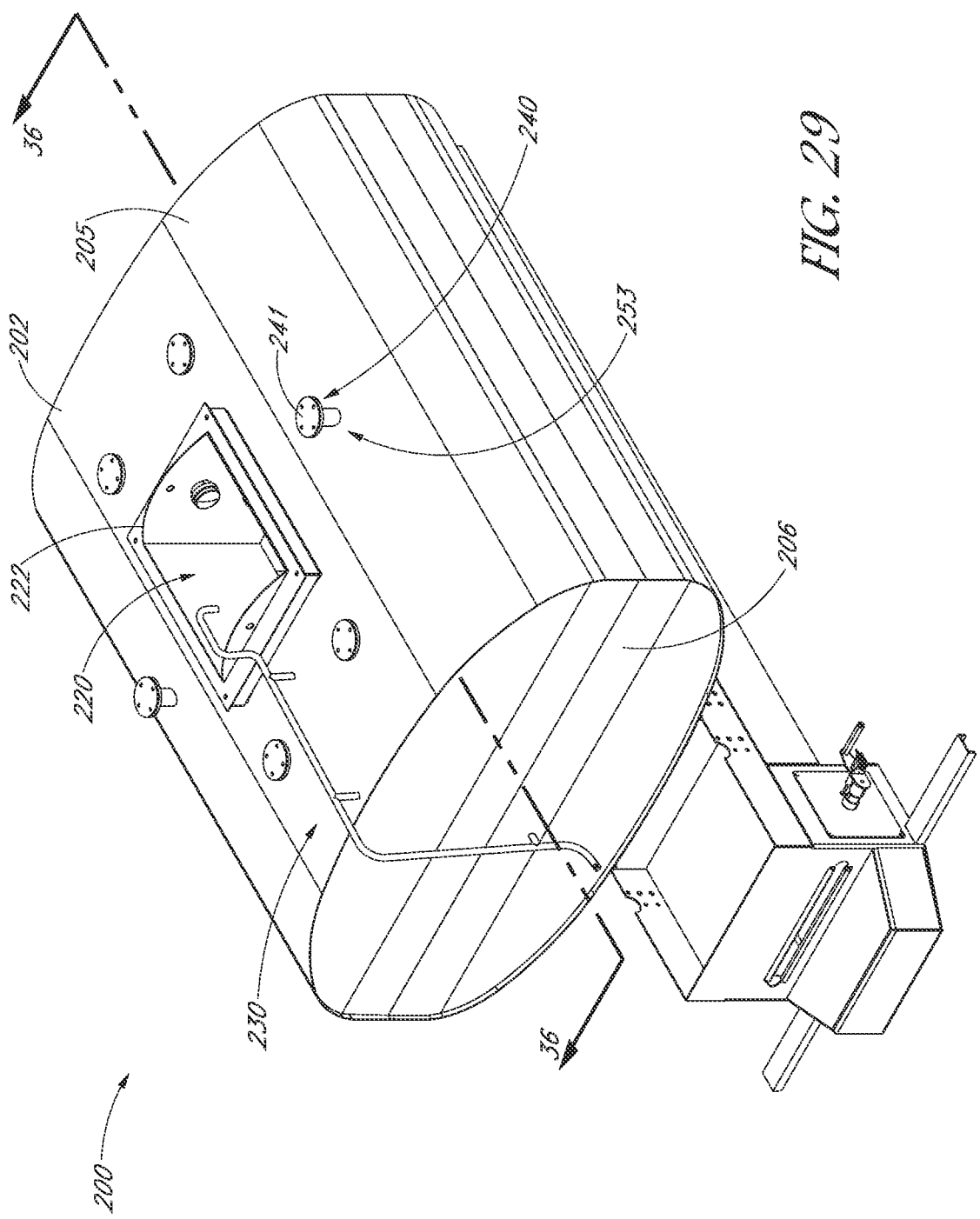
FIG. 29 shows a rear perspective view of a two-piece tank including a baffle system according to another preferred embodiment of the present invention.
Figure 30:
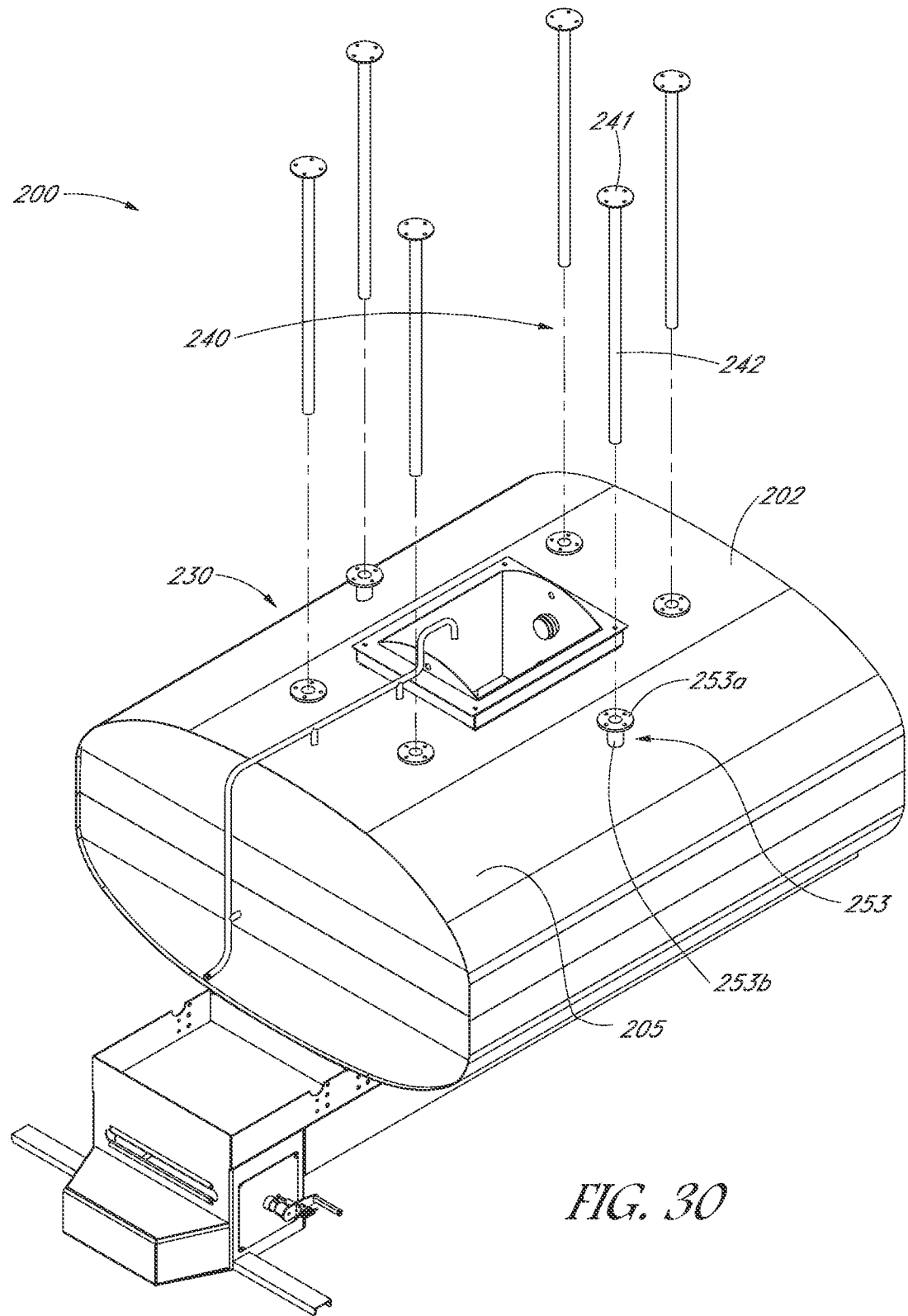
FIG. 30 is a front perspective view of the tank from FIG. 29 showing a plurality of posts removed from a plurality of mounting sleeves disposed in a wall of the tank.
Figure 31:
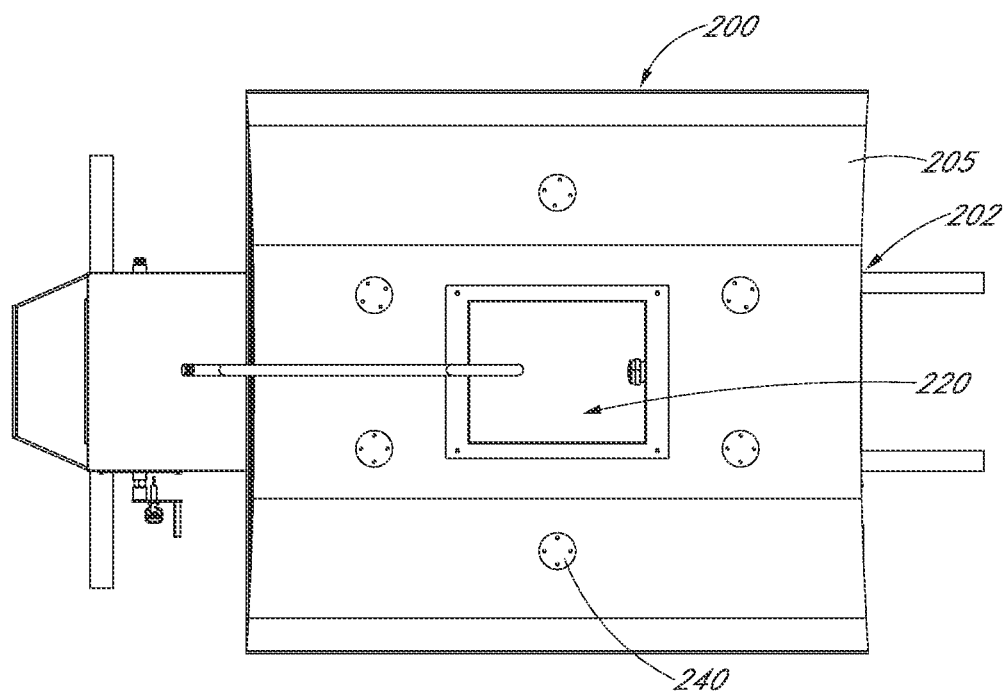
FIG. 31 shows a top view of the tank of FIG. 29.
Figure 32:
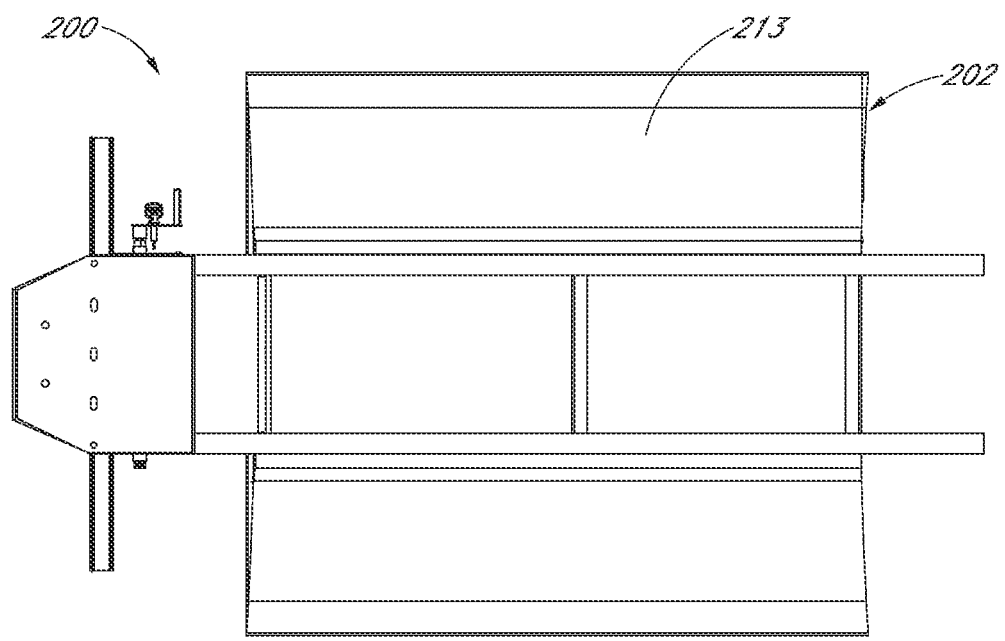
FIG. 32 shows a bottom view of the tank of FIG. 29.
Figure 33:
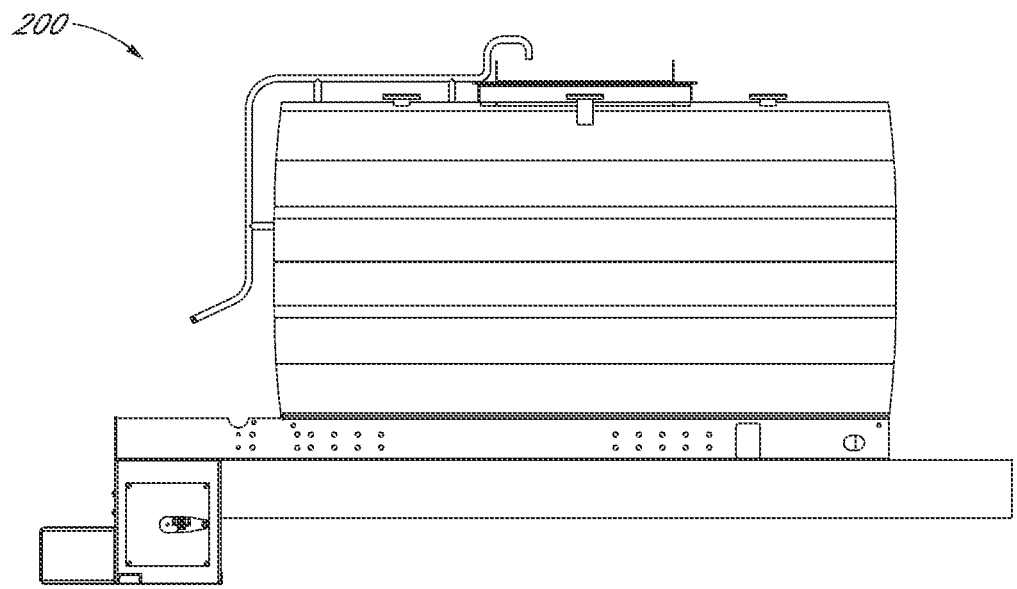
FIG. 33 shows a right-side view of the tank of FIG. 29.
Figure 34:
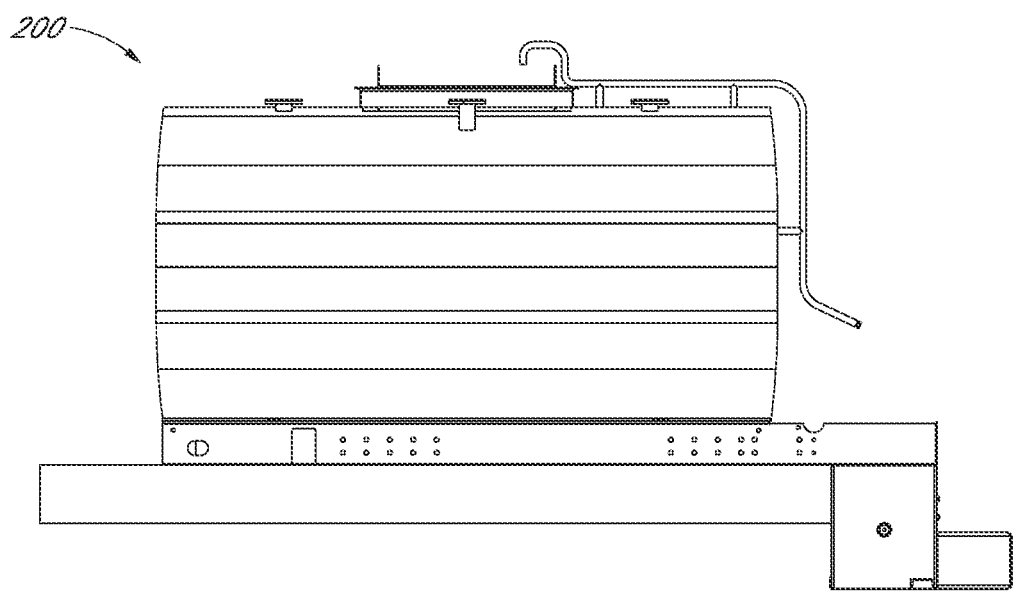
FIG. 34 shows a left-side view of the tank of FIG. 29.
Figure 35:
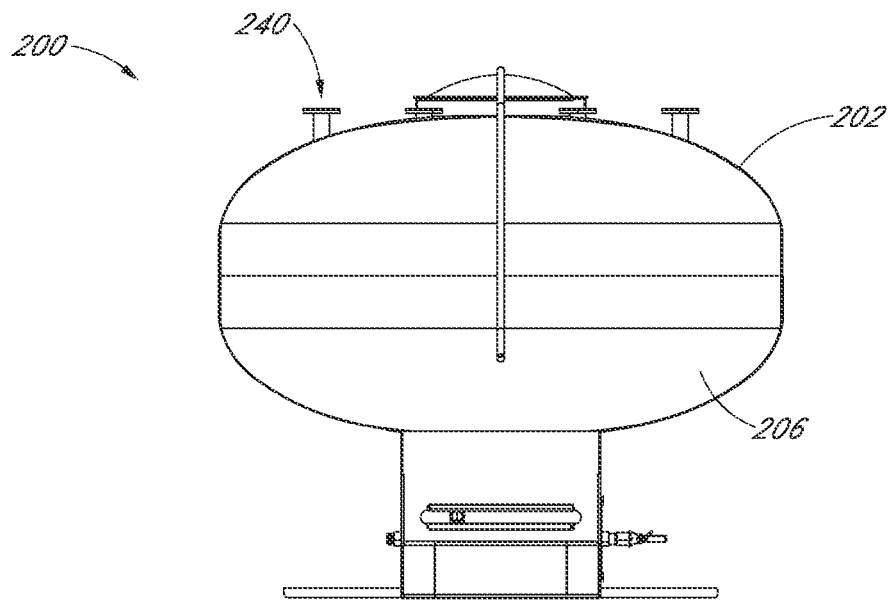
FIG. 35 shows a rear view of the tank of FIG. 29.
Figure 36:
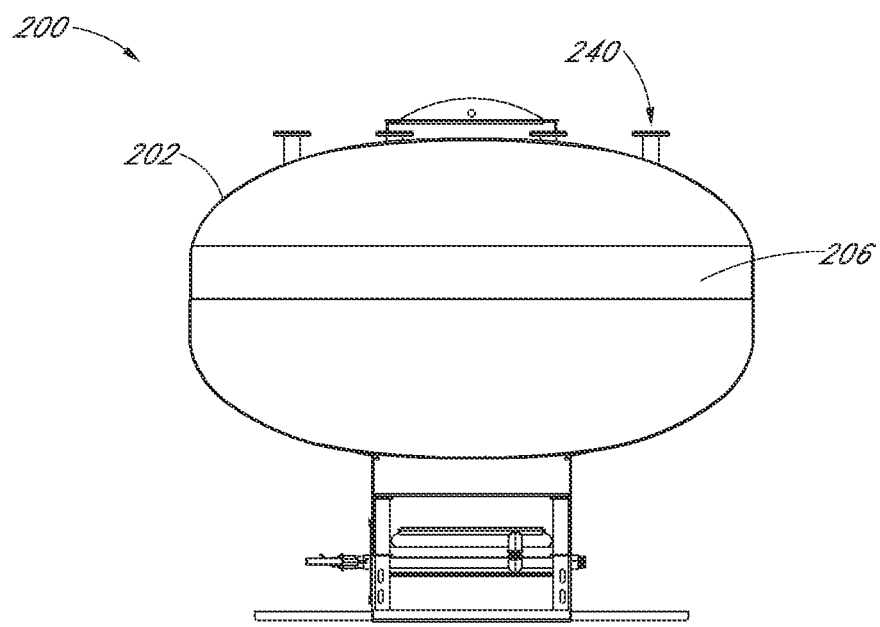
FIG. 36 shows a front view of the tank of FIG. 29.
Figure 37:
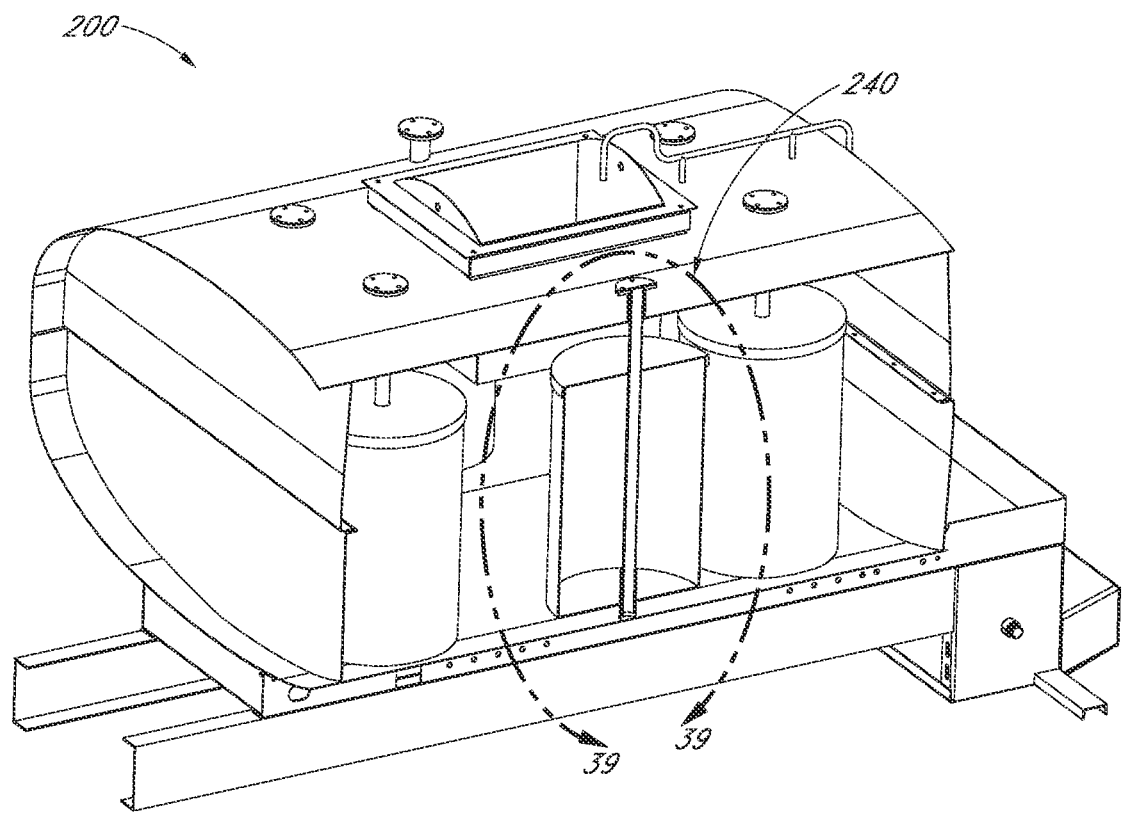
FIG. 37 shows a section view taken along the line 37-37 in FIG. 29 showing an insertable baffle unit of the baffle system.
Figure 38:
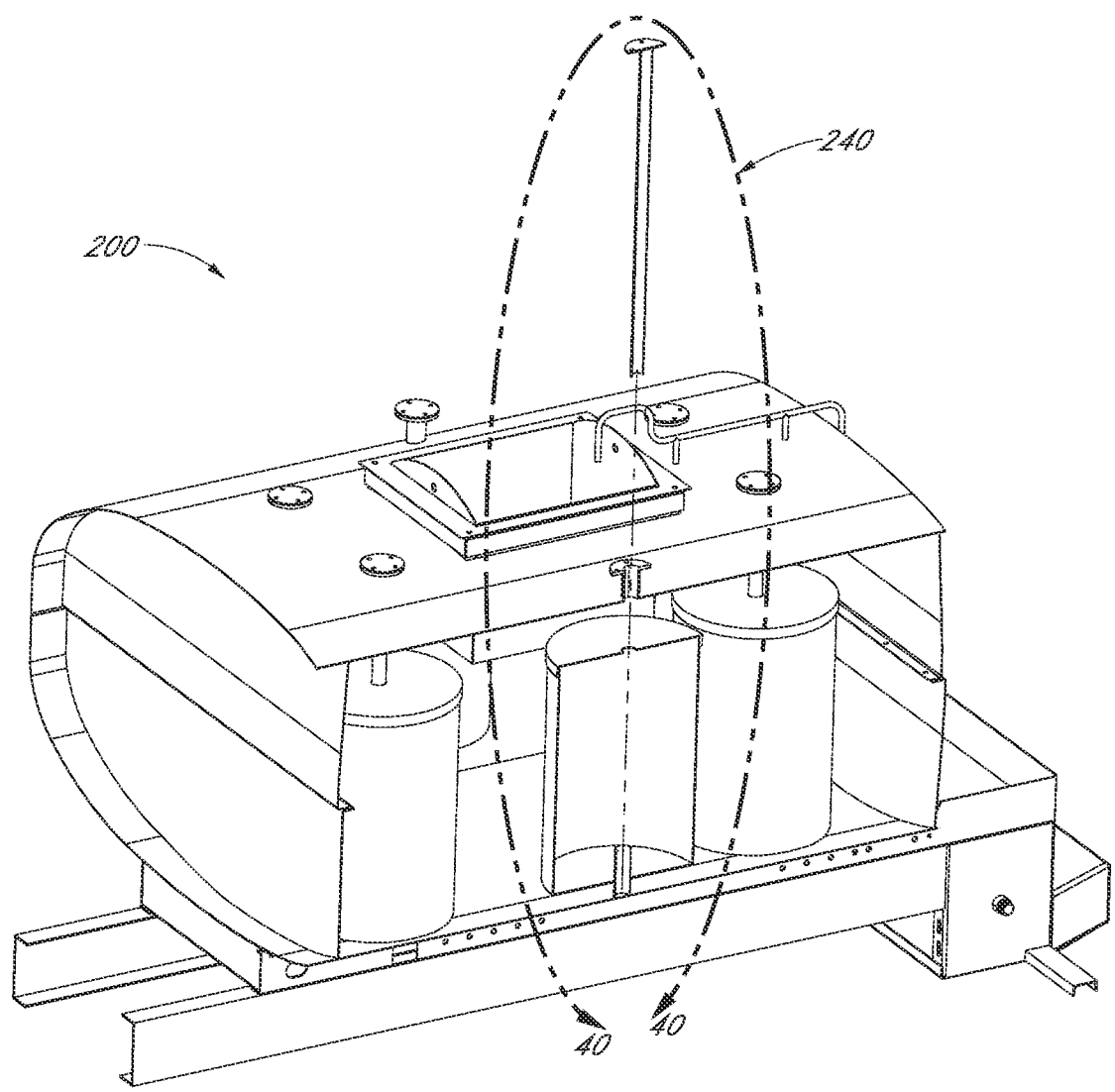
FIG. 38 is similar to FIG. 37 except a post has been removed from a mounting sleeve.
Figure 39:
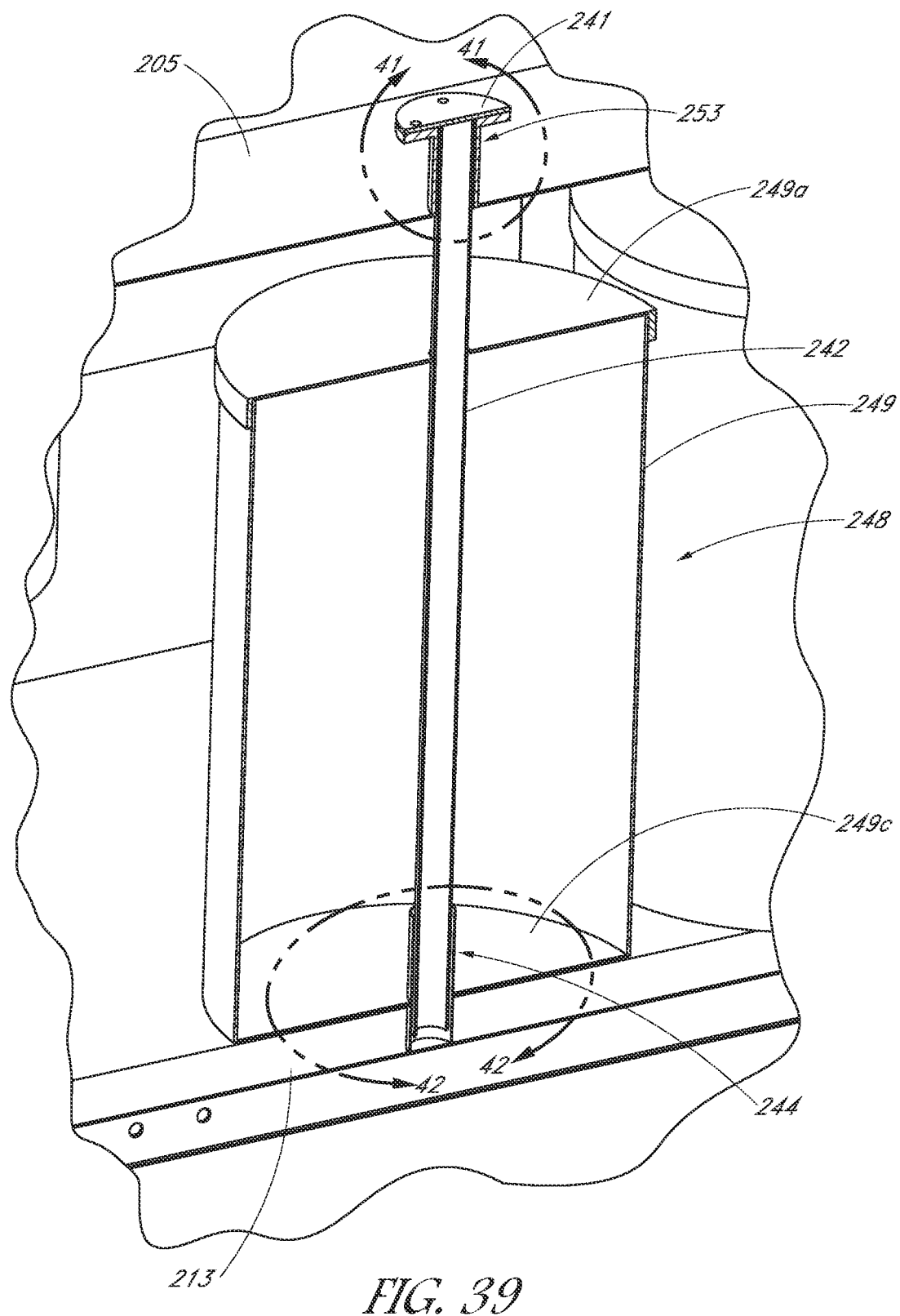
FIG. 39 is an enlarged partial view from FIG. 37 showing the insertable baffle unit.
Figure 40:
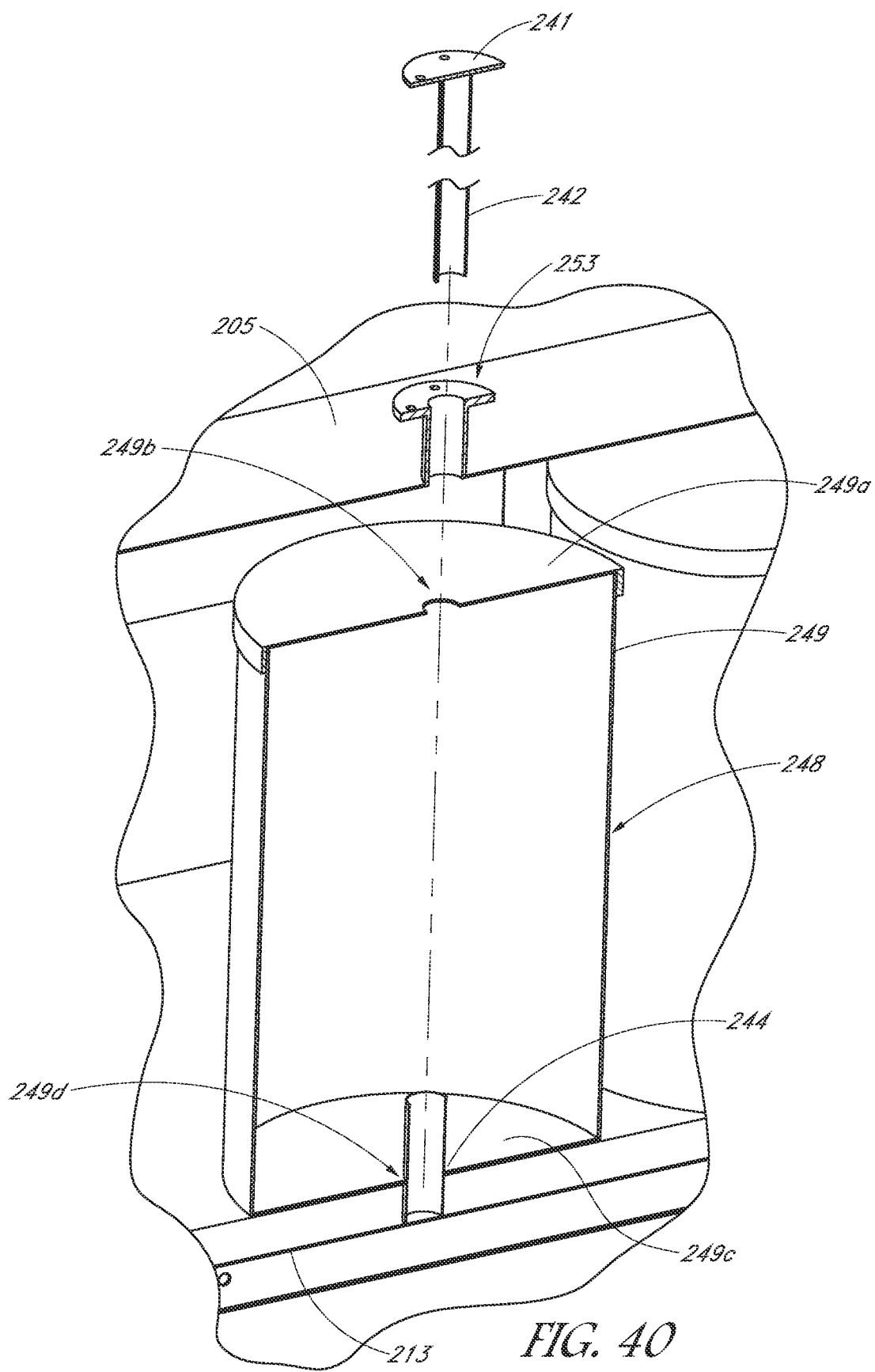
FIG. 40 is similar to FIG. 39 except the post have been removed from the mounting sleeve.
Figure 41:
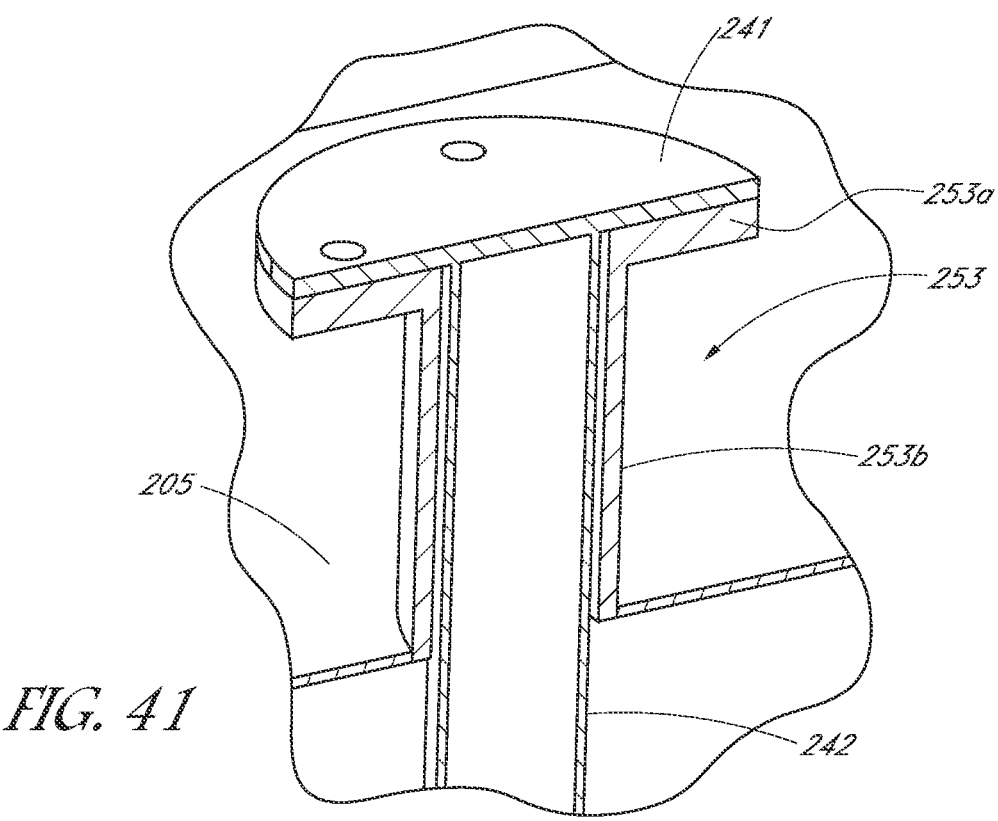
FIG. 41 is an enlarged partial view from FIG. 39 showing the mounting plate of the post abutted against a flange of the mounting sleeve.
Figure 42:
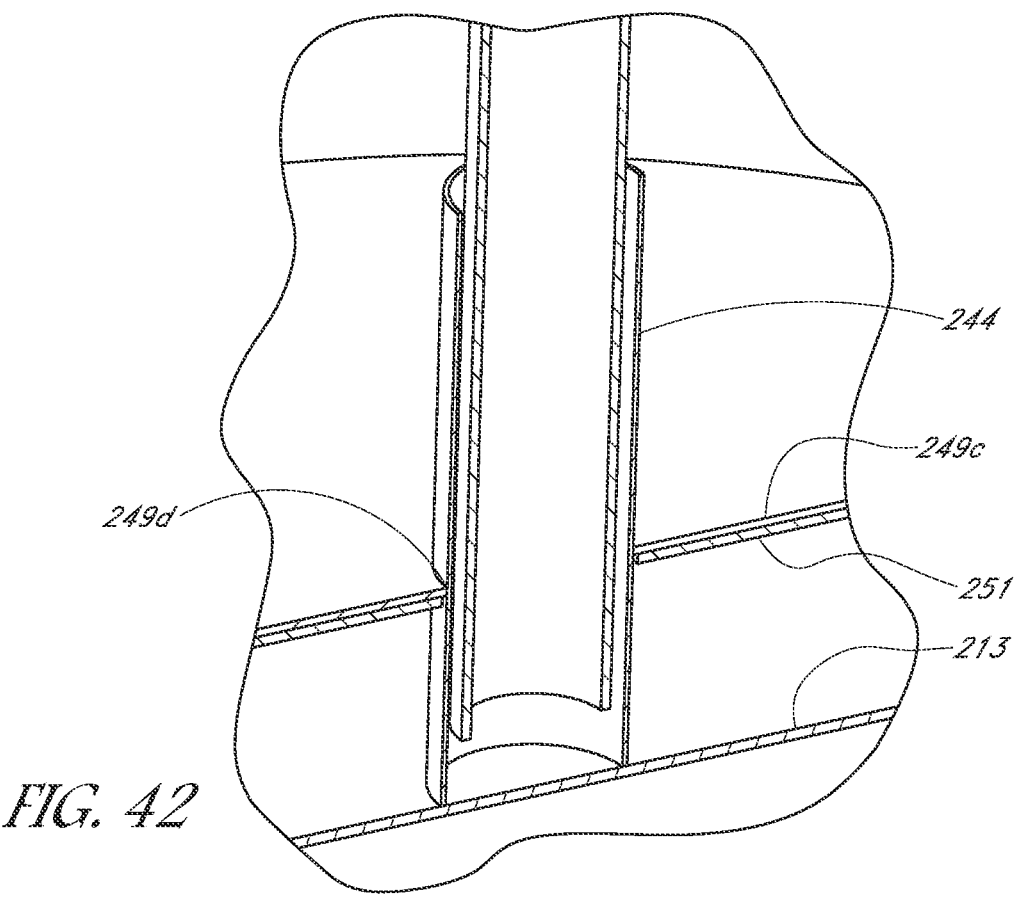
FIG. 42 is an enlarged partial view from FIG. 39 showing the post received within the sleeve with the baffle supported on the base support.
Figure 44:
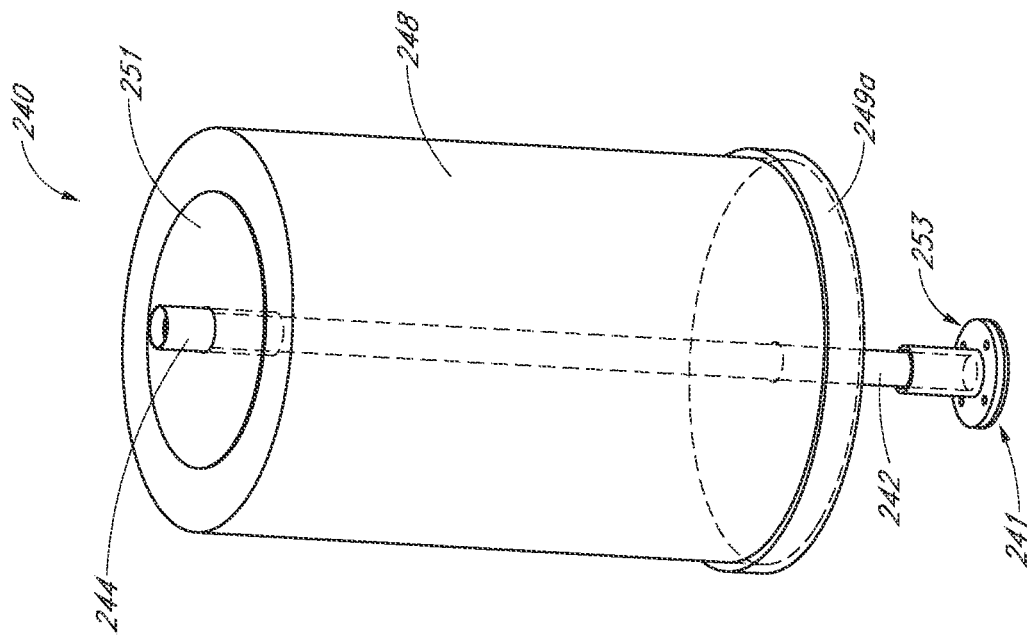
FIG. 44 is similar to FIG. 43 except the insertable baffle unit has been turned upside down to show the base support.
Figure 43:
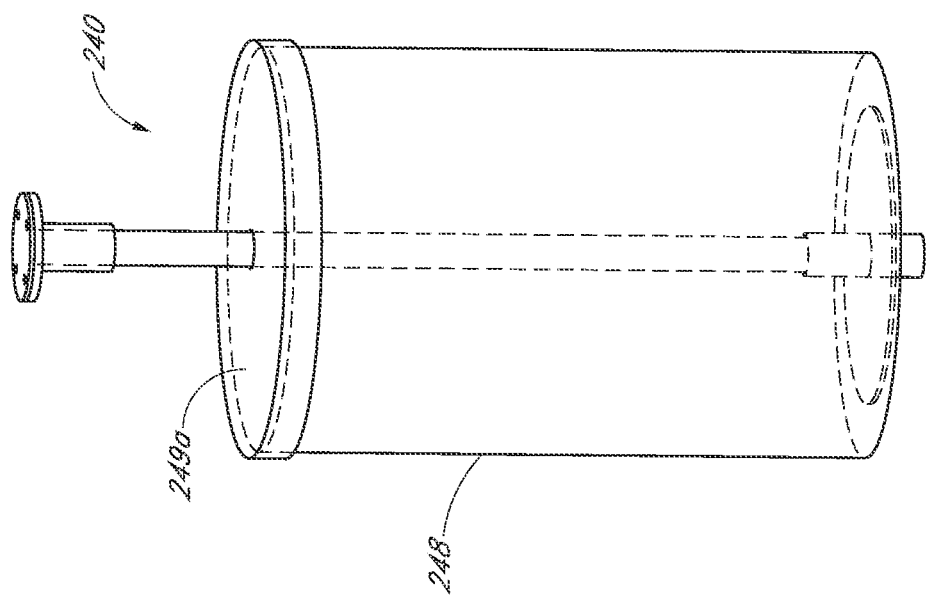
FIG. 43 is a perspective view of the insertable baffle unit from FIG. 37.
Figure 45A:
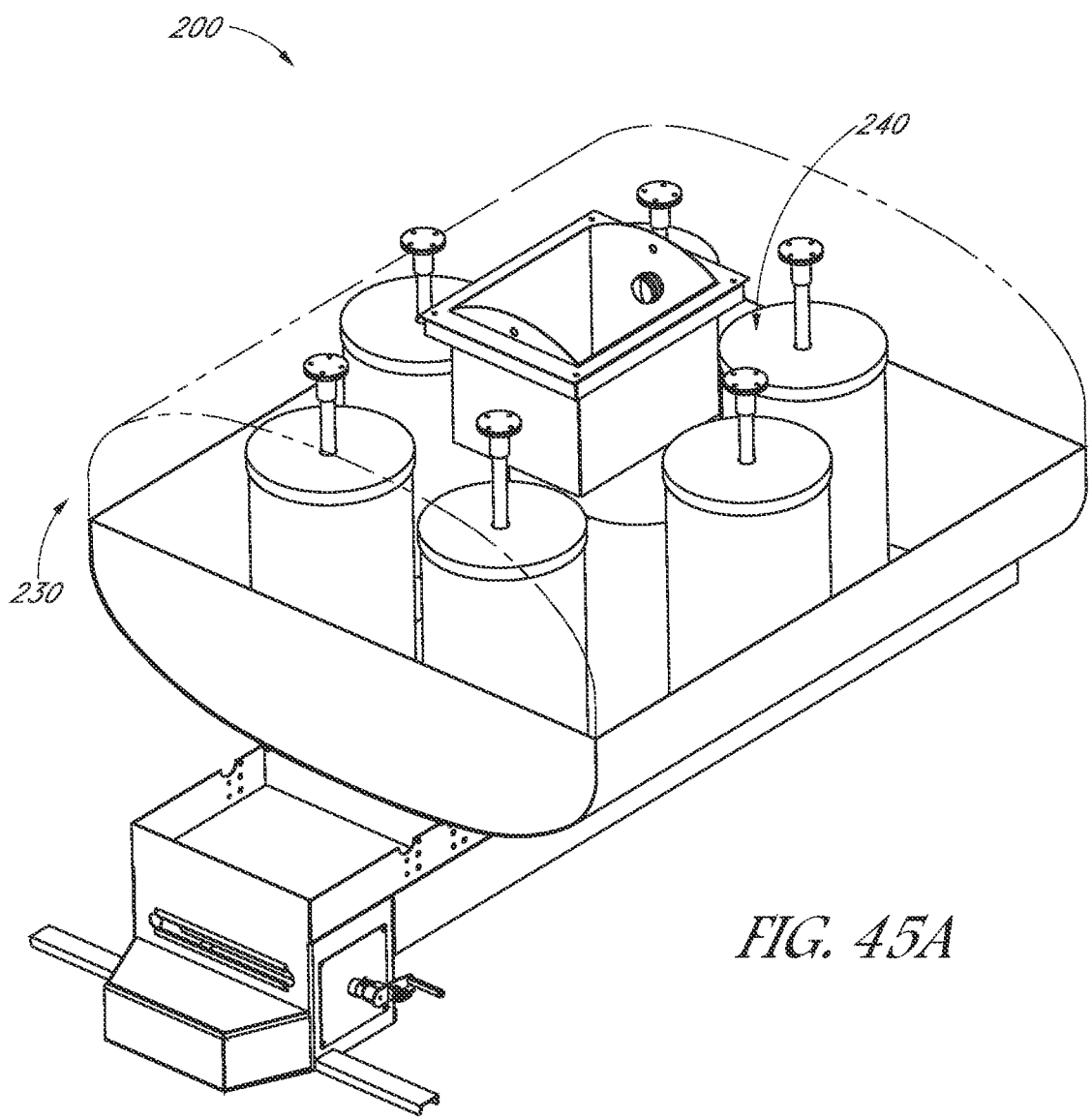
FIGS. 45A-45D are drawings of an exemplary sequence of an alternate way for removing a series of insertable baffle units of the baffle system from a one-piece tank.
Figure 45B:
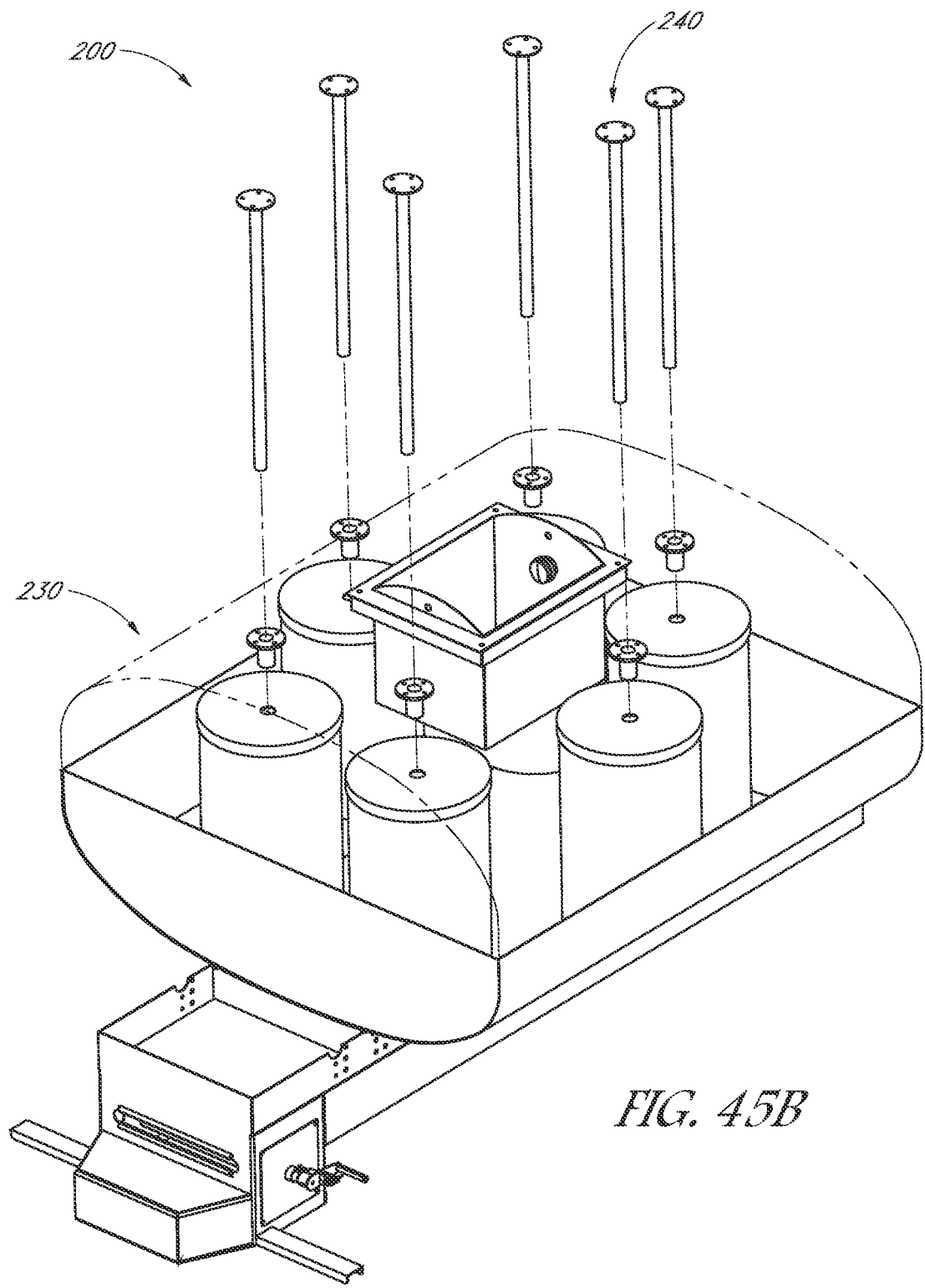
Figure 45C:
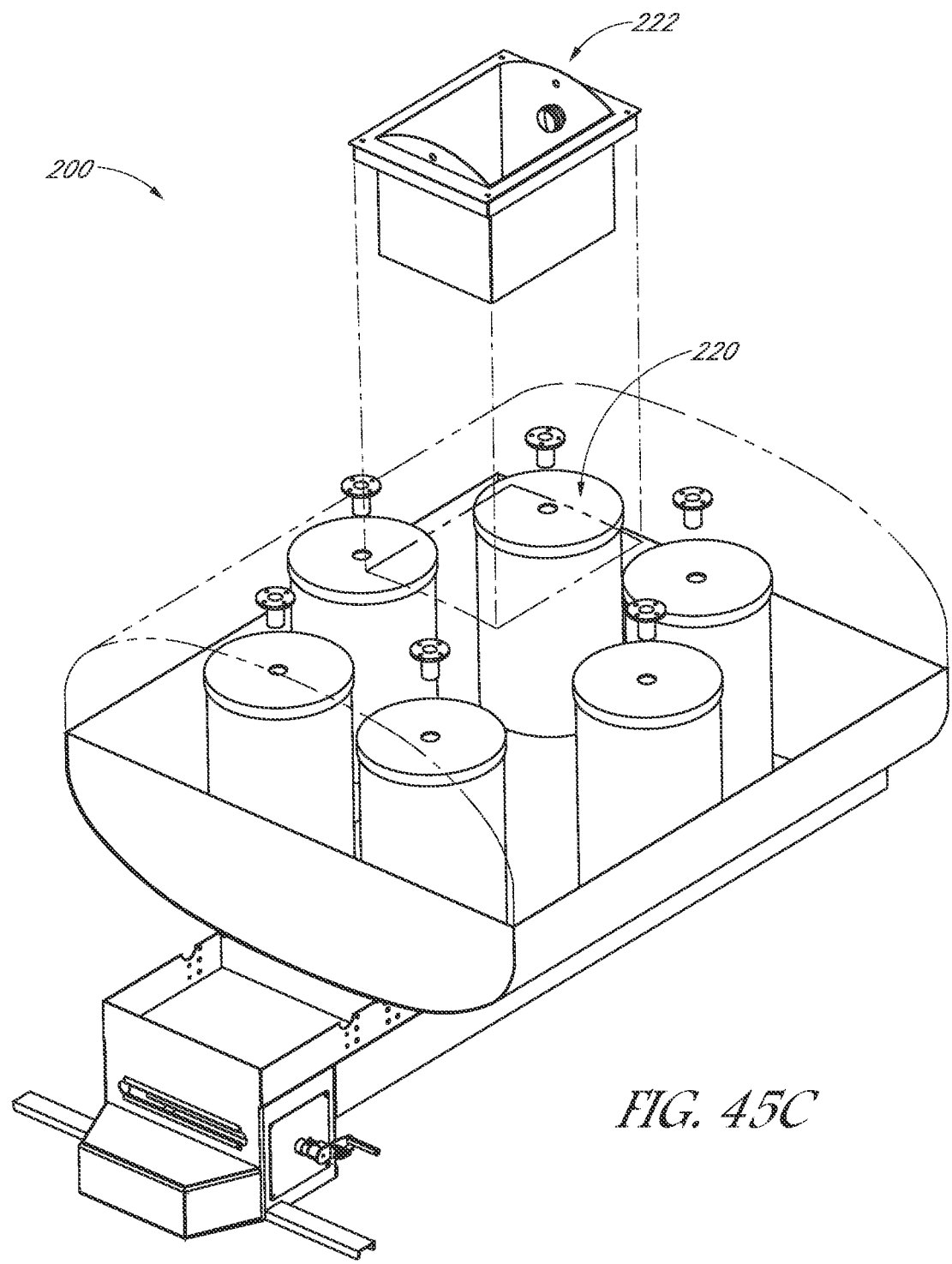
Figure 45D:
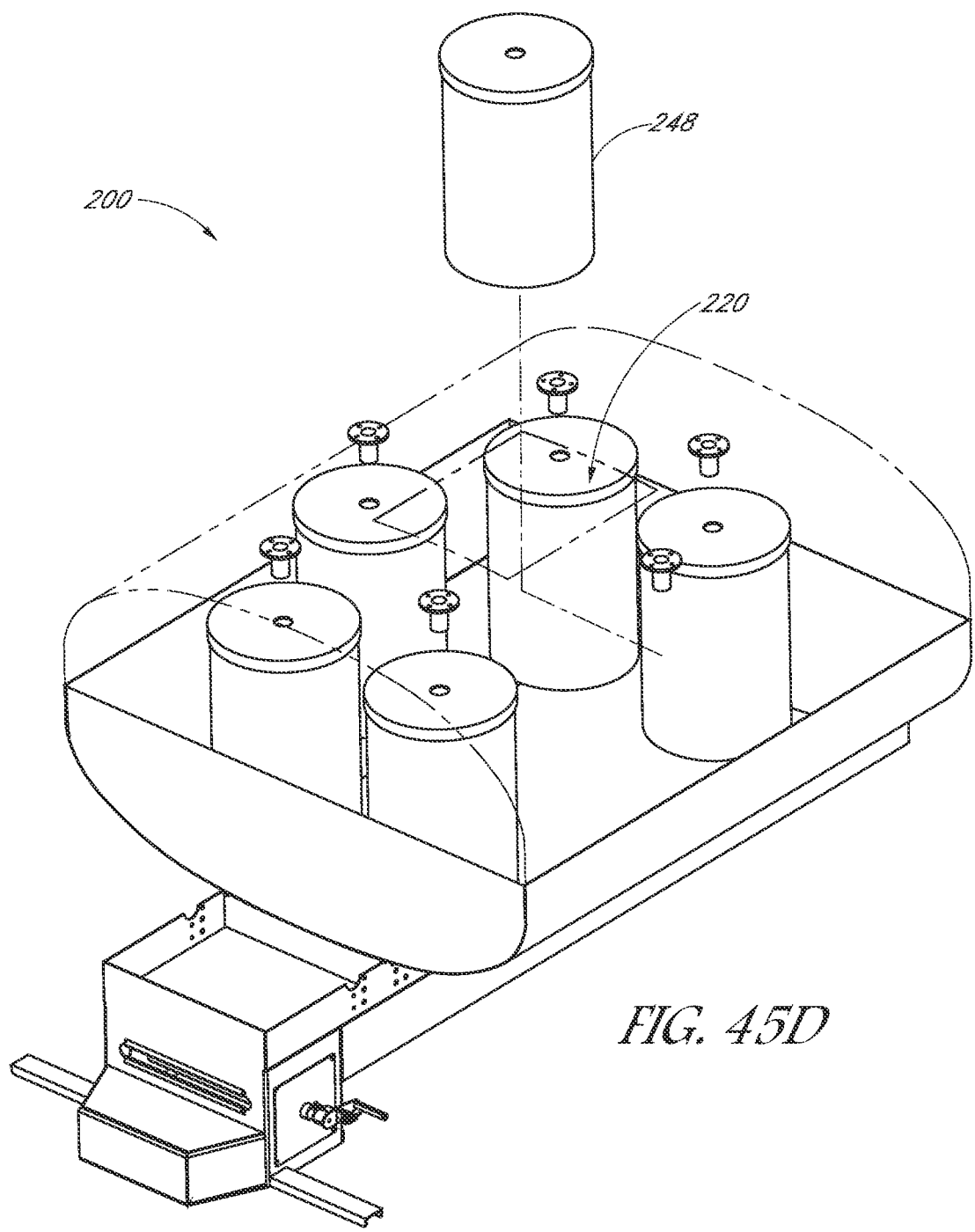

In certain embodiments, the upper end 142a can be coupled with the mounting plate 141. In certain embodiments, the upper end 142a can be mechanically fastened (either permanently or removably via mechanical fasteners) with the mounting plate 141. Optionally, the upper end 142a can be welded with the mounting plate 141 such that the mounting plate 141 and the post 142 can comprise a single unit. In certain embodiments, the mounting plate 141 can be perpendicular to a longitudinal axis of the post 142, as shown in FIG. 21. In other implementations, the mounting plate 141 can be angled with respect to the longitudinal axis, such as shown in FIG. 27. In certain embodiments, the angle can depend on the shape of the upper surface 105.

In certain embodiments, the upper surface 105 can include an aperture 105a. In certain embodiments, the aperture 105a can have a diameter sized to accommodate the post 142. In certain embodiments, the post 142 can be disposed through the aperture 105a into the interior of the tank 100. In certain embodiments, the mounting plate 141 can be disposed over the aperture 105a.

In certain embodiments, the insertable baffle unit 140 can further comprise a sleeve 144. In certain embodiments, the sleeve 144 can include an upper end 144a and a lower end 144b. In certain embodiments, the sleeve 144 can be generally cylindrically shaped. In certain embodiments, the sleeve 144 can have a cross-sectional profile that corresponds to the cross-sectional profile of the post 142. In certain embodiments, the lower end 144b can be coupled with the lower surface 113 of the lower portion 112. In certain embodiments, the lower end 144b can be permanently attached with the lower surface 113 such as by welding or otherwise mechanically fastened. In certain embodiments, the sleeve 144 can be positioned perpendicular to the lower surface 113. In certain embodiments, the sleeve 144 can be aligned vertically below the aperture 105a. In certain embodiments, the upper end 144a of the sleeve 144 can couple with or otherwise receive the lower end 142b of the post 142.

In certain embodiments, the post 142 can extend from the aperture 105a into the upper end 144a of the sleeve 144. In certain embodiments, the mounting plate 141 on the upper surface 105 can support the post 142 above the lower surface 113. In certain embodiments, the post 142 can be suspended with the lower end 142b within the sleeve 144. In certain implementations, the lower end 142b can be received at least 3" within the sleeve 144. In this manner, the post 142 together with the sleeve 144 can span a height of the tank 100.

In certain embodiments, the insertable baffle unit 140 can further include a baffle 148. In certain embodiments, the baffle 140 can be a barrel or drum, as described above for the baffle 61. In certain embodiments, the baffle 148 can include an outer surface 149. In certain embodiments, the outer surface 149 can include therein a plurality of holes through which the liquid within the tank 100 can flow. The holes can permit flow between the internal cavity of the baffle 148 and the volume of the tank 200. In certain embodiments, the holes can have a diameter of at least 1". The outer surface 149 can generally enclose an interior space of the baffle 148. In certain embodiments, the outer surface 149 can include a generally cylindrical shape and including one or more ends. In certain embodiments, the outer surface 149 can include a lower surface 149a at a lower end of the baffle 148. Other shapes and form factors for the baffle 148 are also contemplated herein. In one implementation, the baffle 148 is a 40 or 55 gallon plastic tote or drum.

In certain embodiments, the lower surface 149a of the outer surface 149 can include a central aperture 149b. In certain embodiments, the central aperture 149b can be sized to receive the sleeve 144 or post 142. The aperture 149b can allow access through the lower surface 149a into the interior space of the baffle 148.

In certain embodiments, the sleeve 144 can be coupled with a base support 151. In certain embodiments, the base support 151 can comprise a generally planar surface or shelf. In certain embodiments, the base support 151 can be coupled with the sleeve 144 at a location spaced above the lower surface 113. In certain embodiments, the location of the support 151 above the lower surface 113 can depend on the length of the sleeve 144 and/or the desired spacing of the baffle 148 above the lower surface 113. In certain embodiments, the base support 151 can be shaped as a circle, although this is not required. In certain embodiments, the base support 151 can be welded or otherwise mechanically coupled with the sleeve 144. In certain embodiments, the post 142 can inhibit lateral motion and/or longitudinal motion of the baffle 148 relative to the tank 100. In certain embodiments, coupling the post 142 with the sleeve 144 and/or the aperture 105a can further stabilize the position of the post 142 in the tank 100.

An exemplary process for removal of the baffle system 130 from the tank 100 is shown in FIGS. 28A to 28D. The mounting plate 141 can be disengaged from the upper surface 105. For example, one or more mechanical fasteners can be removed to release the mounting plate 141 from the upper surface 105. The post 142 can be withdrawn upwardly from the sleeve 144 and the baffle 148 through the aperture 105a. The upper portion 104 can also be removed from the lower portion 112 (e.g., by removal of one or more mechanical fasteners at the upper lip 115). The baffle 148 can be removed vertically upwardly from the sleeve 144 and/or the base support 151. In other implementations, the baffle 148 can be removed from the sleeve 144 and passed through the opening 120 (e.g., with the insert 122 removed) without removal of the upper portion 104. Whether this option is available can depend on the size of the baffle 148 and the size of the opening 120. Installation of the baffle system 130 can be the reverse of the removal process just described.

FIGS. 29 to 45D show another implementation of a tank 200, similar to the tanks 20, 100. The tank 200 can be a 1-piece tank or a two-piece (or more) tank. The tank 200 can be configured for transporting a liquid therein. In certain embodiments, the tank 200 can include an outer surface 202. In certain embodiments, the outer surface 202 can include an upper surface 205 and a lower surface 213. In certain embodiments, the upper and/or lower surfaces 205, 213 can be planar or curved depending on the profile of the tank 200. In certain embodiments, the outer surface 202 can include bulkheads 206. In certain embodiments, the tank 200 can include an opening 220. In certain embodiments, the opening 220 can be in the upper surface 205. In certain embodiments, the opening 220 can include a removable insert 222.

The tank 200 can include a baffle system 230. In certain embodiments, the baffle system 230 can include an insertable baffle unit 240. The insertable baffle unit 240 can be one of a plurality of insertable baffle units of the baffle system 230. In certain embodiments, the plurality of insertable baffle units can be arranged around the opening 220. The baffle system 230 can be configured to reduce sloshing of liquid contained within the container during transportation.

In certain embodiments, the insertable baffle unit 240 can include a mounting plate 241. In certain embodiments, the mounting plate 241 can include a flat plate. In certain embodiments, the flat plate can include one or more apertures therein for receiving mechanical fasteners. In certain embodiments, the mounting plate 241 can be flat.

In certain embodiments, the insertable baffle unit 240 can include a mounting sleeve 253. In certain embodiments, the mounting sleeve 253 can include a flange 253a. In certain embodiments, the flange 253a can comprise a plate or other planar surface. In certain embodiments, the flange 253a can comprise a plurality of apertures or other mechanical fasteners. In certain embodiments, the flange 253a can include a central aperture therethrough. In certain embodiments, the flange 253a can be oriented along a horizontal plane.

In certain embodiments, the mounting sleeve 253 can include a spacer 253b. In certain embodiments, the spacer 253b can include a central aperture extending therethrough and aligned with the central aperture of the flange 253a. In certain embodiments, the spacer 253b can be pipe-shaped or otherwise shaped member. In certain embodiments, a lower end of the spacer 253b can be mechanically coupled with the upper surface 205. In certain embodiments, the lower end of the spacer 253b can be permanently coupled with the upper surface 205 (e.g., by welding). In certain embodiments, an upper end of the spacer 253b can be coupled with the flange 253a. In certain embodiments, the spacer 253b can extend along a vertical axis. In certain embodiments, the vertical axis of the spacer 253b can be perpendicular with the flange 253a.

In certain embodiments, the flange 253a can be spaced above the upper surface 205 by the spacer 253b. In certain embodiments, the flange 253a can be located at a height above the upper surface 205. One or more of the other mounting sleeves of other insertable baffle units of the baffle system 230 can be located at the same height and/or in the same horizontal plane.

In certain embodiments, the insertable baffle unit 240 can include a post 242. In certain embodiments, the post 242 can be coupled with the mounting plate 241 at an upper end thereof. In certain embodiments, a lower end of the post 242 can be insertable through the upper surface 205 of the tank 200.

The insertable baffle unit 240 can include a baffle 248. In certain embodiments, the baffle 248 can include an outer surface 249. In certain embodiments, the outer surface 249 can generally enclose an interior space of the baffle 248. In certain embodiments, the outer surface 249 can comprise a plurality of apertures extending therethrough to allow liquid to flow into and out of the baffle 248. In certain embodiments, the outer surface 249 can include a generally cylindrical outer wall. In certain embodiments, the outer surface 249 can include an upper surface 249a. The upper surface 249a can generally enclose an upper opening of the cylindrical wall of the outer surface 249. In certain embodiments, the upper surface 249a an include an outer circumferential lip or flange for assembly with the cylindrical walls of the outer surface 249. In certain embodiments, the upper surface 249a can include an aperture 249b. In certain embodiments, the aperture 249b can be centered on the upper surface 249a. In certain embodiments, the outer surface 249 can include a lower surface 249c. The lower surface 249c can enclose the bottom end of the cylindrical walls of the outer surface 249. In certain embodiments, the lower surface 249c can include an aperture 249d. The aperture 249d can extend through the lower surface 249c to allow access into the interior space of the outer surface 249.

In certain embodiments, the insertable baffle unit 240 can include a sleeve 244. In certain embodiments, the sleeve 244 can be coupled on a lower end with the lower surface 213. In certain embodiments, the sleeve 244 can be permanently coupled with the lower surface 213 (e.g., welded) or removable coupled therewith. In certain embodiments, an upper end of the sleeve 244 can be sized to receive the lower end of the post 242. In an assembled configuration, the sleeve 244 can be inserted within the aperture 249d to be at least partially located within the interior space of the outer surface 249 of the baffle 248. The sleeve 244 can position the baffle 248 within the tank 200.

In certain embodiments, the insertable baffle unit 240 can further include a base support 251. In certain embodiments, the base support 251 can comprise a flat plate. In certain embodiments, the base support 251 can be coupled with the sleeve 244. In certain embodiments, the base support 251 can be spaced a distance above the lower surface 213. In certain embodiments, the distance can be selected to space the baffle 248 at a desirable location within the tank 200.

In certain embodiments in an assembled configuration of the insertable baffle unit 240, the post 242 can be assembled within the central aperture of the mounting sleeve 253. The mounting plate 241 can be flush against and/or coupled with the flange 253a. The post 242 can extend through the upper surface 205. In certain embodiments, the post 242 can extend into the baffle 248, such as through the aperture 249b in the upper surface 249a. The baffle 248 can be placed on the sleeve 244. The sleeve 244 can be disposed within the aperture 249d in the lower surface 249c. The lower surface 249c can rest on the base support 251.

FIGS. 45A to 45D show exemplary disassembly of the insertable baffle unit 240 from the tank 200. The mounting plate 241 can be decoupled from the mounting sleeve 253. The post 242 can be withdrawn from the baffle 248 through the mounting sleeve 253. The insert 222 can be removed from the opening 220. The baffle 248 can be lifted over the upper end of the sleeve 244. The baffle 248 can be maneuvered through the opening 220. The process can be repeated for each of the units of the plurality of insertable units of the baffle system 230. The process can be reversed to assemble the insertable baffle unit 240 within the tank 200.

FIG. 47 shows another embodiment of a tank 300. The tank 300 can include an outer surface 302. In certain embodiments, the outer surface 302 can generally enclose an interior space for transportation of a liquid. In certain embodiments, the outer surface 302 can include bulkheads 303a, 303b. In certain embodiments, the bulkhead 303a can be attached with the arcuate portion 305 of the outer surface 302. In certain embodiments, the bulkhead 303a can include an edge 306. In certain embodiments, the edge 306 can be attached along the arcuate portion 305. In one implementation, the edge 306 can be welded to the arcuate portion 305. In certain embodiments, the edge 306 can include one or more weld tabs 307. The weld tabs 307 can space the edge 306 relative to the arcuate portion 305. The spacing of the weld tabs 307 can facilitate the welding together of the edge 306 with the arcuate portion 305. Alternatively, the weld tabs 307 can be located on the arcuate portion 305 and/or on both the arcuate portion 305 and the edge 306.

Figure 46B:
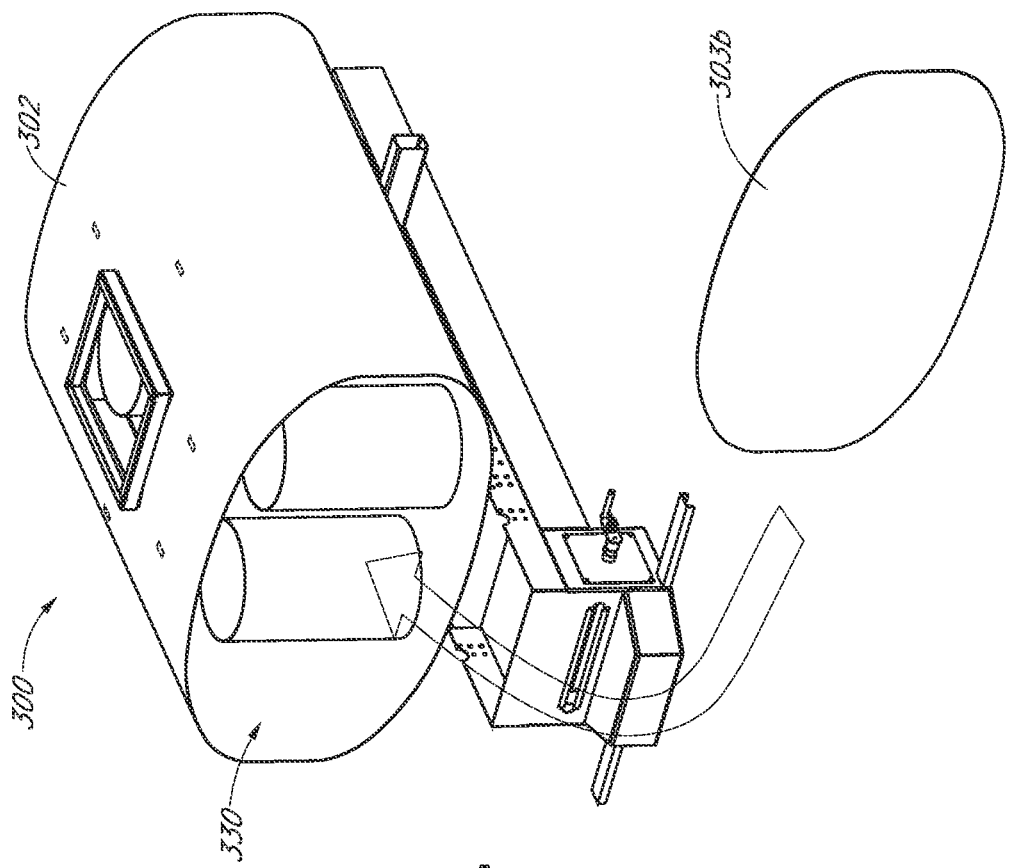
FIGS. 46A-46B are drawings of an exemplary sequence of an alternate way for assembling one or both bulkheads in openings into a one-piece tank.
Figure 46A:
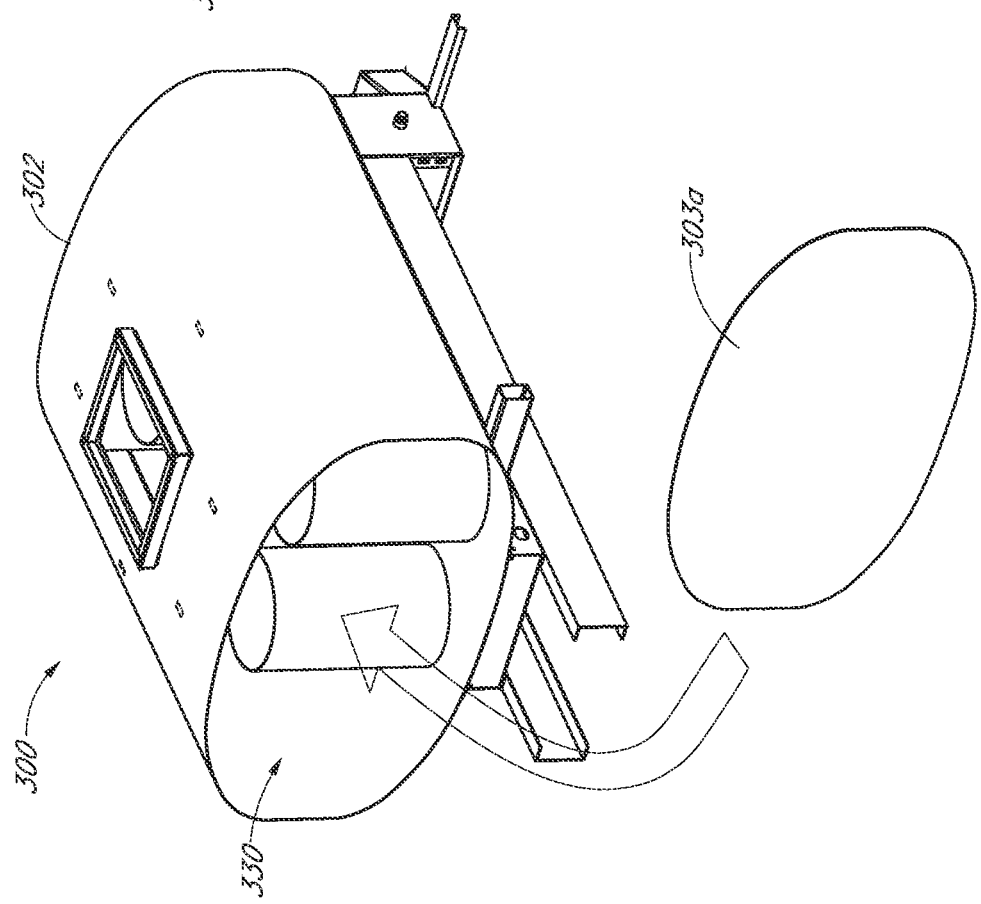
Figure 49:
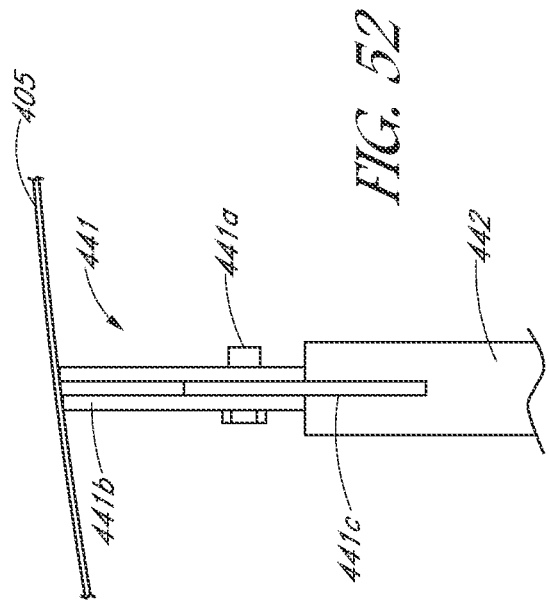
FIG. 49 is a partial perspective view of a tank including a baffle system according to another preferred embodiment of the present invention.
Figure 52:
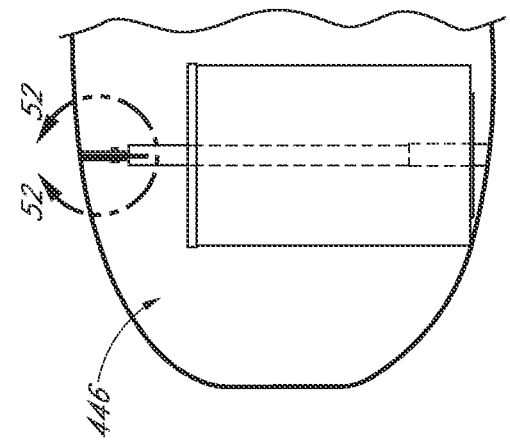
FIG. 52 is an enlarged partial view of FIG. 51 showing an upper end of the post coupled with the inner mount.
Figure 50:
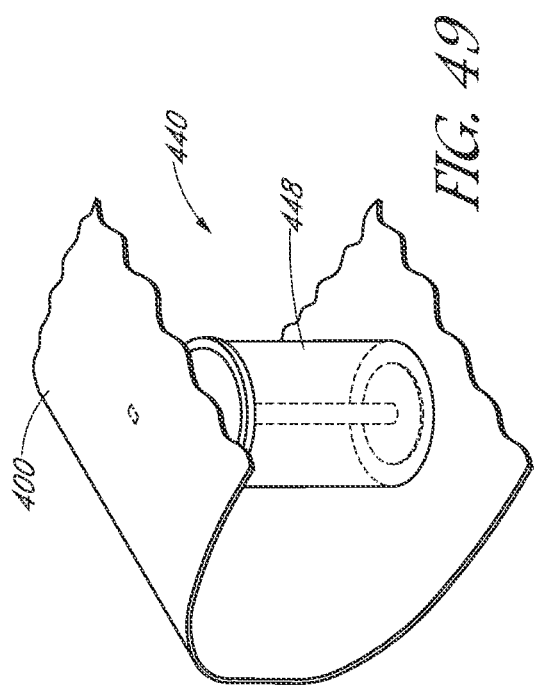
FIG. 50 is a side view of the tank from FIG. 49 showing an insertable baffle unit with a post that can be engaged and disengaged from within the tank.
Figure 51:
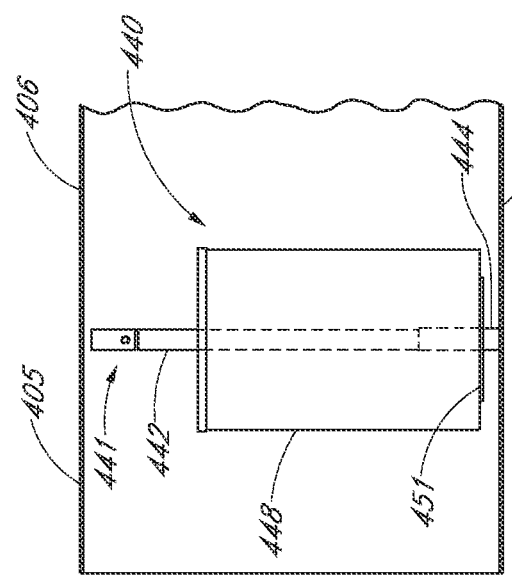
FIG. 51 is a front view of the tank from FIG. 49 showing a post of the insertable baffle unit coupled with an inner mount.
Figure 54:
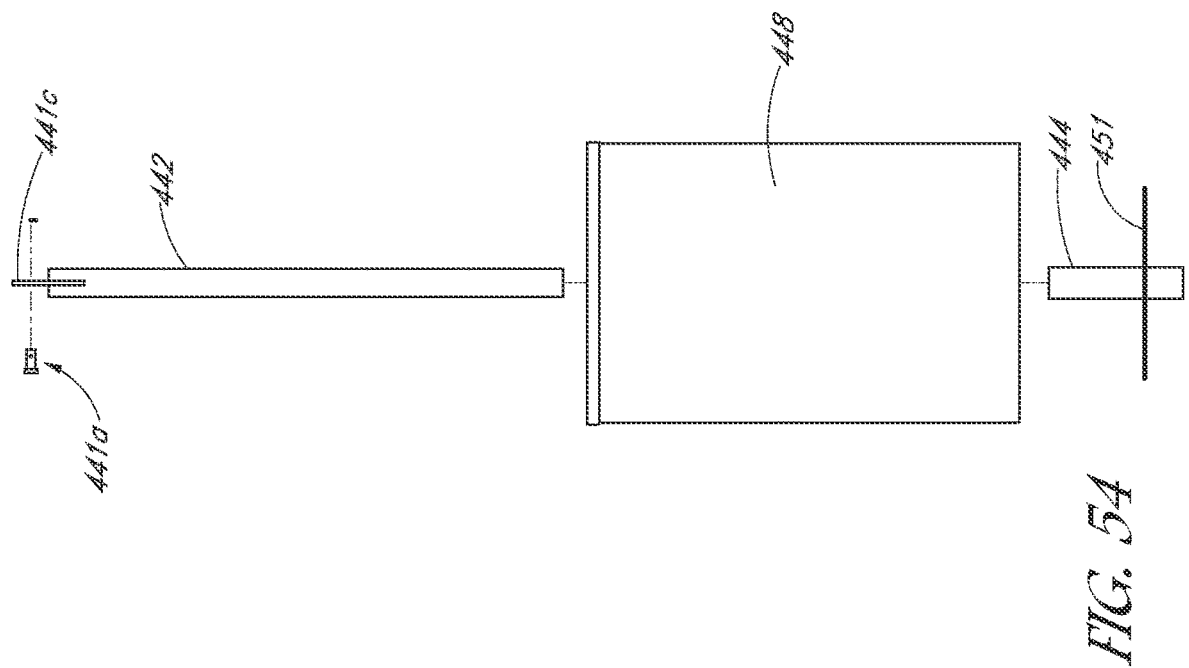
FIG. 54 is similar to FIG. 53 except the post has been removed from the baffle and the sleeve and a fastener have been removed from the upper end of the post.
Figure 53:
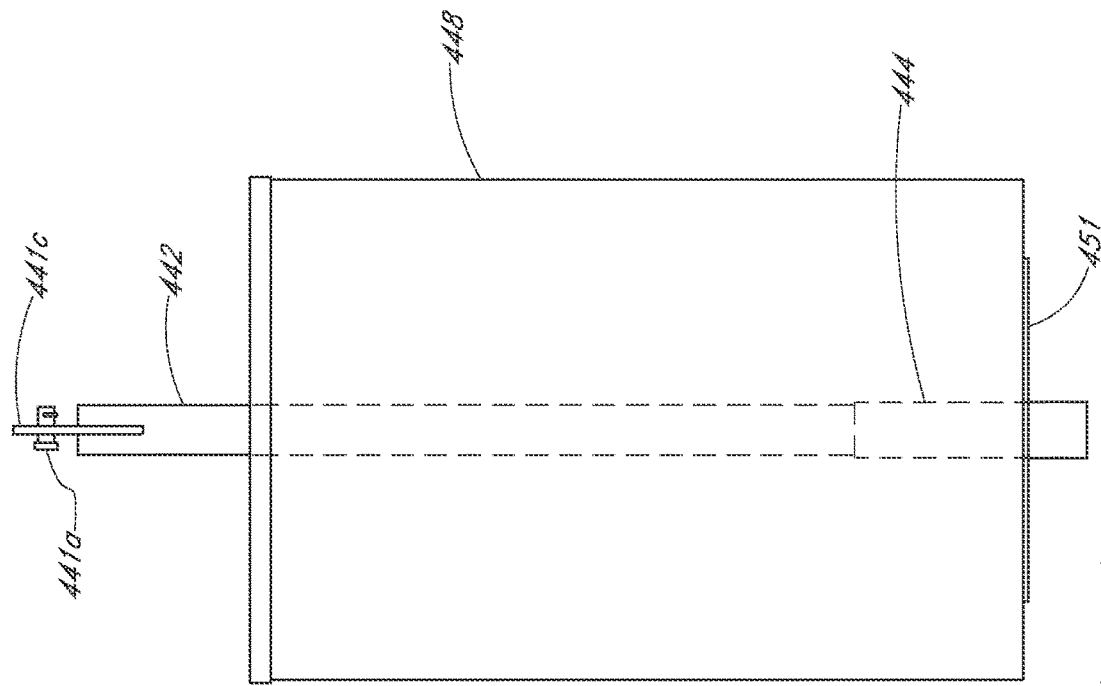
FIG. 53 shows the insertable baffle unit from FIG. 50 includes a post, a base support, a sleeve, and a baffle.

FIGS. 46A-46B are drawings of an exemplary sequence of an alternate way for assembling one or both bulkheads 303a, 303b in openings into a one-piece tank 300. Removal of the bulkhead 303a can allow access into an interior of the tank 300. The interior of the tank 300 can include a baffle system 330. The baffle system 330 can comprise one or more baffles for preventing unwanted shifting of the liquid within the tank 300 during transportation. The baffles can be shaped like barrels or drums having one or more apertures disposed and through to allow entrance of the liquid. The baffle system 330 can include insertable baffle units, like the insertable baffle units 140, 240 described above. In certain embodiments, the baffle system, or components thereof (such as the baffles), can be installed within the tank 300 through an open side created by removal of the bulkhead 303a and/or the bulkhead 303b.

FIGS. 49 to 54 illustrates another embodiment of a tank 400, similar to the tanks 20, 100, 200, or 300 above. The tank 400 can include a baffle system including one or more insertable baffle units 440. The insertable baffle unit 440 can include a baffle 448. The baffle 448 can be a barrel or drum having a plurality of apertures therein. In certain embodiments, the insertable baffle unit 440 can include a post 442. In certain embodiments, at an upper end of the post 442, the insertable baffle unit 440 can include a mount 441. In certain embodiments, an upper end of the mount 441 can be coupled with an upper surface 405 of the tank 400. In certain embodiments, a lower end of the mount 441 can be coupled with the post 442. In certain embodiments, the mount 441 can include a pin 441a, an upper member 441b, and/or a lower member 441c. In certain embodiments, the upper member 441b can be coupled with the lower member 441c through the pin 441a. In certain embodiments, the pin 441a can be removable from the upper member 441b and/or the lower member 441c. In certain embodiments, the lower member 441c can be coupled with the upper end of the post 442. In certain embodiments, the upper member 441b can include two parallel plates, spaced apart and extending downwardly. In certain embodiments, the lower member 441c can include a single plate extending upwardly. The single plate can fit between the parallel plates. Apertures of the upper member 441b and the lower member 441c can be aligned to receive the pin 441a.

In certain embodiments, the insertable baffle unit 440 can further include a sleeve 444 and/or a base support 451 coupled with the sleeve 444. In certain embodiments, the sleeve 444 can be coupled with the lower surface 406. In certain embodiments, the baffle 448 can be supported on the base support 451. In certain embodiments, the sleeve 444 can be receive within a lower panel of the baffle 448. In certain embodiments, the lower end of the post 442 can be insertable into the sleeve 444 through the baffle 448 to maintain the position of the baffle 448 within the tank 400. In certain embodiments, the post 442 can be positionable within the sleeve 444 with the mount 441 in a disconnected state allowing the upper end of the post 442 to be movable with respect to the upper surface 405. The post 442 can be inserted within the baffle 448 and into the sleeve 444. The lower member 441c of the mount 441 can then attach with the upper member 441b of the mount 441 by insertion of the pin 441a.

Figure 61:
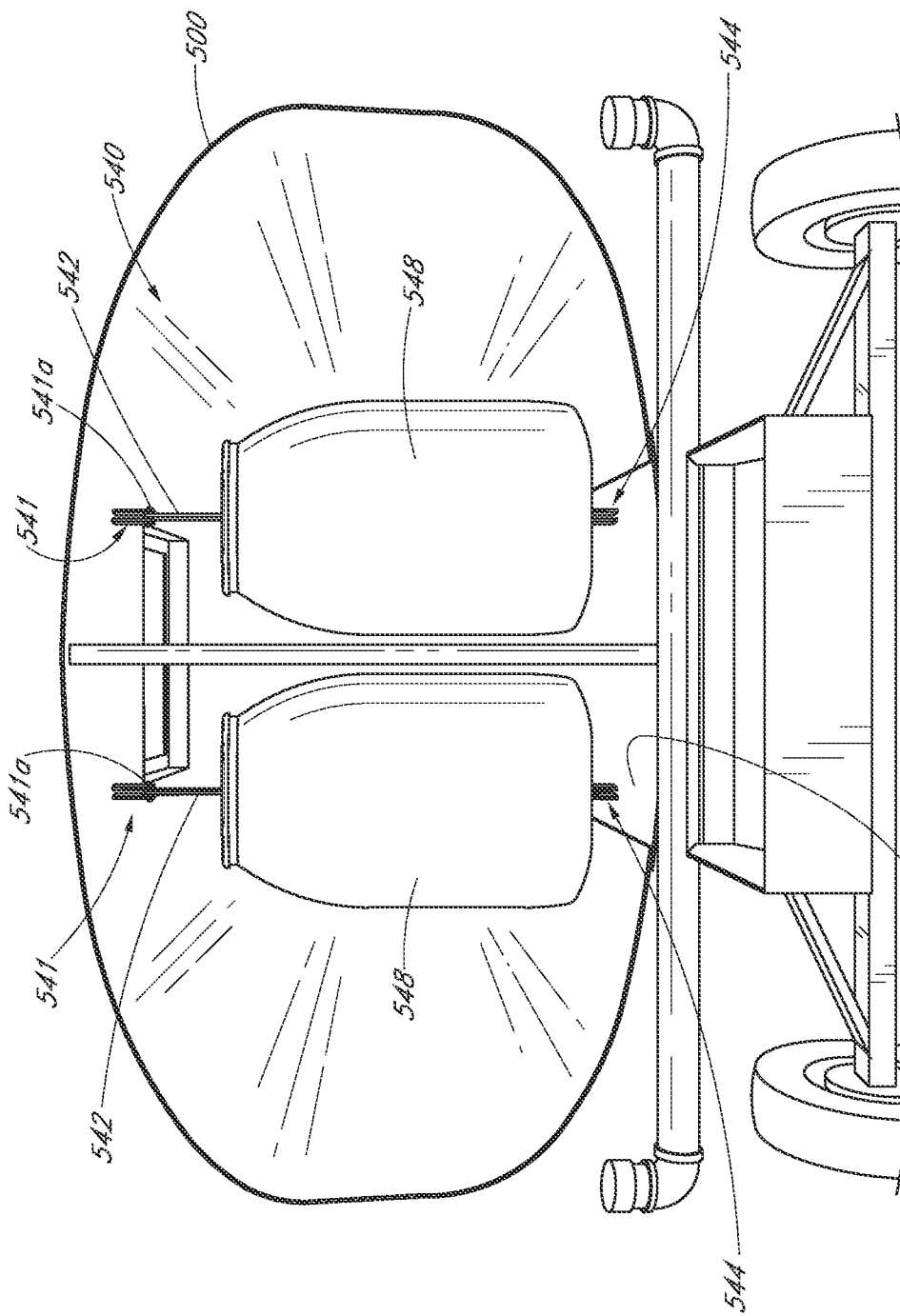
FIG. 61 is a rear view of a tank with an outer bulkhead removed to show a plurality of insertable baffle units similar to the baffle units illustrated in FIGS. 55-60 in the secured configuration within the tank.

FIGS. 55 to 60 show another implementation of an insertable baffle unit 540 within a tank 500. FIG. 61 is a picture of an embodiment of a tank 500 with an outer bulkhead removed to show features illustrated in FIGS. 55 to 60. The tank 500 can be similar to the tanks 20, 100, 200, 300, 400 described above. In certain embodiments, the insertable baffle unit 540 can include an upper mount 541 attached with the upper surface 505. In certain embodiments, the upper mount 541 can include a flange with an aperture therein. In certain embodiments, the aperture can be configured for receiving a pin 541a. In certain embodiments, the insertable baffle unit 540 can further include a post 542. In certain embodiments, the post 542 can be an elongate member. In certain embodiments, the post 542 can include an upper end 542a. In certain embodiments, the upper end 542a can include a flange with an aperture therein. The aperture can be configured for receiving the pin 541a to couple the upper end 542a with the upper mount 541.

In certain embodiments, the insertable baffle unit 540 can further include a lower hinge 544. In certain embodiments, a lower member of the lower hinge 544 can be mounted on a lower surface 513 of the tank 500. In certain embodiments, the lower hinge 544 can include a pin about which an upper member can pivot relative to the lower member. In certain embodiments, the lower end of the post 542 can be coupled with the upper member of the lower hinge 544. Optionally, the lower end 242b can be received within the upper member of the lower hinge 544. In certain embodiments, the post 542 can be rotatable with respect to the lower surface 513 about the lower hinge 544.

In certain embodiments, the insertable baffle unit 540 can include one or more support surfaces 551, 552 mounted on the post 542 and/or on the lower hinge 544. A baffle 548, optionally in the form of a barrel with one or more apertures therein, can be assembled over the upper end 542a of the post 542 with the upper end 542a detached from the upper mount 541. The post 542 can be in a rotated position away from the upper surface 505. The post 542 can then be secured with the baffle 548 thereon by connection of the upper end 542a with the mount 541 such as through the insertion of the pin 541a or other attachment mechanisms.

FIGS. 62 to 68 illustrate a tank 600 for transporting a liquid therein. FIG. 62 is a rear perspective view of the tank 600 with an outer bulkhead removed to show a baffle system 630 disposed within the tank 600. In certain embodiments, the baffle system 630 includes one or more insertable baffle units 640. In certain embodiments, each baffle unit 640 comprises a baffle 648. In the illustrated embodiment, the baffle 648 has an oval shape when viewed from above. Of course, the baffle 648 is not limited to the illustrated shape and can have other shapes as further explained below. For example, a cross-sectional shape of the baffle 648 can have other cross-sectional shapes such as square, rectangular, round or other.

The tank 600 can be a two-piece tank, as described above, or a single-piece tank. The tank 600 can be similar to the tanks 20, 100, 200, 300, 400, 500 described above. The tank 600 can be mountable on a vehicle for transporting the tank 600 with the liquid contained therein. The tank 600 can include an outer wall 602. The outer wall 602 can form an enclosed receptacle for containing the liquid. The outer wall 602 can comprise a plurality of curved and/or flat wall portions to form the receptacle. The outer wall 602 can be formed of one or more thin sheets of metal, plastic or other material.

The outer wall 602 can include an upper portion 604. The upper portion 604 can include an upper surface 605. The upper portion 604 can include two end surfaces forming parts of the outer bulkheads (not shown for simplicity). The upper surface 605 can be a curved surface.

The outer wall 602 can include a lower portion 612. The lower portion 612 can include a lower surface 613. The lower surface 613 can include a curved surface. The lower surface 613 can be coupled on one or both ends with the outer bulkheads.

The outer wall 602 can include an opening 620. The opening 620 can be located within the upper surface 605. The shape of the opening 620 can provide access into an interior of the tank 600. The opening 620 can include an insert 622. The insert 622 can be removable coupled within the opening 620. The insert 622 can enclose or partially enclose the opening 620. The insert 622 can be coupled with the upper surface 605. Optionally, the insert 622 includes one or more hose mounting locations.

The tank 600 can include the baffle system 630. The baffle system 630 can generally function to reduce sloshing of liquid within the tank 600 during transportation thereof, as described above with respect to the tank 20. The baffle system 630 can include an insertable baffle units 640. The insertable baffle unit 640 can be one of a plurality of insertable baffle units 640. In certain embodiments as explained below, the insertable baffle unit 640 can be metal. In other embodiments, the insertable baffle unit 640 is made from plastic or other materials.

The plurality of insertable baffle units 640 can be arranged around the opening 620. In the illustrated embodiment, two insertable baffle units 640 are disposed in the tank 600 on opposite sides of the insert 622. In certain embodiments, the plurality of insertable baffle units 640 can be approximately evenly spaced around a perimeter of the opening 620. In one implementation, the plurality of insertable baffle units 640 include four units. In one implementation, the plurality of insertable baffle units 640 include six units.

FIG. 63 is a rear view of the tank 600 in FIG. 62 with the outer bulkhead removed to show exemplary attachment locations for attaching the insertable baffle units 640 to the tank 600. FIG. 64 is a close-up view of one of the upper attachment locations from FIG. 63. FIG. 65 is similar to FIG. 62 except a portion of the tank 600 has been removed to show a lower attachment location for attaching the insertable baffle unit 640 to the tank 600. FIG. 66 is a close-up view of one of the lower attachment locations from FIG. 65.

Referring to FIGS. 64 and 66, the insertable baffle unit 640 can include a mounting plate 641 for attachment to the tank 600. In certain embodiments, the mounting plate 641 is welded to the tank 600 with the insertable baffle unit 640 attached to the mounting plate 641 with one or more mechanical fasteners 642. The disclosure is not limited to employing the illustrated mounting plate 641 for attaching the insertable baffle units 640 to the tank 600. Any other mounting method including the methods disclosed herein, can be employed to attach the insertable baffle units 640 to the tank 600.

In certain embodiments, the mounting plate 641 can be a bracket. The mounting plate 641 can comprise a metal or plastic material. The mounting plate 641 can have a planar shape. The mounting plate 641 can include therein one or more apertures for receiving the one or mechanical fasteners 642. The one or more mechanical fasteners 642 can couple the mounting plate 641 to the upper surface 605. In other embodiments, the one or more mechanical fasteners 642 can couple the mounting plate 641 to another surface of the tank 600. In other implementations, the mounting plate 641 can include a curvature or L-shape. The shape can match the curvature of the upper surface 105 to increase a contact area between the mounting plate 641 and the upper surface 605 when attached thereto.

Figure 67:
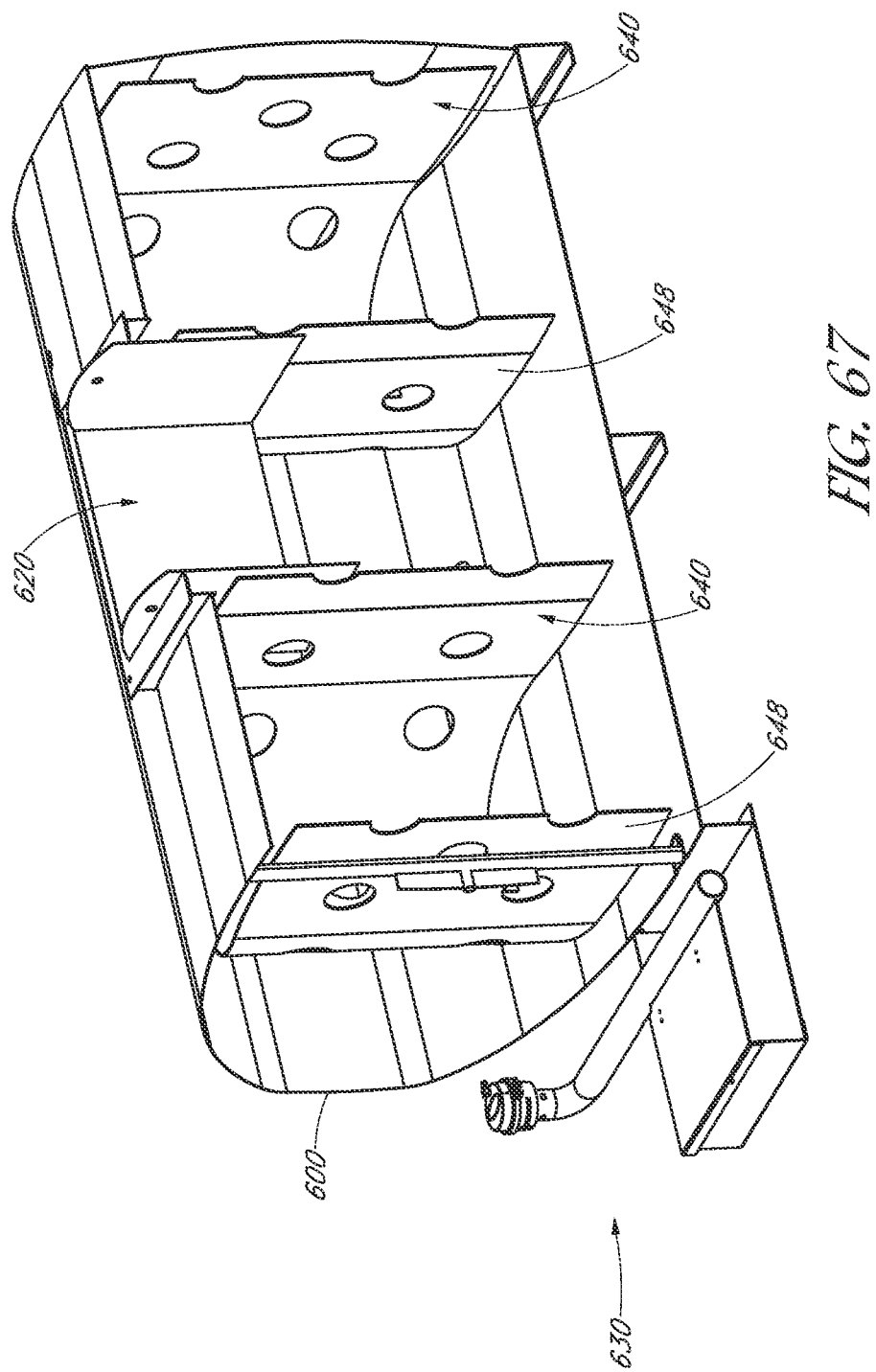
FIG. 67 is a section view through the tank of FIG. 62 taken along lines 67-67.
Figure 68:
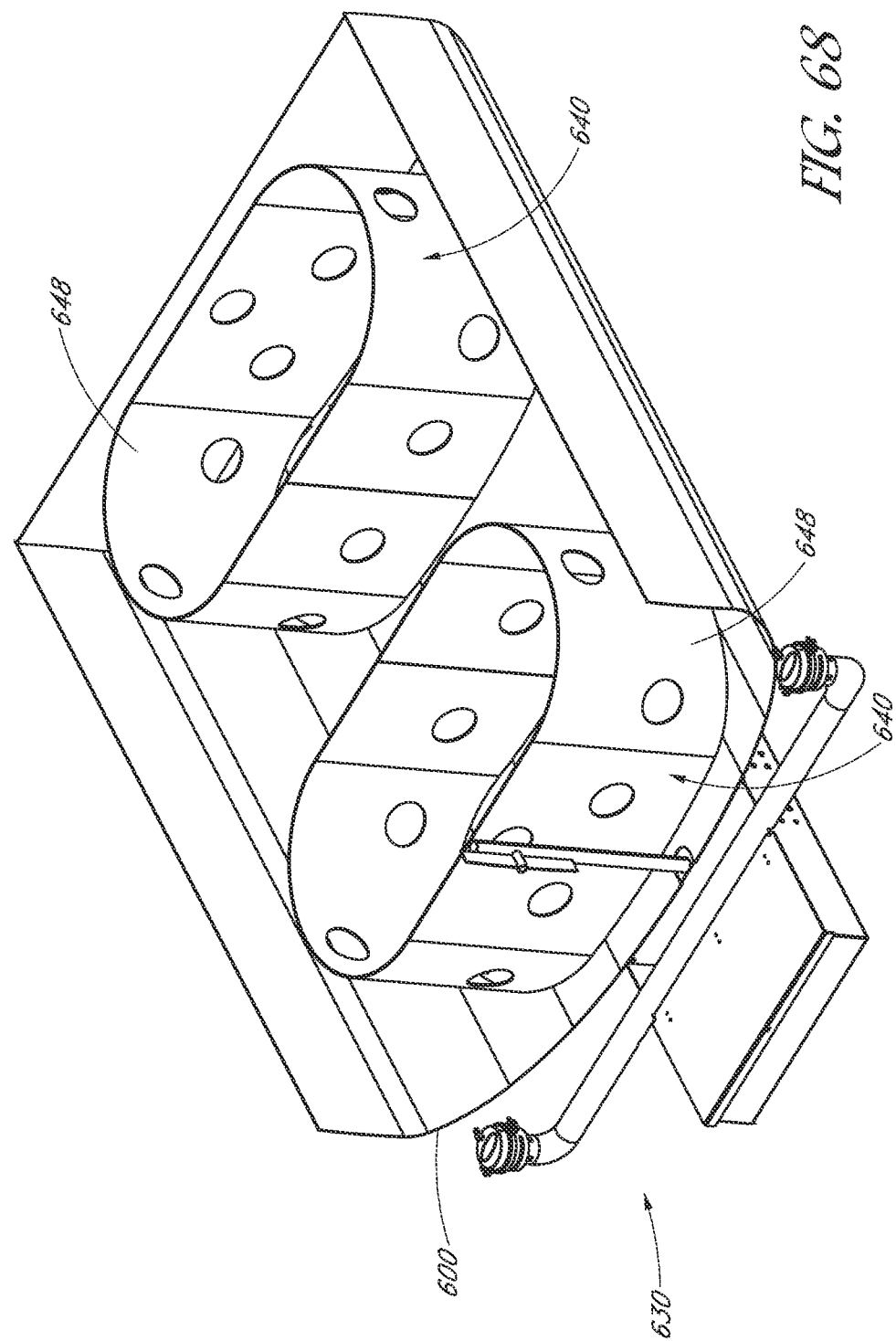
FIG. 68 is another section view through the tank of FIG. 62 taken along lines 68-68.

FIG. 67 is a cross-section view through the tank 600 of FIG. 62 along lines 67-67. FIG. 68 is another cross-section view through the tank 600 of FIG. 62 along lines 68-68. FIGS. 67 and 68 show further detail of the insertable baffle unit 640. The insertable baffle unit 640 can include an upper end 642a and a lower end 642b. The upper end 642a and/or the lower end 642b can be coupled with the mounting plate 641. The upper end 642a and/or the lower end 642b can be mechanically fastened (either permanently or removably via mechanical fasteners) with the mounting plate 641. Optionally, the upper end 642a and/or the lower end 642b can be welded with the mounting plate 641 such that the mounting plate 641 and the insertable baffle unit 640 can comprise a single unit. The mounting plate 641 can be parallel to an outer surface of the insertable baffle unit 640, as shown in FIG. 65. In other implementations, the mounting plate 641 can be angled with respect to the outer surface of the insertable baffle unit 640. The angle can depend on the shape of the upper surface 605 at the location of attachment to the insertable baffle unit 640.

The insertable baffle unit 640 can further include a baffle 648. The baffle 648 can be a barrel or drum as described above. The baffle 648 can include an outer surface 649. In certain embodiments, the baffle 648 can comprise a plurality of curved and/or flat wall portions to form the receptacle. The baffle 648 can be formed of one or more thin sheets of metal, plastic or other material. In certain embodiments, at least a portion of the baffle 648 comprises a metal having a thickness of 3/16 inch. In certain embodiments, at least a portion of the baffle 648 comprises a metal having a thickness of 0.090 inch. In certain embodiments, portions of the baffle 648 have a different thickness. In certain embodiments, portions of the baffle 648 have a variable thickness.

The outer surface 649 can include therein a plurality of holes 650 through which the liquid within the tank 600 can flow. The plurality of holes 650 can permit flow between the internal cavity of the baffle 648 and the volume of the tank 600. The holes can have a diameter of at least 1". The outer surface 649 can generally enclose an interior space of the baffle 648. The outer surface 649 can form a generally oval shape. The upper end 642a and/or the lower end 642b of the baffle 648 can be open to the volume of the tank 600. In this way, liquid within the baffle 648 is free to flow out of the tank 600 when the tank 600 is being emptied.

Figure 69:
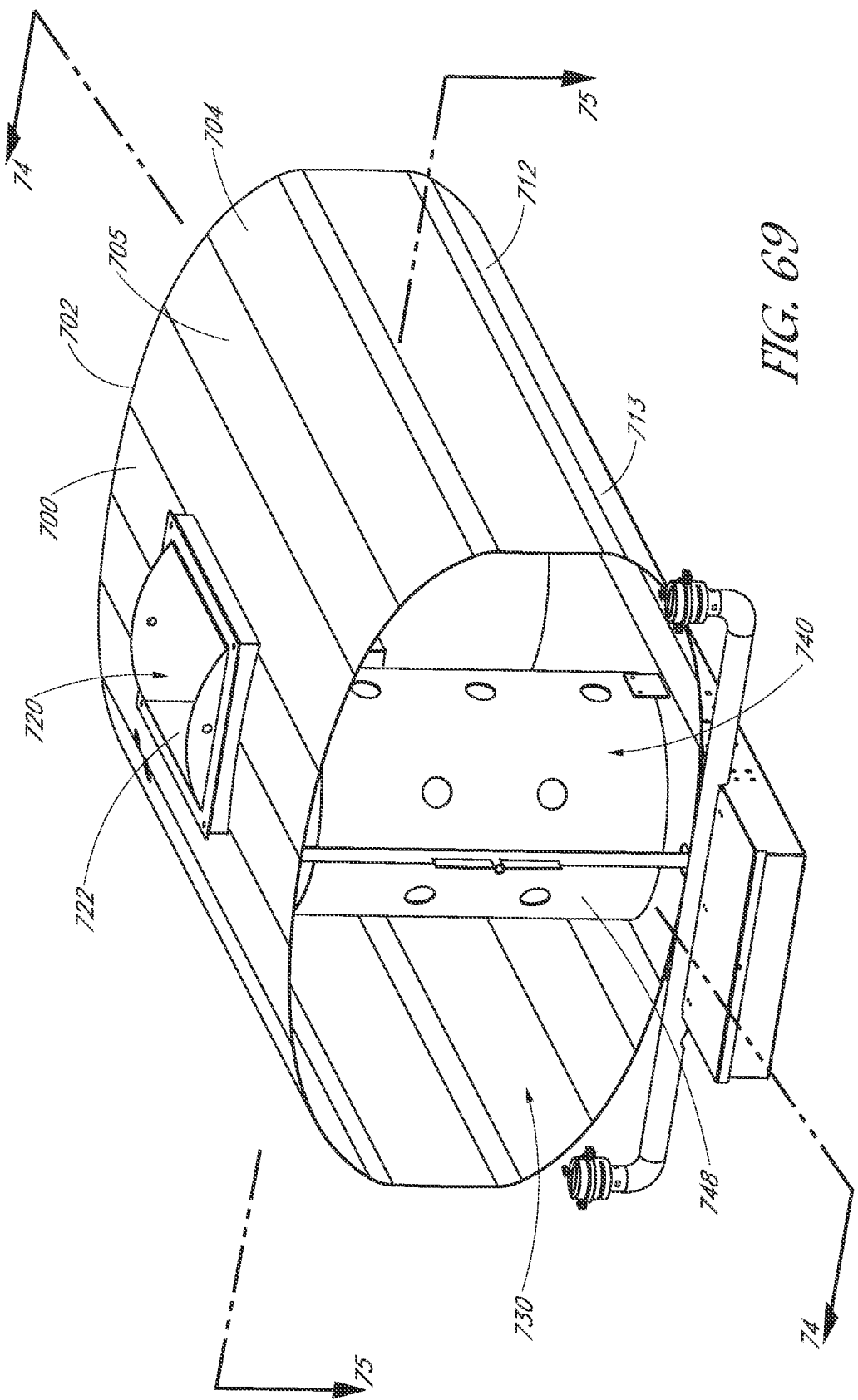
FIG. 69 is a rear perspective view of a tank with an outer bulkhead removed to show a baffle system that includes insertable baffle units that have a round shape according to another preferred embodiment of the present invention.

FIGS. 69-75 illustrate a tank 700 for transporting a liquid therein. FIG. 69 is a rear perspective view of the tank 700 with an outer bulkhead removed to show a baffle system 730 disposed within the tank 700. In certain embodiments, the baffle system 730 includes one or more insertable baffle units 740. In certain embodiments, each baffle unit 740 comprises a baffle 748. In the illustrated embodiment, the baffle 748 has a round shape when viewed from above. Of course, the baffle 748 is not limited to the illustrated shape and can have other shapes as further explained below. For example, a cross-sectional shape of the baffle 748 can have other cross-sectional shapes such as square, rectangular, oval or other.

The tank 700 can be a two-piece tank, as described above, or a single-piece tank. The tank 700 can be similar to the tanks 20, 100, 200, 300, 400, 500, 600 described above. The tank 700 can be mountable on a vehicle for transporting the tank 700 with the liquid contained therein. The tank 700 can include an outer wall 702. The outer wall 702 can form an enclosed receptacle for containing the liquid. The outer wall 702 can comprise a plurality of curved and/or flat wall portions to form the receptacle. The outer wall 702 can be formed of one or more thin sheets of metal, plastic or other material.

The outer wall 702 can include an upper portion 704. The upper portion 704 can include an upper surface 705. The upper portion 704 can include two end surfaces forming parts of the outer bulkheads (not shown for simplicity). The upper surface 705 can be a curved surface.

The outer wall 702 can include a lower portion 712. The lower portion 712 can include a lower surface 713. The lower surface 713 can include a curved surface. The lower surface 713 can be coupled on one or both ends with the outer bulkheads.

The outer wall 702 can include an opening 720. The opening 720 can be located within the upper surface 705. The shape of the opening 720 can provide access into an interior of the tank 700. The opening 720 can include an insert 722. The insert 722 can be removable coupled within the opening 720. The insert 722 can enclose or partially enclose the opening 720. The insert 722 can be coupled with the upper surface 705. Optionally, the insert 722 includes one or more hose mounting locations.

The tank 700 can include the baffle system 730. The baffle system 730 can generally function to reduce sloshing of liquid within the tank 700 during transportation thereof, as described above with respect to the tank 20. The baffle system 730 can include an insertable baffle units 740. The insertable baffle unit 740 can be one of a plurality of insertable baffle units 740. In certain embodiments as explained below, the insertable baffle unit 740 can be metal. In other embodiments, the insertable baffle unit 740 is made from plastic or other materials.

The plurality of insertable baffle units 740 can be arranged around the opening 720. In the illustrated embodiment, two insertable baffle units 740 are disposed in the tank 700 on opposite sides of the insert 722. In certain embodiments, the plurality of insertable baffle units 740 can be approximately evenly spaced around a perimeter of the opening 720. In one implementation, the plurality of insertable baffle units 640 include four units. In one implementation, the plurality of insertable baffle units 740 include six units.

FIG. 70 is a rear view of the tank 700 in FIG. 69 with the outer bulkhead removed to show exemplary attachment locations for attaching the insertable baffle units 740 to the tank 700. FIG. 71 is a close-up view of one of the upper attachment locations from FIG. 70. FIG. 72 is similar to FIG. 69 except a portion of the tank 700 has been removed to show a lower attachment location for attaching the insertable baffle unit 740 to the tank 700. FIG. 73 is a close-up view of one of the lower attachment locations from FIG. 72.

Referring to FIGS. 71 and 73, the insertable baffle unit 740 can include a mounting plate 741 for attachment to the tank 700. In certain embodiments, the mounting plate 741 is welded to the tank 700 with the insertable baffle unit 740 attached to the mounting plate 741 with one or more mechanical fasteners 742. The disclosure is not limited to employing the illustrated mounting plate 741 for attaching the insertable baffle units 740 to the tank 700. Any other mounting method including the methods disclosed herein, can be employed to attach the insertable baffle units 740 to the tank 700.

In certain embodiments, the mounting plate 741 can be a bracket. The mounting plate 741 can comprise a metal or plastic material. The mounting plate 741 can have a planar shape. The mounting plate 741 can include therein one or more apertures for receiving the one or mechanical fasteners 742. The one or more mechanical fasteners 742 can couple the mounting plate 741 to the upper surface 705. In other embodiments, the one or more mechanical fasteners 742 can couple the mounting plate 741 to another surface of the tank 700. In other implementations, the mounting plate 741 can include a curvature or L-shape. The shape can match the curvature of the upper surface 705 to increase a contact area between the mounting plate 741 and the upper surface 705 when attached thereto.

Figure 74:
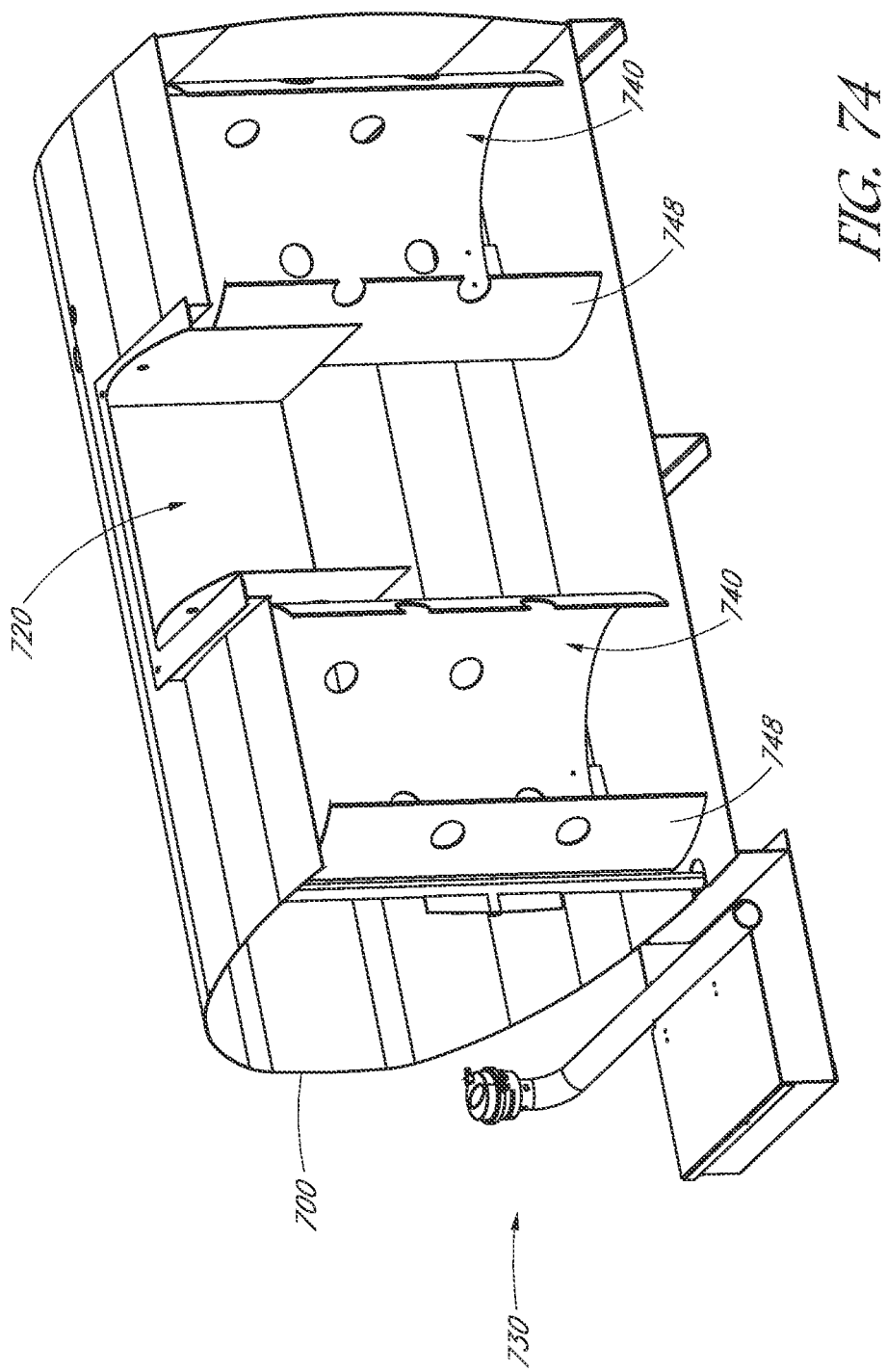
FIG. 74 is a section view through the tank of FIG. 69 taken along lines 74-74.
Figure 75:
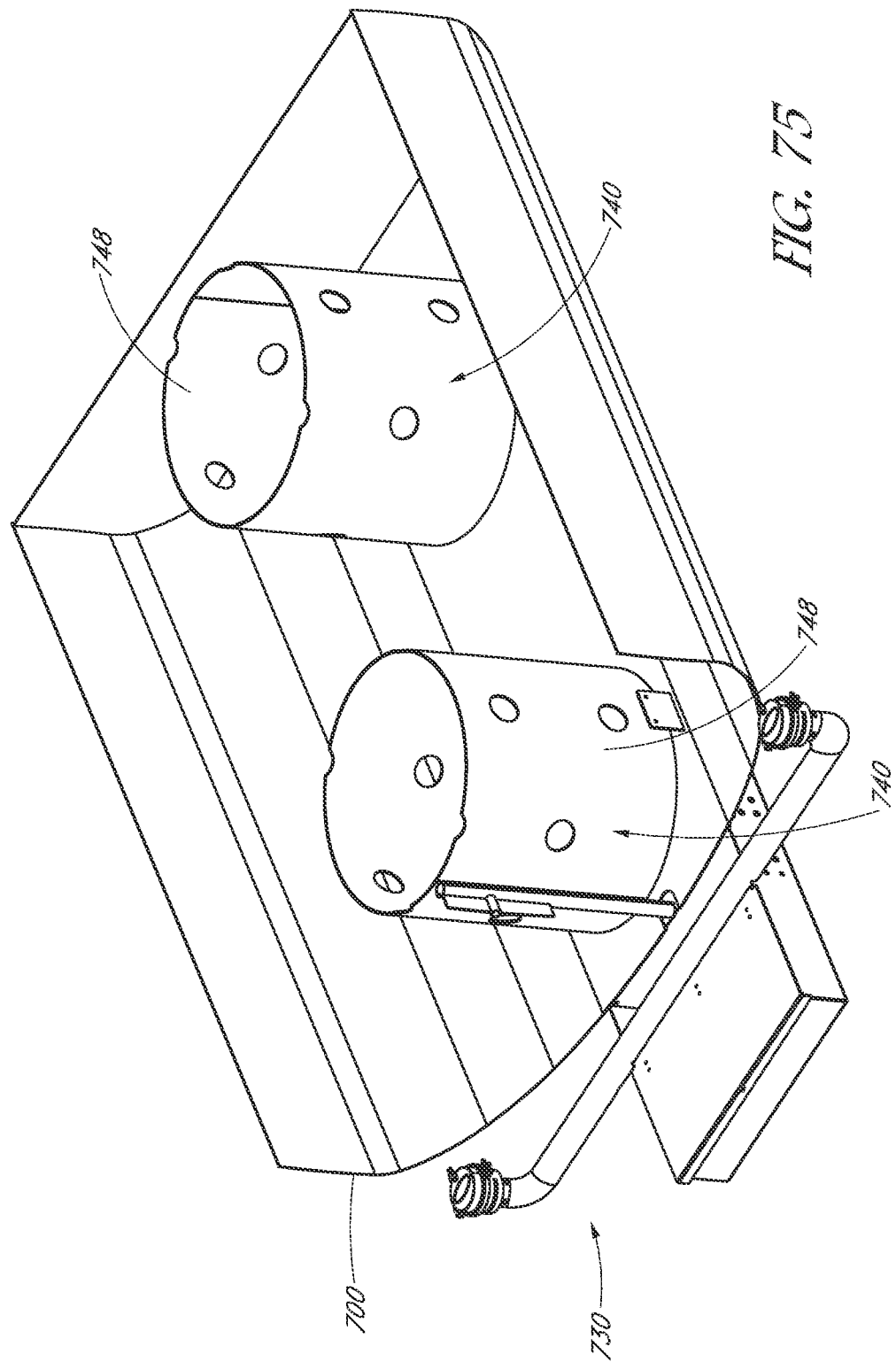
FIG. 75 is another section view through the tank of FIG. 69 taken along lines 75-75.

FIG. 74 is a cross-section view through the tank 700 of FIG. 69 along lines 74-74. FIG. 75 is another cross-section view through the tank 700 of FIG. 69 along lines 75-75. FIGS. 74 and 75 show further detail of the insertable baffle unit 740. The insertable baffle unit 740 can include an upper end 742a and a lower end 742b. The upper end 742a and/or the lower end 742b can be coupled with the mounting plate 741. The upper end 742a and/or the lower end 742b can be mechanically fastened (either permanently or removably via mechanical fasteners) with the mounting plate 741. Optionally, the upper end 742a and/or the lower end 742b can be welded with the mounting plate 741 such that the mounting plate 741 and the insertable baffle unit 740 can comprise a single unit. The mounting plate 741 can be parallel to an outer surface of the insertable baffle unit 740, as shown in FIG. 72. In other implementations, the mounting plate 741 can be angled with respect to the outer surface of the insertable baffle unit 740. The angle can depend on the shape of the upper surface 705 at the location of attachment to the insertable baffle unit 740.

The insertable baffle unit 740 can further include a baffle 748. The baffle 748 can be a barrel or drum as described above. The baffle 748 can include an outer surface 749. In certain embodiments, the baffle 748 can comprise a plurality of curved and/or flat wall portions to form the receptacle. The baffle 748 can be formed of one or more thin sheets of metal, plastic or other material. In certain embodiments, at least a portion of the baffle 748 comprises a metal having a thickness of $3/16$ inch. In certain embodiments, at least a portion of the baffle 748 comprises a metal having a thickness of 0.090 inch. In certain embodiments, portions of the baffle 748 have a different thickness. In certain embodiments, portions of the baffle 748 have a variable thickness.

The outer surface 749 can include therein a plurality of holes 750 through which the liquid within the tank 700 can flow. The plurality of holes 750 can permit flow between the internal cavity of the baffle 748 and the volume of the tank 700. The holes can have a diameter of at least 1". The outer surface 749 can generally enclose an interior space of the baffle 748. The outer surface 749 can form a generally circular shape. The upper end 742a and/or the lower end 742b of the baffle 748 can be open to the volume of the tank 700. In this way, liquid within the baffle 748 is free to flow out of the tank 700 when the tank 700 is being emptied.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

Several illustrative examples of tanks have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can included in any example.

In summary, various examples of tanks and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above but should be determined only by a fair reading of the claims.

What is claimed is:

1. A method of installing a baffle system in a tank, the method comprising:
    inserting a baffle comprising an outer wall with a plurality of apertures therethrough within an interior of the tank;
    inserting a post through the outer wall of the baffle to inhibit at least lateral motion of the baffle relative to the tank;
    securing an end of the post to an internal surface of the tank;
    inserting a second baffle comprising a second outer wall with a second plurality of apertures therethrough within the interior of the tank;
    inserting a second post through the second outer wall of the second baffle to inhibit at least lateral motion of the second baffle relative to the tank; and
    securing an end of the second post to the internal surface of the tank;
    wherein securing the end of the post to the internal surface of the tank includes rotating the post between a tilted configuration and a secured configuration;
    wherein both the end and another end of the post and both the end and another end of the second post are separately secured to the internal surface of the tank.

2. The method of installing a baffle system of claim 1, wherein inserting the baffle includes insertion of the baffle through a top opening in the tank.

3. The method of installing a baffle system of claim 1, wherein inserting the baffle includes separating the tank into two pieces.

4. The method of installing a baffle system of claim 1, wherein inserting the baffle includes insertion through an end of the tank prior to attaching a bulkhead to the end of the tank.

5. The method of installing a baffle system of claim 1, wherein securing an end of the post includes:
    moving the post and the baffle together from the tilted configuration to the secured configuration via a mechanical hinge.

6. The method of installing a baffle system of claim 5, wherein the end of the post is coupled to the mechanical hinge.

7. The method of installing a baffle system of claim 1, wherein securing the post employs a fastener.

8. The method of installing a baffle system of claim 1, further comprising attaching a bulkhead to the tank to close the interior of the tank.

9. The method of installing a baffle system of claim 1, further comprising placing the baffle so as to be supported by a mounting plate.

10. The method of installing a baffle system of claim 9, wherein the mounting plate is spaced from a bottom wall of the tank.

11. The method of installing a baffle system of claim 5, wherein securing an end of the second post includes:
    moving the second post and the second baffle together from a tilted configuration to a secured configuration via a second mechanical hinge.

12. The method of installing a baffle system of claim 5, further comprising:
    pivoting the post and the baffle from the secured configuration to the tilted configuration; and
    removing the baffle from the post.

13. The method of installing a baffle system of claim 1, wherein the baffle is a plastic drum.

14. The method of installing a baffle system of claim 13, wherein the plastic drum is 55 gallons.

15. The method of installing a baffle system of claim 1, therein the internal surface of the tank is a top inner surface, and further comprising securing the another end of the post to a bottom inner surface of the tank.

16. The method of installing a baffle system of claim 1, wherein the post is arranged vertically within the tank.

17. The method of installing a baffle system of claim 1, wherein the baffle and the second baffle are arranged vertically and side-by-side within the tank.

18. The method of installing a baffle system of claim 1, wherein the post and the second post are arranged vertically and side-by-side within the tank.

\* \* \* \* \*

UNITED STATES PATENT AND TRADEMARK OFFICE
CERTIFICATE OF CORRECTION

| | | |
|---|---|---|
| PATENT NO. | : 11,975,917 B2 | Page 1 of 1 |
| APPLICATION NO. | : 17/807846 | |
| DATED | : May 7, 2024 | |
| INVENTOR(S) | : Roger Hayes | |

It is certified that error appears in the above-identified patent and that said Letters Patent is hereby corrected as shown below:

In the Claims

In Column 28, Claim 15, Line 15 (Approx.), delete "therein" and insert --wherein--.

Signed and Sealed this
Fifteenth Day of April, 2025

Coke Morgan Stewart
*Acting Director of the United States Patent and Trademark Office*